US009092936B2

(12) United States Patent
Walkwitz et al.

(10) Patent No.: US 9,092,936 B2
(45) Date of Patent: Jul. 28, 2015

(54) SYSTEM AND METHOD FOR TRACKING SYSTEM GENERATED WINNINGS

(71) Applicants: Wayne W. Walkwitz, Waterford Works, NJ (US); Paul C. McLaughlin, Brigantine, NJ (US); Ryan Randazzo, Glendora, NJ (US)

(72) Inventors: Wayne W. Walkwitz, Waterford Works, NJ (US); Paul C. McLaughlin, Brigantine, NJ (US); Ryan Randazzo, Glendora, NJ (US)

(73) Assignee: Bally Gaming, Inc., Las Vegas, NV (US)

(*) Notice: Subject to any disclaimer, the term of this patent is extended or adjusted under 35 U.S.C. 154(b) by 89 days.

(21) Appl. No.: 13/654,700

(22) Filed: Oct. 18, 2012

(65) Prior Publication Data

US 2013/0281198 A1 Oct. 24, 2013

Related U.S. Application Data

(63) Continuation of application No. 12/267,521, filed on Nov. 7, 2008, now abandoned.

(60) Provisional application No. 60/987,029, filed on Nov. 9, 2007.

(51) Int. Cl.
*G06F 17/00* (2006.01)
*G07F 17/32* (2006.01)

(52) U.S. Cl.
CPC ........ *G07F 17/3244* (2013.01); *G07F 17/3223* (2013.01); *G07F 17/3258* (2013.01)

(58) Field of Classification Search
CPC ............ G07F 17/3244; G07F 17/3258; G07F 17/3232; G07F 17/3269; G07F 17/3234; G07F 17/3241; G07F 17/3239
See application file for complete search history.

(56) References Cited

U.S. PATENT DOCUMENTS

| | | | | |
|---|---|---|---|---|
| 6,592,460 | B2 | 7/2003 | Torango | |
| 7,625,283 | B2 | 12/2009 | Olive | |
| 2005/0043086 | A1* | 2/2005 | Schneider | 463/25 |
| 2005/0170892 | A1* | 8/2005 | Atkinson | 463/42 |
| 2005/0215314 | A1* | 9/2005 | Schneider et al. | 463/26 |
| 2008/0125206 | A1* | 5/2008 | Mouchou et al. | 463/16 |

* cited by examiner

*Primary Examiner* — Dmitry Suhol
*Assistant Examiner* — Carl V Larsen
(74) *Attorney, Agent, or Firm* — Brooke W. Quist; Marvin A. Hein; Philip J. Anderson

(57) ABSTRACT

One or more gaming machines include an external attendant paid bonus win meter. More particularly, when the casino gaming system generates a jackpot, and awards the jackpot to a player at a gaming machine, the amount of the winning jackpot is recorded on the external attendant paid bonus win meter. Otherwise stated, the system-based jackpot is awarded to a player at a gaming machine, and the amount of the winning jackpot is recorded on a gaming machine-based meter. The player may be randomly determined. Additionally, the trigger for awarding the jackpot may be randomly determined based on predetermined criteria set by the casino or gaming system manufacturer. Once the jackpot win occurs, the player at the selected gaming machine is notified, usually by a visible sign or message. In one embodiment, the amount of the jackpot win (or bonus win) is recorded on the external attendant paid bonus win meter.

7 Claims, 28 Drawing Sheets

FIG. 5B-1
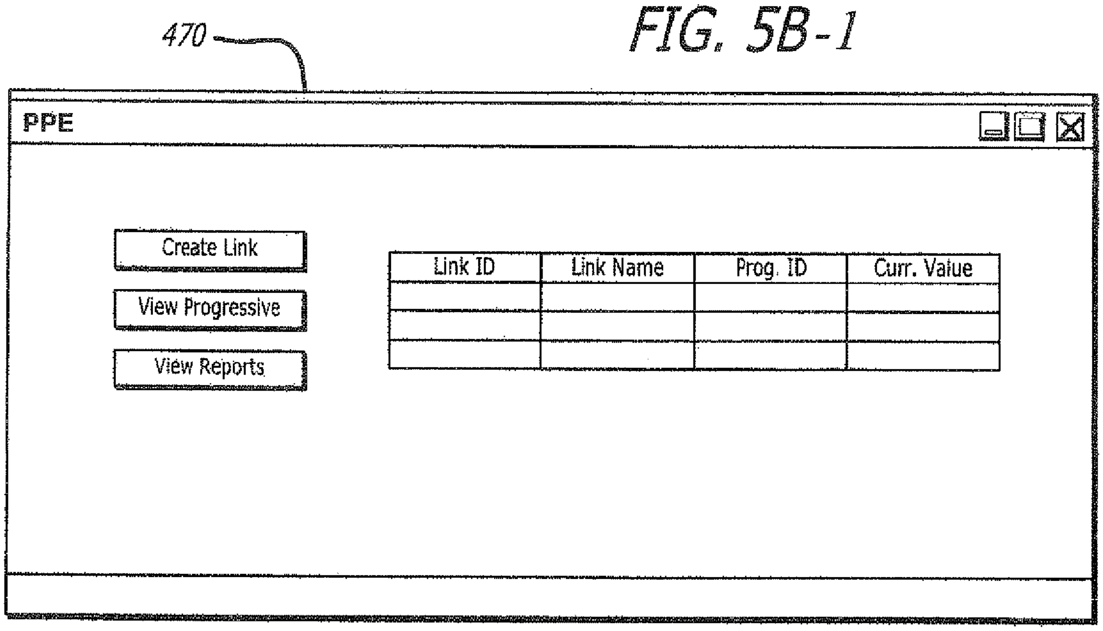
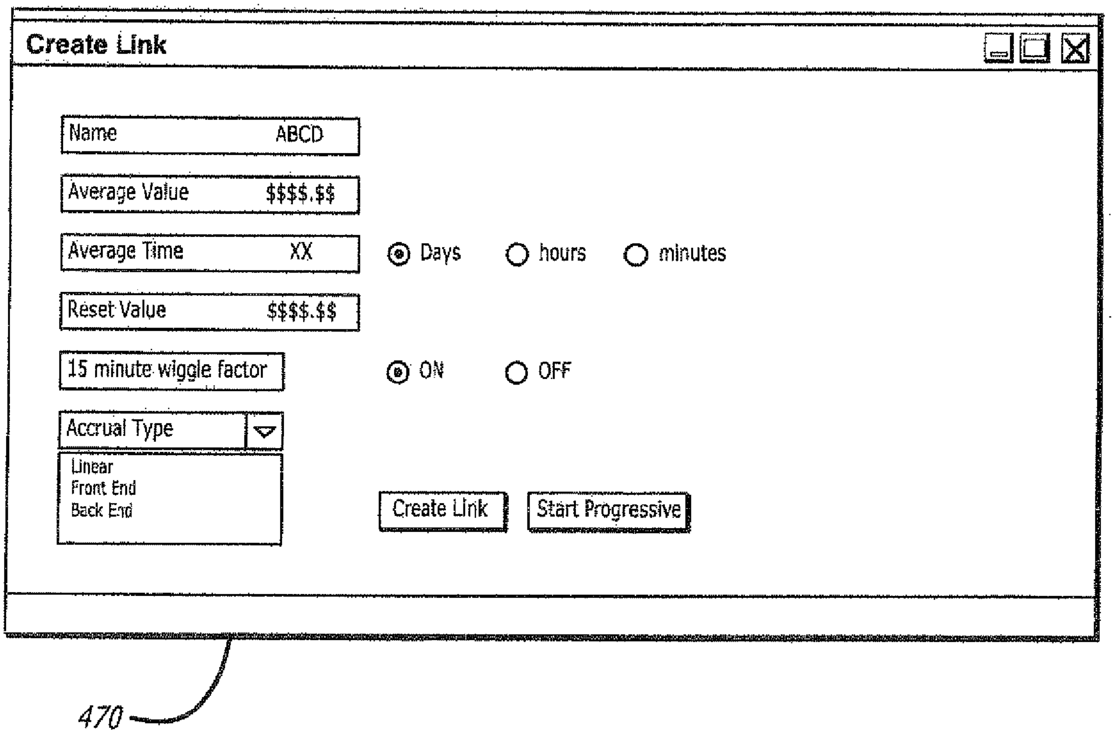
FIG. 5B-2

| Time Slice | # of Winning Tickets |
|---|---|
| 1 | 1 |
| 2 | 2 |
| 3 | 3 |
| 4 | 8 |
| ... | ... |
| 122 | 463,702 |
| 123 | 560,125 |
| 124 | 785,129 |
| 125 | ALWAYS WIN |

| Time Slice | Pot Growth Value |
|---|---|
| 1 | 500 |
| 2 | 500 |
| 3 | 400 |
| 4 | 300 |
| ... | ... |
| 122 | 10 |
| 123 | 5 |
| 124 | 2 |
| 125 | 1 |

At 12:15AM the CMP/CMS takes the captured interval Rating and replaces the old value Master Table Current Value-12:14 AM

| Row | Time | Active Carded Players |
|---|---|---|
| 1 | 12:00 AM | 25 |
| 2 | 12:15 AM | 22 |
| 3 | 12:30 AM | 18 |
| 4 | 12:45 AM | 15 |
| 5 | 1:00 AM | 12 |
| ... | ... | ... |
| 94 | 11:15 PM | 43 |
| 95 | 11:30 PM | 38 |
| 96 | 11:45 PM | 28 |

Master Table New Value-12:15 AM

| Row | Time | Active Carded Players |
|---|---|---|
| 1 | 12:00 AM | 25 |
| 2 | **12:15 AM** | **26** |
| 3 | 12:30 AM | 18 |
| 4 | 12:45 AM | 15 |
| 5 | 1:00 AM | 12 |
| ... | ... | ... |
| 94 | 11:15 PM | 43 |
| 95 | 11:30 PM | 38 |
| 96 | 11:45 PM | 28 |

Sorted Table (after 12:15 AM Interval updated)

| Row | Time | Active Carded Players |
|---|---|---|
| 1 | 1:00 AM | 12 |
| 2 | 12:45 AM | 15 |
| 3 | 12:30 AM | 18 |
| 4 | 12:00 AM | 25 |
| ... | ... | ... |
| **87** | **12:15 AM** | **26** |
| ... | ... | ... |
| 95 | 11:30 PM | 38 |
| 96 | 11:15 PM | 43 |

FIG. 6A

FIG. 8

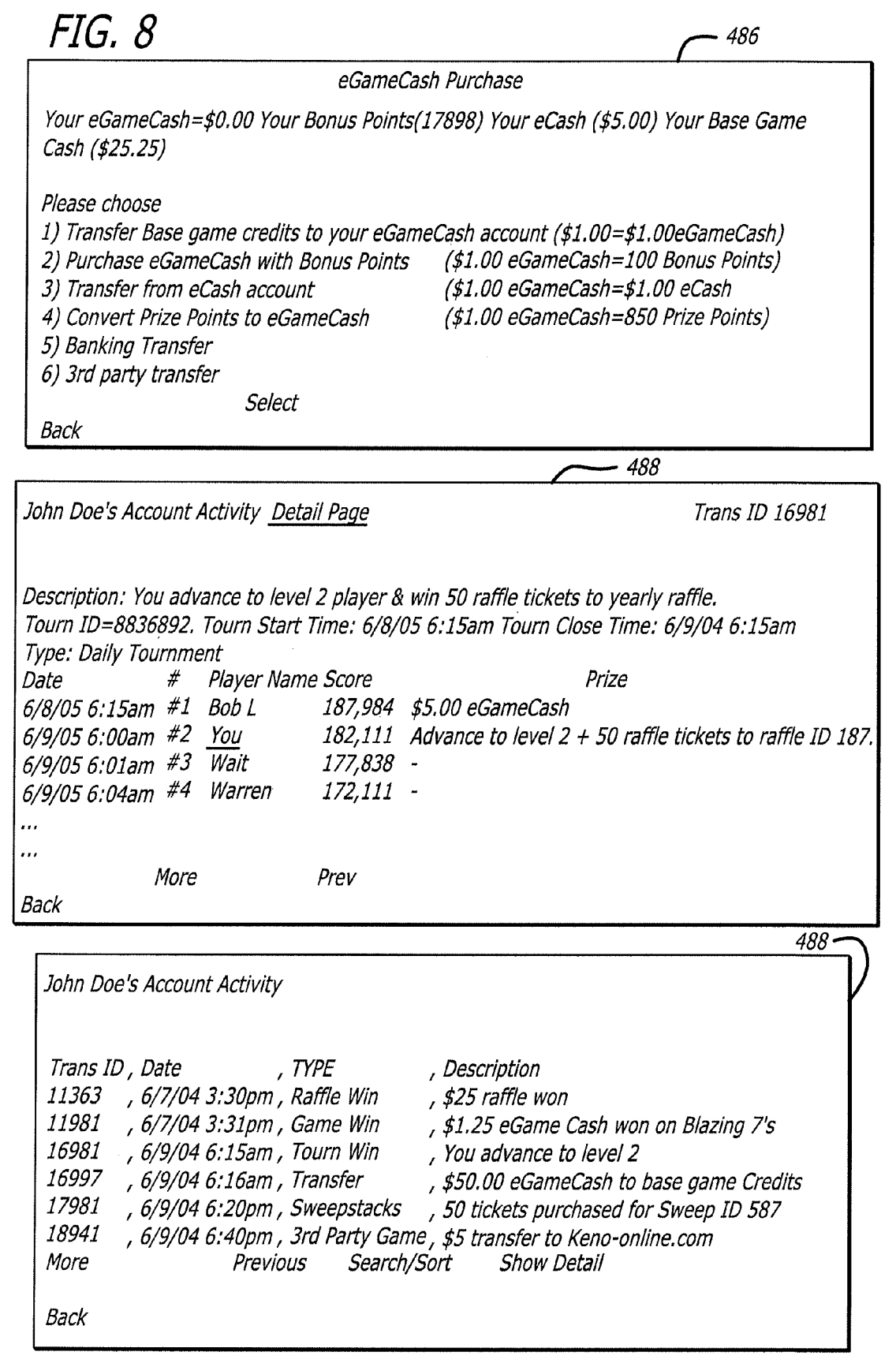

486 eGameCash Purchase

Your eGameCash=$0.00 Your Bonus Points(17898) Your eCash ($5.00) Your Base Game Cash ($25.25)

Please choose
1) Transfer Base game credits to your eGameCash account ($1.00=$1.00eGameCash)
2) Purchase eGameCash with Bonus Points ($1.00 eGameCash=100 Bonus Points)
3) Transfer from eCash account ($1.00 eGameCash=$1.00 eCash
4) Convert Prize Points to eGameCash ($1.00 eGameCash=850 Prize Points)
5) Banking Transfer
6) 3rd party transfer Select Back

488

John Doe's Account Activity Detail Page Trans ID 16981

Description: You advance to level 2 player & win 50 raffle tickets to yearly raffle.
Tourn ID=8836892. Tourn Start Time: 6/8/05 6:15am Tourn Close Time: 6/9/04 6:15am
Type: Daily Tournment

| Date | # | Player Name | Score | Prize |
|---|---|---|---|---|
| 6/8/05 6:15am | #1 | Bob L | 187,984 | $5.00 eGameCash |
| 6/9/05 6:00am | #2 | You | 182,111 | Advance to level 2 + 50 raffle tickets to raffle ID 187. |
| 6/9/05 6:01am | #3 | Wait | 177,838 | - |
| 6/9/05 6:04am | #4 | Warren | 172,111 | - |

...
...

More Prev

Back

488

John Doe's Account Activity

| Trans ID | Date | TYPE | Description |
|---|---|---|---|
| 11363 | 6/7/04 3:30pm | Raffle Win | $25 raffle won |
| 11981 | 6/7/04 3:31pm | Game Win | $1.25 eGame Cash won on Blazing 7's |
| 16981 | 6/9/04 6:15am | Tourn Win | You advance to level 2 |
| 16997 | 6/9/04 6:16am | Transfer | $50.00 eGameCash to base game Credits |
| 17981 | 6/9/04 6:20pm | Sweepstacks | 50 tickets purchased for Sweep ID 587 |
| 18941 | 6/9/04 6:40pm | 3rd Party Game | $5 transfer to Keno-online.com |

More Previous Search/Sort Show Detail

Back

| Card# | eGameCash (uncashable) | eGameCash (cashable) | eGameCash (player funded) | eGameCash (cashable) |
|---|---|---|---|---|
| 132 | $01.1200 | $00.0000 | $00.0000 | 150,000 |
| 384 | $23.2300 | $10.1000 | $00.0000 | 123,013 |
| 892 | $15.0000 | $01.5000 | $00.0000 | 15,001 |
| 126 | $00.0000 | $00.0000 | $00.0000 | 0 |
| .. | .. | .. | .. | .. |
| .. | .. | .. | .. | .. |
| . | . | . | . | . |

SYSTEM AND METHOD FOR TRACKING SYSTEM GENERATED WINNINGS

CROSS-REFERENCE TO RELATED APPLICATIONS

This application is a continuation of U.S. application Ser. No. 12/267,521 filed Nov. 7, 2008 titled "System for Tracking System Generated Winnings which claims the benefit of Provisional Patent Application No. 60/987,029, filed Nov. 9, 2007, which are hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This disclosure relates to wagering games, and more specifically to networked gaming systems and methods which offer or provide games.

BACKGROUND

Modern gaming establishments offer a variety of electronic wagering games including multimedia and/or mechanical slot machines providing video card games, such as poker, blackjack and the like, video keno, video bingo, video pachinko, and various other video or reel-based games. In addition, casinos offer a variety of table games, such as poker, blackjack, craps, roulette, and the like. In many instances, the slot machines and table games are computerized or include electronic circuitry performing various functions (e.g., player tracking, game monitoring, and the like), and are connected via a networked gaming environment to a host computer and associated servers. The networking of gaming machines has provided additional gaming opportunities both directly generated within the gaming machine and from network based gaming programs.

Software programs provide gaming establishments with the ability to compile information about casino players, to monitor the status of games, and to provide promotions, bonuses, and rewards. Examples of promotions include advertisements and rewards, which serve as incentives for casino players to continue wagering and to return to the same establishment. These types of rewards and others are popular, and, there continues to be a need to develop creative methods and systems to provide various types of rewards to players.

SUMMARY

Briefly, and in general terms, various embodiments are directed to a method for tracking system generated jackpot amounts on a gaming machine in a casino gaming system, wherein a casino gaming server generates a system-based jackpot winning time and jackpot award value. The method includes: after the occurrence of a system generated jackpot, sending a message from a back end server to a gaming machine, wherein the message contains information including a winning jackpot amount and instructions for transferring a jackpot win amount from a host to a gaming machine; applying the jackpot amount to the game on the gaming machine; locking the gaming machine into a hand pay condition for the amount of the jackpot and require an employee to perform a jackpot reset on the gaming machine; incrementing an external attendant paid bonus win meter associated with the game once an attendant resets the gaming machine; and sending data containing the amount incremented on the meter.

Another embodiment discloses a method for tracking system generated consolation prize on a gaming machine. The method includes: identifying a qualifying player with at a gaming machine having an external attendant paid bonus win meter and an inserted player tracking card; sending a message from a back end server to a gaming machine having an inserted player tracking card; sending a message from the back end server to a controller board on the gaming machine having an inserted player tracking card, wherein the message includes information regarding a consolation prize amount and instructions for the controller board to transfer cashable winnings to the gaming machine, wherein the controller board uses a long poll command with a transfer code to transfer the cashable winnings to the gaming machine; forcing attendant pay lockup in response to receiving the instructions; and adding the consolation prize amount to the external attendant paid bonus win meter of the gaming machine.

Other features and advantages of the various embodiments will become apparent from the following detailed description when viewed in conjunction with the corresponding drawings.

BRIEF DESCRIPTION OF THE DRAWING

FIGS. 5A, 5B-1-2 and 5C-1-3 illustrate various examples of progressive parameter set-up screens;

FIG. 6A illustrates multiple "floor activity" tables that keep multiple floor activity of rolling and sorted tables;

FIG. 8 illustrates an eCash purchase screen where a player may transfers credits from one form to another, as well as additional personal account activity screens;

DETAILED DESCRIPTION

Figure 1:
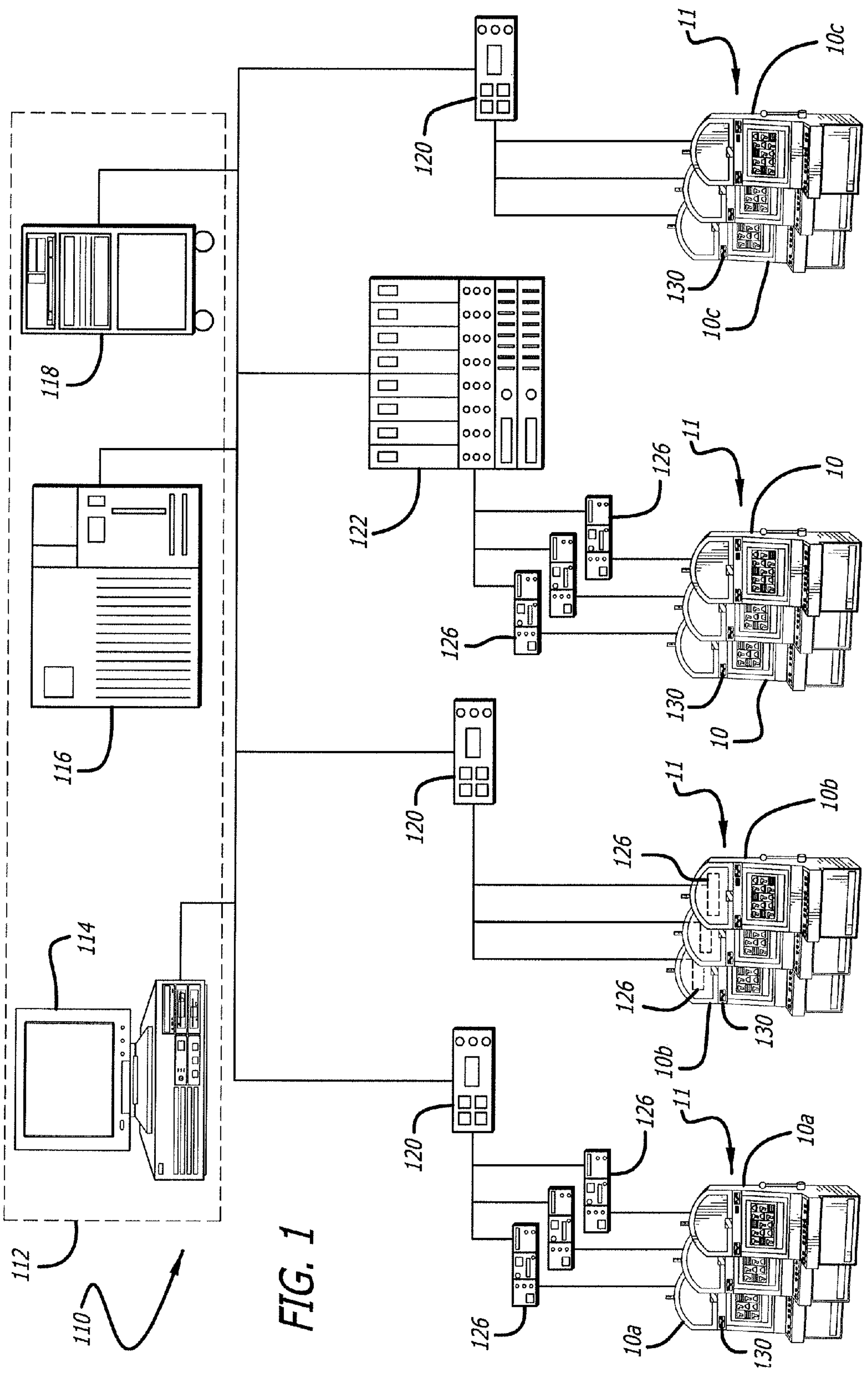
FIG. 1 illustrates a plurality of gaming machines in a gaming system that enables system-based gaming and awards, wherein each gaming machine is associated with a gaming machine-based external win meter.

A gaming machine-based system and method is disclosed herein for tracking system-based prizes awarded from a back-end server to one or more casino players at a gaming machine. More particularly, the system and method track system generated winnings awards at the gaming machine, wherein the amount of the winnings may be stored on the gaming machine memory. Various embodiments are directed to providing an external meter on a gaming machine for tracking a system generated bonus win. Referring now to the drawings, wherein like reference numerals denote like or corresponding parts throughout the drawings and, more particularly to FIGS. 1-2, there are shown various embodiments of a system and method for tracking system generated winnings awarded at a gaming machine.

Referring to FIG. 1, one example embodiment of a casino gaming system 110 is illustrated. The casino gaming system 110 comprises one or more gaming machines 10 operatively connected via a network to a back end server 112. The back end server 112 may be configured to comprise one or more servers. The type of server employed is generally determined by the platform and software requirements of the gaming system. In one example embodiment, as illustrated in FIG. 1, the back end server 112 is configured to include three servers: a casino floor controller 114, a casino management server 116 and a casino database 118. The casino floor controller 114 is a part of the player tracking system for gathering accounting, security and player specific information. The casino management server 116 and casino database 118 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end server 112 performs several fundamental functions. For example, the back end server 112 can collect data from the casino floor as communicated to it from other network components, and maintain the collected data in its database. The back end server 112 may use casino floor data to generate a report used in casino operation functions. Examples of such reports include, but are not limited to, accounting reports, security reports, and usage reports. The back end server 112 may also pass data to another server for other functions. Alternatively, the back end server 112 may pass data stored on its database to floor hardware for interaction with a game or game player. For example, data such as a game player's name or the amount of a ticket being redeemed at a game may be passed to the floor hardware. Additionally, the back end server 112 may comprise one or more data repositories for storing data. Examples of types of data stored in the system server data repositories include, but are not limited to, information relating to individual player play data, individual game accounting data, gaming machine accounting data, cashable ticket data, and sound data including optimum audio outputs for various casino settings.

Additionally, the back end server 112 may also include one or more additional systems to aid in the management of the casino system. For example, in one embodiment, the back end system includes a slot data system. The slot data system is an integrated system that continually monitors slot machines, other gaming devices, and customer activity. The primary function is slot accounting and player tracking data collection. In one embodiment, the slot data system is configured to operate on a dedicated server and can support up to 146 terminals or workstations.

In one embodiment, the back end server 112 includes a casino management system, which is a software product that provides a casino with the capability to manage casino player tracking, promotional, and accounting functions. Features include player tracking and analysis, table-game management, cage and credit, offer and event management, player club enrollment and redemption and comprehensive reports and data analysis.

In one embodiment, the back end server 112 includes a slot accounting system (SAS), which is a data collection and accounting package. The communication protocol used by this system is referred to as SAS.

In some embodiments, one or more protocols are used to communicate in the network. For example, and not by way of limitation, the network uses high-speed broadband communication and packetized protocol to communicate tournament data in the network. The protocol may comprise, for example, and not by way of limitation, Ethernet, TCP/IP, XML, SAS, SDS and G2S (Game to Server).

The network bridges 120 and network rack 122 are networking components used for networking, routing and polling gaming machines 10. In one embodiment, the gaming machines 10 are connected via a network to a network bridge 120, and the network bridge 120 connects to a back end server 112. Optionally, the gaming machines 10 may connect to the network via a network rack 122, which provides for a fewer number of connections to the back end server 112. Both network bridge 120 and network rack 122 may be classified as middleware, and facilitate communications between the back end server 112 and the gaming machines 10. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

Optionally, in another embodiment, gaming machines 10 may be connected to the back end server 112 via routers (not shown).

In one embodiment, game monitoring units (GMUs) 126 connect gaming machines 10 to networking components (e.g., network bridges, network racks, routers, etc). The GMUs may be installed within the gaming machine cabinet or may be located external to the gaming machine 10. In one embodiment, the GMU 126 is a separate component located outside the gaming machine 10*a*. Alternatively, in another embodiment, the GMU 126 is located within the gaming machine 10*b*. Optionally, in an alternative embodiment, one or more gaming devices 10*c* connect directly to a network and are not connected to a GMU 126.

GMU 126 is a device connected to the circuitry of a gaming machine 10 that monitors the game, coin status, player winnings, and/or the gaming machine. The GMU 126 sends the monitored information to a server on the back end server 112 for processing. Additionally, the GMU 126 may record gaming machine operations and transfer the information to the back end server 112. In some embodiments, the GMU may monitor the game, coin status, player winnings, and gaming machine and send the monitored information back to a particular dedicated server for processing. Those skilled in the art will appreciate that the functionality of the GMUs 126 may vary, and that the GMU 126 may be configured to perform additional tasks. Some GMUs 126 have much greater capability and can perform such tasks as presenting and playing a game using a display (not shown) operatively connected to the GMU 126.

The gaming machines 10 act as terminals for interacting with a casino player or game player playing a casino game on the gaming machine. In various embodiments, any of the gaming machines 10 may be any type of electronic or mechanical gaming devices, such as, but not limited to, a mechanical reel spinning slot machine, video slot machine, video poker machine, keno machine, video blackjack machine, or a gaming machine offering one or more of the above-described games. Examples include, but are not limited to, the 56000 mechanical reel spinner and the Alpha video slot machine from Bally Gaming.

Those skilled in the art will appreciate that the gaming machines 10 may include a variety of components. For example, the gaming machines 10 include a display area for presenting a game. In one embodiment the display is a viewing area that displays a plurality of mechanical reels for presenting a slot-style game. Alternately, in an optional embodiment the display is a video display for presenting one or more games such as, but not limited to, mechanical slots, video slots, video poker, video blackjack, video keno, video roulette, Class II bingo, games of skill, games of chance involving various levels of player skill, or any combination thereof.

Optionally, in some embodiments, the display is a video display such as, but not limited to, a CRT (cathode ray tube), or a thin-panel display. Examples of thin-panel displays include plasma, LCD (liquid crystal display), electroluminescent, vacuum fluorescent, field emission, LCOS (liquid crystal on silicon), and SXRD (Silicon Xtal Reflective display) or any other types of panel displays known or developed in the art. These flat panel displays may use panel technologies to provide digital quality images including by way of example only, and not by way of limitation, EDTV, HDTV, or DLP (Digital Light Processing). Additionally, the display may be mounted in the gaming cabinet in either a portrait or landscape orientation. Optionally, the display may also include a touch screen or touch glass system (not shown). The touch screen allows a user to input information. The touch screen may be used in place of mechanical buttons, or alternately the touch screen may be used to supplement other input devices, such as buttons.

The gaming machine 10 includes a main cabinet that is a self-standing unit that is generally rectangular in shape. Alternatively, in other embodiments, the gaming cabinet may be a slant-top gaming cabinet or any shaped cabinet known or developed in the art. However, any shaped cabinet may be used with any embodiment of the gaming machine 10 and sized for a player to be able to sit or stand while playing a game. Additionally, the cabinet may be manufactured with reinforced steel or other rigid materials that are resistant to tampering and vandalism.

The gaming machine 10 includes one or more input mechanisms. In one embodiment, the gaming machine 10 may include a plurality of player-activated buttons, which may be used for numerous functions such as, but not limited to, selecting a wager denomination, selecting a number of games to be played, selecting a wager amount per game, initiating a game, or cashing out money from the gaming machine 10. The buttons function as input mechanisms and may include mechanical buttons, electromechanical buttons or touch screen buttons. Optionally, a handle may also serve as an input mechanism. More particularly, the handle may be "pulled" by a player to initiate a game. Additionally, one or more of the player-activated buttons may be used as an interface mechanism in conjunction with the player selection of a denomination for a game linked to a progressive jackpot.

The gaming machine 10 may also include one or more speakers. Various types of audio may be output to the speakers. In addition to sound effects, flashing displays and/or lighted displays may also be included on the gaming machine to capture a player's interest.

In various embodiments, the gaming machine 10 shown may also include a ticket reader/ticket printer system that is associated with a cashless gaming system. The ticket reader includes a slot for accepting a reading tickets and/or vouchers. A printer is provided for printing out and/or issuing tickets. In one embodiment, the ticket reader of a cashless gaming system is capable of accepting previously printed vouchers, paper currency, promotional coupons, and the like. The ticket printer of the cashless gaming system generates vouchers having printed information that includes, but is not limited to, the value of the voucher (i.e., cash-out amount) and a barcode that identifies the voucher. In one embodiment, the ticket reader and ticket printer share the same slot. In an alternate embodiment, the ticket reader and ticket printer have separate slots.

In another embodiment, a bill acceptor is included, which is an assembly that examines currency or coupons and communicates the value to the machine. Accepted items register as credits, rejected items are returned to the player.

In one embodiment, one or more of the gaming machines 10 include a player tracking module operatively connected to the gaming machine. The player tracking module is part of a player tracking system that allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal playerage of players. For example, casinos may award or "comp" a player free meals, room accommodations, tickets to shows, and invitations to casino events and promotional affairs.

Typically, the player tracking system is operatively connected to one or more input components on the gaming machine 10. These input components include, but are not limited to, a card reader for receiving a player tracking card, a keypad or equivalent, an electronic button receptor, a touch screen and the like. The player tracking system may also include a database of all qualified players (i.e., those players who have enrolled in a player rating or point accruing program). Generally, the database for the player tracking system is separate from the gaming machines 10. In one embodiment, the player tracking system includes a player account server. Typically the player account server resides on the back end system. The player account server maintains a record of customer play. Additionally, the player account server may gather information related to a player, such as, but not limited to, account information, credits bonus, promotions, and the like. In an optional embodiment, the player tracking system includes software and accessories connected to gaming devices that allow for the identification of a player.

In one embodiment, the gaming machine 10 includes a card reader 20 that may be used to read player tracking cards. Additionally, the card reader may also read casino employee cards. Each time a card is inserted into the reader, it monitors and tracks player and employee activity.

Additionally, in one embodiment, the player tracking module may also include a game monitoring unit (GMU) and an additional user interface. In one embodiment, the additional user interface is an IVIEW interface (available from Bally Gaming, Inc. of Las Vegas Nev.), which serves as an additional user interface. In one embodiment, the IVIEW interface includes a web content capable display screen and an embedded processor.

In one embodiment, each gaming machine includes one or more meters on the gaming machine to capture and maintain accounting data. Generally, a meter is an ever-increasing register that maintains a count in a gaming machine. Once a meter reaches its rollover point, it resets to zero. Meters track events such as, Coin In, Coin Out, Coin Drop, and handle pulls. The Coin In meter monitors and counts the value of all wagers received by the gaming machine for the particular game associated with the meter. The Coin Out meter monitors and counts the value of all winnings paid out by the gaming machine for the particular game. An External Attendant Paid Bonus Win meter 130 monitors and counts the value of all attendant paid winnings for the particular game. Typically, if a win exceeds a certain amount, the payout to the player is distributed by an attendant rather than by the gaming machine.

Additionally, in some embodiments, the gaming machine may include one or more progressive-type games. In a progressive-type game, each game wager contributes to a total progressive value, and this value is "won" by a player when a specified combination of symbols appears as a result of game play. Generally, in a progressive-type game, progressive wins are accounted for in lieu of a coin out win. In one embodiment including a progressive gaming scheme, the accounting system includes a machine paid progressive meter and an attendant paid progressive meter. The machine paid progressive meter monitors the progressive win values paid out for a progressive game. Additionally, the attendant paid progressive meter monitors and counts the value of all winnings from a particular progressive game paid out.

In one embodiment, there are a set of meters in the GMU that serve a function similar to those in the gaming machine. The GMU meter is typically meter data not directly available from the game. Meters from the game are commonly called hard meters while the GMU meters are usually referred to as soft meters. In one embodiment, meters maintain accounting information, game play or other systems events. In one embodiment, meters are maintained in a special area of memory that is non-volatile. This is done so that in the case of unexpected power failure, the current meter values will not be lost. Player terminals meters are maintained by each player terminal and keep track of ticket transaction summaries, game play summaries, cash transaction summaries, and other essential accounting information.

As shown in FIG. 1, in one embodiment, one or more gaming machines 10 include an External Attendant Paid Bonus Win meter 130. More particularly, when the casino gaming system generates a jackpot, and awards the jackpot to a player at a gaming machine 10, the amount of the winning jackpot is recorded on the External Attendant Paid Bonus Win meter 130. Otherwise stated, the system-based jackpot is awarded to a player at a gaming machine, and the amount of the winning jackpot is recorded on a gaming machine-based meter. The player may be randomly determined. Additionally, the trigger for awarding the jackpot may be randomly determined based on predetermined criteria set by the casino or gaming system manufacturer. Once the jackpot win occurs, the player at the selected gaming machine is notified, usually by a visible sign or message. In one embodiment, the amount of the jackpot win (or bonus win) is recorded on the External Attendant Paid Bonus Win meter 130.

Figure 2:
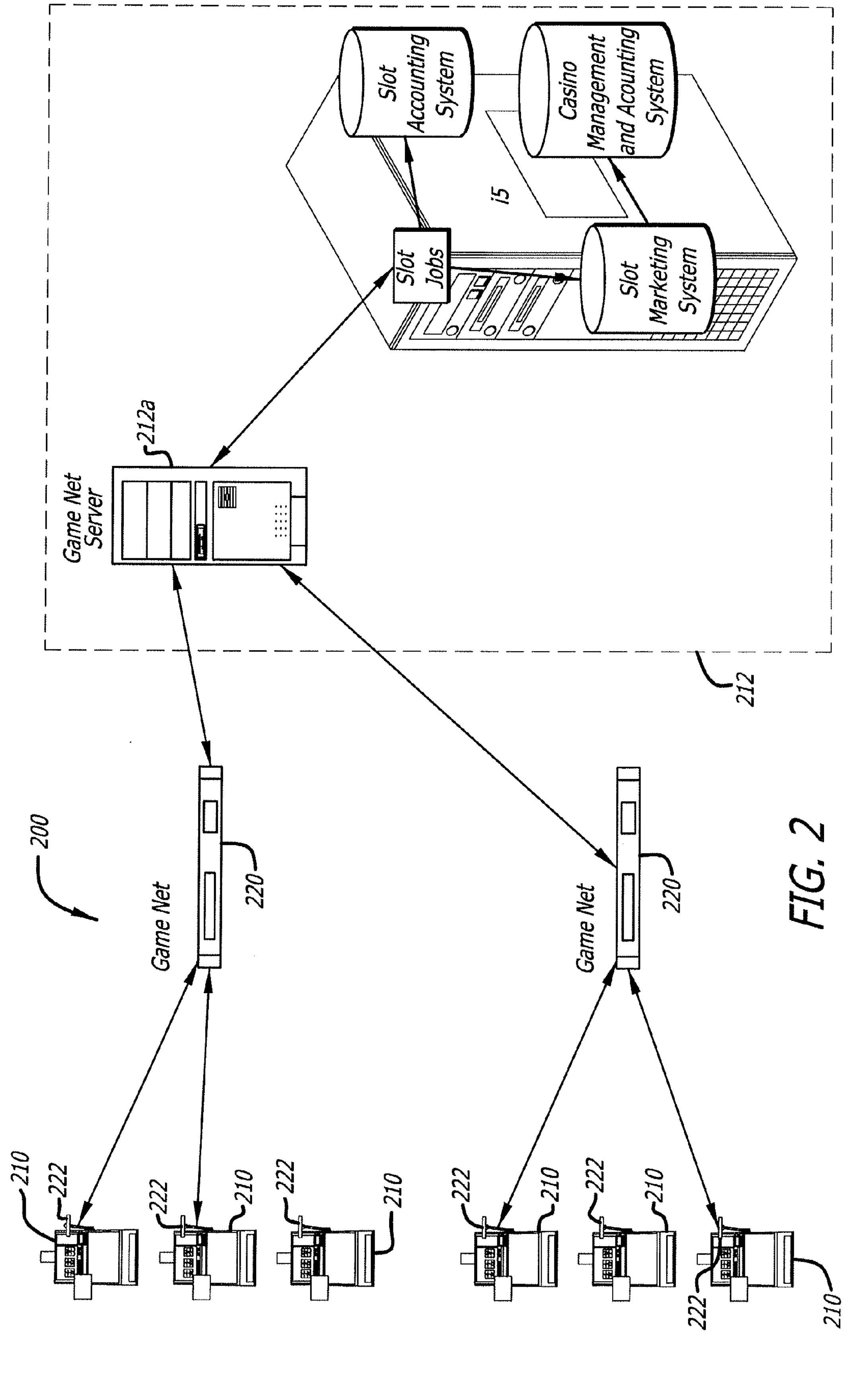
FIG. 2 illustrates a main game panel on a player console at various stages of game play of a game in accordance with one or more embodiments.

Referring now to FIG. 2, a casino gaming system 200 is illustrated. The casino gaming system 200 includes multiple gaming machines 210 connected via a network to a back end system 212. In one embodiment, a router 220 connects the gaming machines 210 to the back end system 212. In one particular embodiment, the router 220 is a GameNet router that routes information from the GMU in each gaming machine 210 to a Game Net Server 212*a*, which is part of the back end system 212. In one such embodiment, the back end system 212 also includes the iSERIES server (i.e., IBM iSERIES server), which includes a slot accounting system, a slot marketing system and a casino management and accounting system. Those skilled in the art will appreciate that other components may be included in the back end system 212.

In one embodiment, the casino gaming system 210 includes a system generated jackpot awarded to players on the casino floor. The jackpot may be a time and value based award that is funded by marketing dollars and is paid to the winning player who has a player tracking card inserted into a gaming machine at the time the winning value is selected. In one embodiment, the award is available to all players based on the grouping of the specific settings, which may include all gaming machine on the casino floor. Alternately, the casino may restrict the grouping to a specific number of gaming machines by gaming machine denomination(s), and/or by gaming machine manufacturer(s) and/or by gaming machine zone(s), or a set of specific asset (gaming machine) numbers. Those skilled in the art will appreciate that the jackpot award may be funded by a means other than marketing dollars.

In one embodiment, the casino operator determines the criteria for triggering the jackpot award. For example, in one embodiment, the casino operator enters an average jackpot win amount, an average award time and an average reset time. The actual award grows from the reset value towards the desired value. The progressive growth is not linked to a wagering activity on the casino floor. At a random time during the progressive growth the award is triggered. At the award time, the actual value is stopped from growing and further and is randomly awarded out the floor.

In general, once a jackpot win occurs, the back end system 212 delivers a message to the gaming machine 210 regarding the awarded jackpot win. In one embodiment, the value of a system generated jackpot is recorded on a game External Attendant Paid Bonus Win meter 130. Additionally, in an optional embodiment the casino gaming system may also award consolation prizes to those players who do not win the jackpot. In this embodiment, the back end system 212 sends consolation information to the qualifying gaming machines. The value of the consolation prizes may be recorded on the game External Attendant Paid Bonus Win meter 130. Further, in an alternate embodiment, the back end system 212 can send instructions to lock up a gaming machine 210 upon the occurrence of a system generated jackpot win.

More particularly, upon the occurrence of jackpot win, the back end system 212 sends information to a controller located on a gaming machine 210. The controller causes an External Attendant Paid Bonus Win meter 130 at the gaming machine to keep track of winning jackpots generated by the back end system and award at the gaming machine 210.

In one embodiment, a controller 222 located on the gaming machine receives a message from the back end system 212 regarding a system generated winning jackpot. More particularly, in one embodiment, the controller 222 is a NT controller board that is modified to accept transactions from the back end system 212. Optionally, in an alternate embodiment, the NT controller board is modified to accept transactions from the iSERIES server, which is a back end system main frame.

In one example, a transaction received from the back end system 212 includes information containing the value of the winning jackpot amount. After receiving the information containing the jackpot win amount from the back end system, the NT controller board will transfer the jackpot winnings to the game. More particularly, in one example embodiment, the NT controller board will use the SAS AFT Long Poll command 0x72 with a transfer type code 11 (e.g., to transfer bonus jackpot win amount from host to gaming machine and force attendant pay lockup) to transfer the cashable winnings to the game. This will cause the gaming machine 210 to lock itself up into a hand pay condition for the amount of the jackpot and will require an employee to perform a jackpot reset on the gaming machine. Once the attendant resets the game, the game's External Attendant Paid Bonus Win meter 130 will increment for the amount of the jackpot, and send a message to the NT controller board detailing the amount of the meter 130 incrementation. This information is then passed on to the back end system 212 by the NT controller board.

Additionally, the NT controller board may also accept a transaction from the back end system 212 including information containing the value of a consolation prize. More particularly, in one embodiment, after the system generates and awards a jackpot, the system may also award consolation prizes to one or more players. Typically, the consolation prizes are given to players who meet certain criteria. Those skilled in the art will appreciate that the criteria may be configured by the manufacturer and/or the casino. For example, in one embodiment, a player is eligible for a consolation prize if he has a player card inserted in a qualified gaming machine and game play is activated on the qualified gaming machine at the time of the jackpot occurrence. The back end system 212 identifies the casino players who qualify for a consolation prize, and transfer a consolation prize amount to a consolation account which is accessible to each qualifying player via a user interface. In one embodiment, each qualifying player may access the account via the iView. Alternately, the qualifying player may access the consolation account via a standard keyboard.

Once a qualifying player is identified, the back end server system sends a message to each gaming machine having an inserted player tracking card. More particularly, the back end system 212 sends a message to the NT controller board on the gaming machine 210, wherein the message includes information regarding the consolation prize amount along with instructions for the NT controller board to transfer cashable winnings to the game. In one example embodiment, the NT Controller Board, uses the SAS AFT Long Poll command 0x72 with a transfer type code 10 (transfer bonus coin out win amount from host to gaming machine) to transfer the Cashable winnings to the game. Upon receiving the instructions, the game will add the amount of the consolation prize to an External Attendant Paid Bonus Win meter 130. Once the credits are applied to the game, the game's External Machine Paid Bonus Win meter 130 will increment for that amount. Further, once the game increments the External Machine Paid Bonus Win meter 130, the NT controller board receives information from the game that the meter 130 has been incremented. Additionally, the NT controller board will, in turn, pass the meter incrementation information along to the back end system 212.

In an alternate embodiment, the NT controller board may also validate a player's PIN. Optionally, in another embodiment, the validation process may be carried out via another component of the casino system.

In one embodiment, the External Attendant Paid Bonus Win meter 130 tracks taxable events occurring at each gaming machine. The External Attendant Paid Bonus Win meter 130 is incremented at the gaming machine and nothing is given to the players. Otherwise stated, the system generates a jackpot award and sends a message which causes the meter 130 at the gaming machine to be incremented for the amount of the award. This places the winnings into the gaming machines memory as required by certain jurisdictions. However, the money is not usable on the gaming machine.

The following embodiment illustrates the task of applying a system generated jackpot win amount to a game in a casino gaming system. Initially, an NT controller board code is modified to have a new compile option LEB that performs the following operations. First, the existing asset specific 212 transaction is received from the system that contains the value of a server-based jackpot (e.g., a Power Winners jackpot). Second, the NT controller board uses an SAS AFT command with the following parameters to apply the jackpot amount to the game as an "External Attendant Paid Bonus Win."

| | |
|---|---|
| Transfer Type | 11 (Transfer bonus win amount from host to gaming machine ‘Force Handy Pay Condition’) |
| Cashable Amount | Amount of the Power Winners Jackpot |

The game then locks itself up into a hand pay condition for the amount and needs an employee jackpot reset. Once this lock-up occurs, the External Attendant for the game and the system is dispatched. Paid Bonus Win meter records the amount. The NT control board then reports the result of the transfer to the system. There is no Slot Jackpot Transaction 30, Jackpot Request 32, or Jackpot Reset 40 Transaction associated with this process.

Regarding Gamenet tasks, the Gamenet passes the new transaction to the iSERIES server. The iSERIES server then generates a report that justifies the power winner jackpot amount to the meter on the machine. Additionally, information that is added to the end of the 212 Power Winner Transaction.

Transaction ID 212, Download Winners Marketing Values to an Asset or all Assets, (SMS Transaction)

POS. 01=STAD, 1 byte binary.

POS. 02=TRIO, 1 byte binary value 212.

POS. 03-04=2 byte binary value of asset number, 0 send to all.

POS. 05-29=25 bytes ASCII, description. POS. 30-33=4 bytes binary, whole dollars.

POS. 34-35=2 bytes binary, show number.

POS. 36-65=30 bytes ASCII, Winners Name.

POS. 66-67=2 bytes binary value of WINNING asset number.

POS. 68-68=1 byte binary, display type, O=ALL assets, 1=Only Asset with card-in, 2=Assets without card-in.

POS. 69-76=8 bytes ASCII value of Progressive Engine ID.

Requirements:

SMS_NT.HEX. 10820 wi_EB and _LM (Big Meters) GEARBOX.EXE.1060 GNS.EXE.2015

ISERIES.318

Transactions:

SMS Transactions Layout from NT to Gamenet in Big Meter Format

| Transaction ID | Subcode | Transaction Description |
|---|---|---|
| 257 | 000 R | EXTERNAL BONUS SUCESSFUL |
| 257 | 001 R | EXTERNAL BONUS NOT AVAILABLE |
| 257 | 003 R | WRONG AMOUNT (between NT and MPU) |
| 257 | 004 R | NOGAMEACK |
| 257 | 005 R | NO CONFIRM |
| 257 | 006 R | NOCOMMTILT |
| 257 | 007 R | RESET DURING TRANSFER |
| 257 | 008 R | PREVIOUS TRANSFER ABORTED |
| 257 | 012 R | MPU IN INVALID STATE |
| 257 | 128 R | TRANSFER CANCELLED BY HOST |
| 257 | 129 R | TRANSFER ID SAME AS PRIOR |
| 257 | 130 R | INVALID TRANSFER FUNCTION |
| 257 | 131 R | INVALID AMOUNT OR EXPIRATION |
| 257 | 132 R | AMOUNT EXCEED TRANSFER LIMIT |
| 257 | 133 R | AMT NOT MULTIPLE OF DENOMINAT |
| 257 | 134 R | PARTIAL TRANSFER NOT ALLOWED |
| 257 | 135 R | GAME CAN APPLY AT THIS TIME |
| 257 | 136 R | GAME CAN NOT APPLY DEBITS |
| 257 | 137 R | REGISTRATION KEY DOSEN’T MATCH |
| 257 | 138 R | NO POS ID (FOR DEBIT TRANSFER) |
| 257 | 139 R | NO WON CREDITS TO CASHOUT |
| 257 | 140 R | GAME DENOMINATION NOT SET |
| 257 | 141 R | EXPIRE NOT VALID FOR TICKET |
| 257 | 142 R | TRANSFER TO TICKET UNAVAILABLE |
| 257 | 143 R | RESTRICT. UNABLE TO TRANSFER |
| 257 | 144 R | UNABLE TO PRINT RECEIPT |
| 257 | 145 R | NO DATA TO PRINT RECEIPT |
| 257 | 146 R | RECEIPT NOT ALLOWED FOR TYPE |

-continued

| Transaction ID | Subcode | Transaction Description |
|---|---|---|
| 257 | 147 R | INVALID ASSET NUMBER |
| 257 | 148 R | GAME NOT LOCKED, REQUIRED |
| 257 | 149 R | TRANSACTION ID INVALID |
| 257 | 159 R | UNEXPECTED ERROR |
| 257 | 192 R | CURRENT TRANSFER IN PROGRESS |
| 257 | 193 R | UNSUPPORTED TRANSFER CODE |
| 257 | 255 R | TRANSFER INFO UNAVAILABLE |

Transaction #257 External Bonus Power Winner

| | | |
|---|---|---|
| Withdraw Amount | 804-811 8 | 8 bytes binary |
| Subcode | 812-812 1 | 1 byte |
| binary Sequence Number | 813-8142 | 2 |
| bytes binary Player Account | 815-8239 | 9 bytes Ascii |
| Casino ID | 824-8252 | 2 bytes Ascii |
| Spare | 826-826 1 | 1 byte |
| binary Suffix | 827-8282 | 2 |
| bytes Ascii Corp ID | 829-829 1 | 1 byte |
| Ascii Prop ID | 830-830 1 | 1 byte |
| ASCII Progressive Engine ID | 831-838 8 | |

Alternatively, another embodiment illustrates performing the task of applying a system generated consolation prize to a game in a casino gaming system. In this embodiment, a game such as Power Winners is set up to award a consolation prize to all players that had their cards inserted into a gaming machine but did not win the big prize. Additionally, the iSERIES server sets a new bit that instructs the NT controller to send an external bonus command to the machine.

POS. 14=PROMO key, 1 byte ASCII, bits allow options.

Bit 0=Use External Bonus Command

Bit 1-5=unused.

Bit 6=allow player to request “Mounds-Of-Money” values, under PROMO key.

Bit 7=allow PROMO key.

As described above, the iSERIES server has a report that justifies the power winner consolation amount transferred to the meter step on the machine. Additionally, the iSERIES server has to deduct the win amount in the 257 to the consolation balance for the player. For example, if the consolation prize was $50.00 and the player only withdraws $25.00. $25.00 should still be available in the player’s account.

Regarding NT tasks, if the compile option LEB is included in the build, then the NT Controller Board code is modified to perform the following operations when activated in the 151 transaction:

(1) The existing asset specific 151 transaction is received from the system that contains the value of the Power Winner Consolation Prize.

(2) The player will access their money through the Power Rewards button on iVIEW, or the PROMO button on the keypad.

(3) If a PIN is required, the NT will validate the PIN.

(4) The NT Controller Board will use the SAS AFT Command with the following parameters to apply the consolation amount to the game as an “External Machine Paid Bonus Win.”

| | |
|---|---|
| Transfer Type | 10 (Transfer bonus coin out win amount from host to gaming machine) |
| Cashable Amount | Amount of the Power Winners Jackpot |

The game adds the consolation prize to the credit meter. Once the consolation prize is added to the meter, the External Machine Paid Bonus Win meter 130 for the game and the system are incremented for the amount. The NT reports the result of the transfer to the system in a 257 transaction with New Type field.

0=Big Prize

1=Consolation

Transaction #257 External Bonus Power Winner

| | | |
|---|---|---|
| Type | 839-839 1 | 1 byte binary |

0=Big Prize

1=Consolation Prize

Gamenet Tasks:

The Gamenet will pass the new transaction to the iSERIES server.

Requirements:

SMS_NT.HEX.I0821 wi_EB (External Bonus) and _LM (Big Meters)

GEARBOX.EXE.I060

ISERIES.318

Transactions:

SMS Transactions Layout from NT to Gamenet in Big Meter Format

| Transaction ID | Subcode | Transaction Description |
|---|---|---|
| 257 | 000 R | EXTERNAL BONUS SUCCESSFUL |
| 257 | 001 R | EXTERNAL BONUS NOT AVAILABLE |
| 257 | 003 R | WRONG AMOUNT (between NT and MPU) |
| 257 | 004 R | NOGAMEACK |
| 257 | 005 R | NO CONFIRM |
| 257 | 006 R | NOCOMMTILT |
| 257 | 007 R | RESET DURING TRANSFER |
| 257 | 008 R | PREVIOUS TRANSFER ABORTED |
| 257 | 012 R | MPU IN INVALID STATE |
| 257 | 128 R | TRANSFER CANCELLED BY HOST |
| 257 | 129 R | TRANSFER ID SAME AS PRIOR |
| 257 | 130 R | INVALID TRANSFER FUNCTION |
| 257 | 131 R | INVALID AMOUNT OR EXPIRATION |
| 257 | 132 R | AMOUNT EXCEED TRANSFER LIMIT |
| 257 | 133 R | AMT NOT MULTIPLE OF DENOMINAT |
| 257 | 134 R | PARTIAL TRANSFER NOT ALLOWED |
| 257 | 135 R | GAME CAN APPLY AT THIS TIME |
| 257 | 136 R | GAME CAN NOT APPLY DEBITS |
| 257 | 137 R | REGISTRATION KEY DOESN'T MATCH |
| 257 | 138 R | NO POS ID (FOR DEBIT TRANSFER) |
| 257 | 139 R | NO WON CREDITS TO CASH OUT |
| 257 | 140 R | GAME DENOMINATION NOT SET |
| 257 | 141 R | EXPIRE NOT VALID FOR TICKET |
| 257 | 142 R | TRANSFER TO TICKET UNAVAILABLE |
| 257 | 143 R | RESTRICT, UNABLE TO TRANSFER |
| 257 | 144 R | UNABLE TO PRINT RECEIPT |
| 257 | 145 R | NO DATA TO PRINT RECEIPT |
| 257 | 146 R | RECEIPT NOT ALLOWED FOR TYPE |
| 257 | 147 R | INVALID ASSET NUMBER |
| 257 | 148 R | GAME NOT LOCKED, REQUIRED |
| 257 | 149 R | TRANSACTION ID INVALID |
| 257 | 159 R | UNEXPECTED ERROR |
| 257 | 192 R | CURRENT TRANSFER IN PROGRESS |
| 257 | 193 R | UNSUPPORTED TRANSFER CODE |
| 257 | 255 R | TRANSFER INFO, UNAVAILABLE |

Transaction #257 External Bonus Power Winner

| | | |
|---|---|---|
| Withdraw Amount | 804-811 8 | 8 bytes binary |
| Subcode | 812-812 1 | 1 byte |
| binary Sequence Number | 813-814 2 | 2 bytes binary |
| Player Account | 815-823 9 | 9 bytes Ascii |
| Casino ID | 824-825 2 | 2 bytes Ascii |
| Spare | 826-826 1 | 1 byte |
| binary Suffix | 827-828 2 | 2 |
| bytes ASCII Corp ID | 829-829 1 | 1 byte |
| ASCII Prop ID | 830-830 1 | 1 byte |
| ASCII Progressive Engine ID | 831-838 8 | 8 bytes ASCII |

One embodiment of the above-described, progressive game and method, configured in accordance with the claimed invention is implemented over a gaming system on a system game user interface of a gaming machine. The gaming system includes one or more gaming machines that are connected to a system server, preferably over a network. The system game user interface utilized by the time-based progressive game and method provides enhanced player satisfaction and excitement through player competition (or perceived competition) and additional opportunities to "win," which results in increased user playing time on games in the system.

Figure 3:
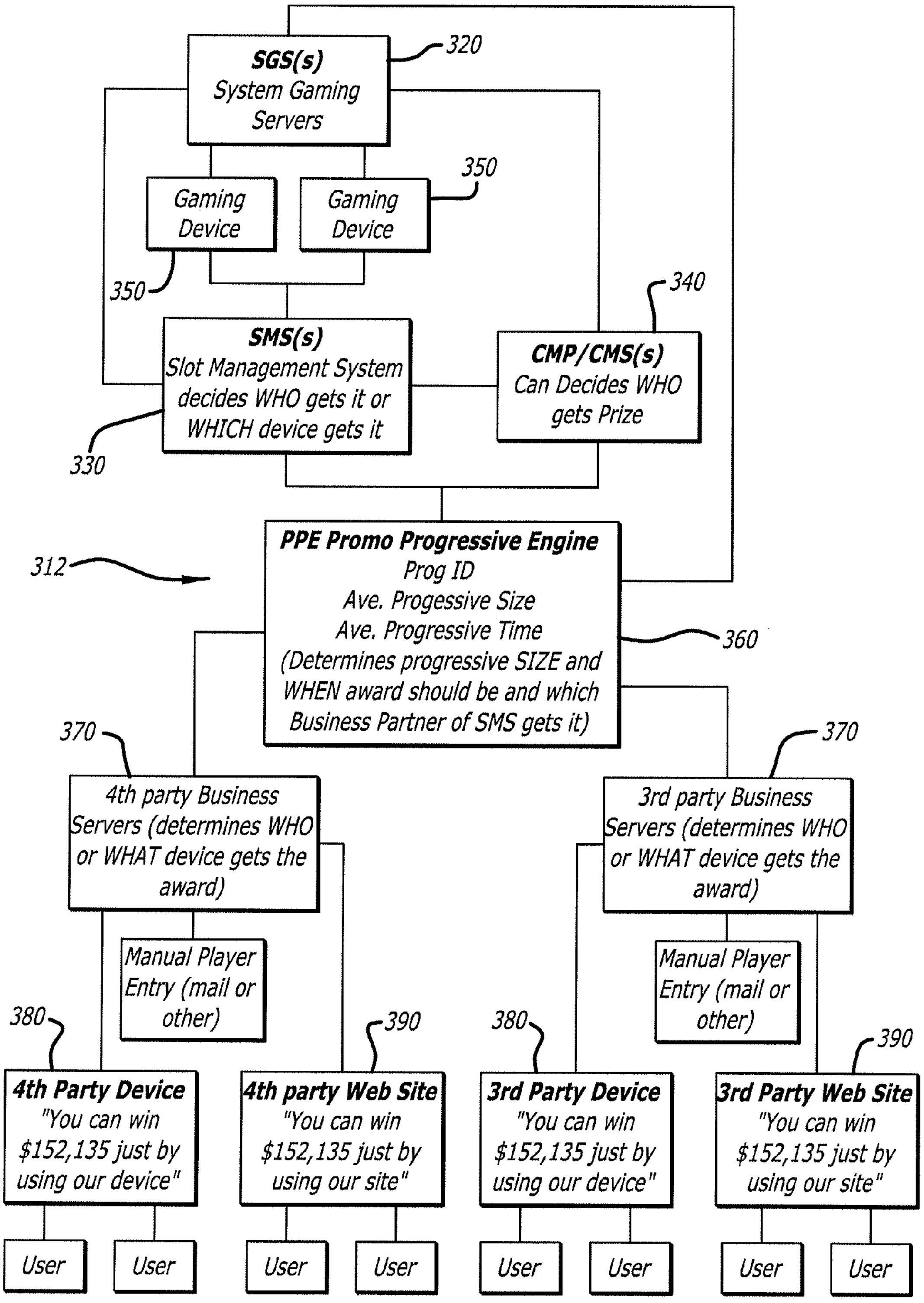
FIG. 3 illustrates a relational diagram of a progressive processing system, configured in accordance with the claimed invention, interconnected with associated servers and devices.
Figures 1, 4A:
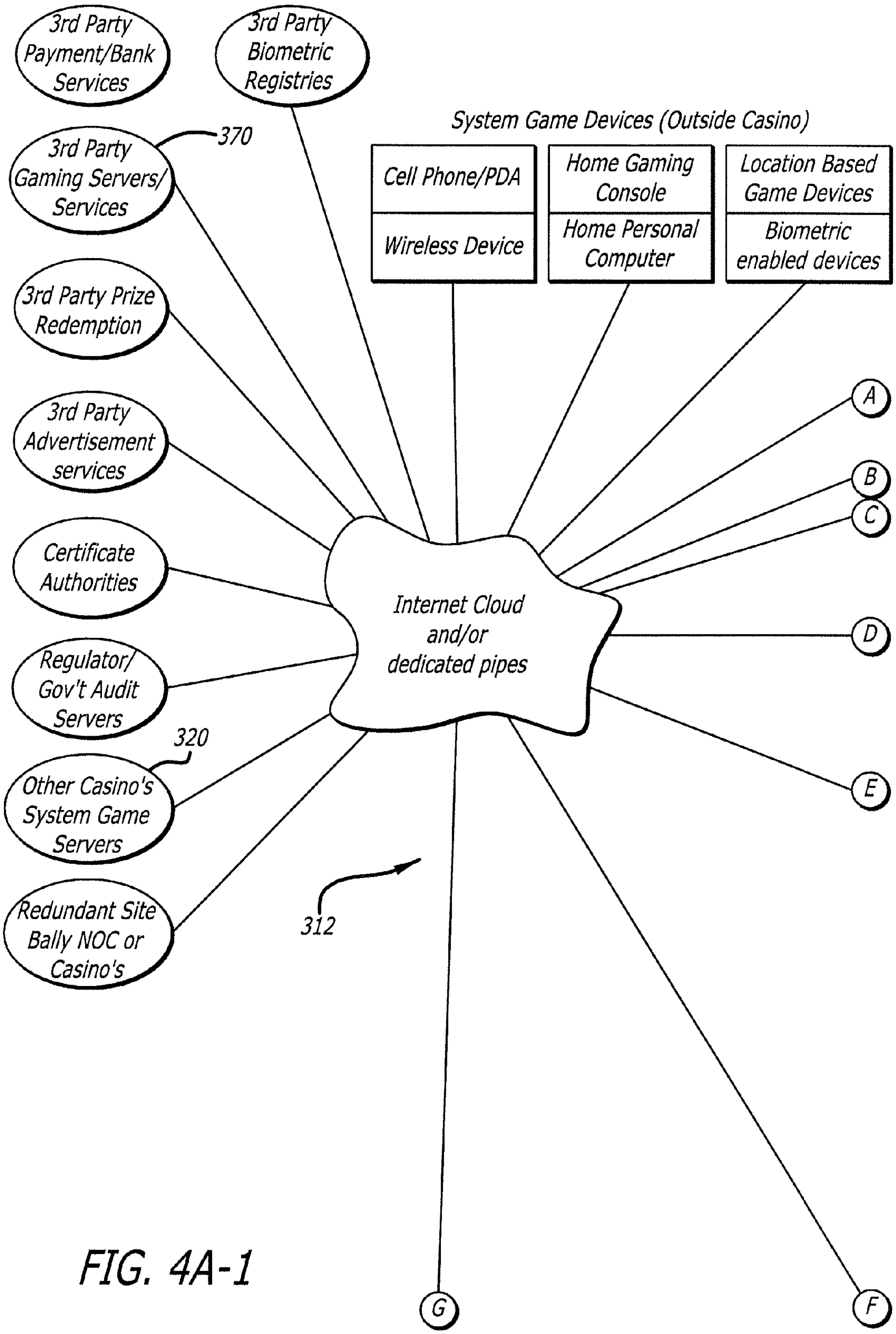
FIG. 4A illustrates a relational diagram of a progressive processing system, interconnected with associated servers, devices, components, services, and the Internet.
Figures 2, 4A:
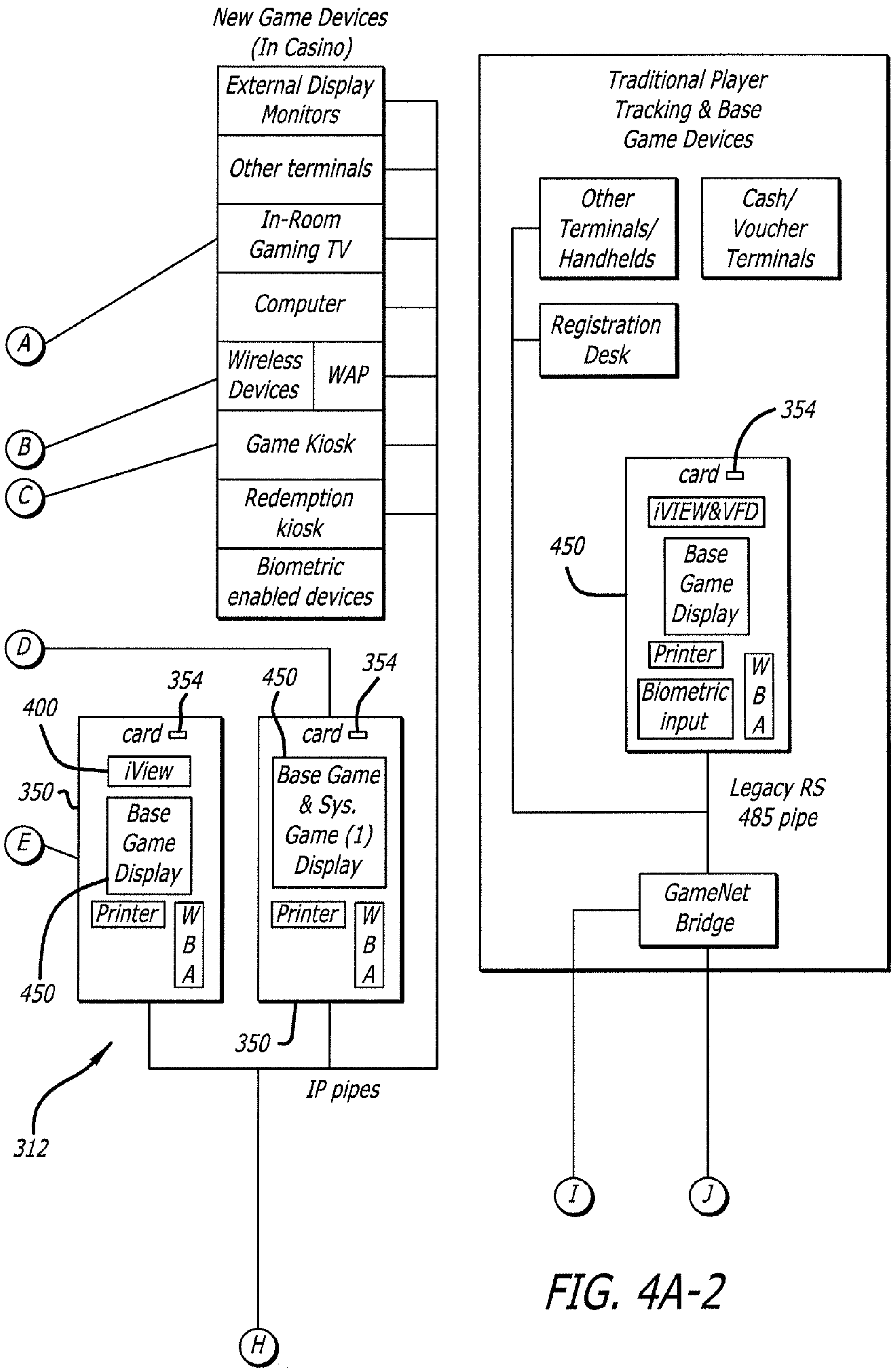
Figures 3, 4A:
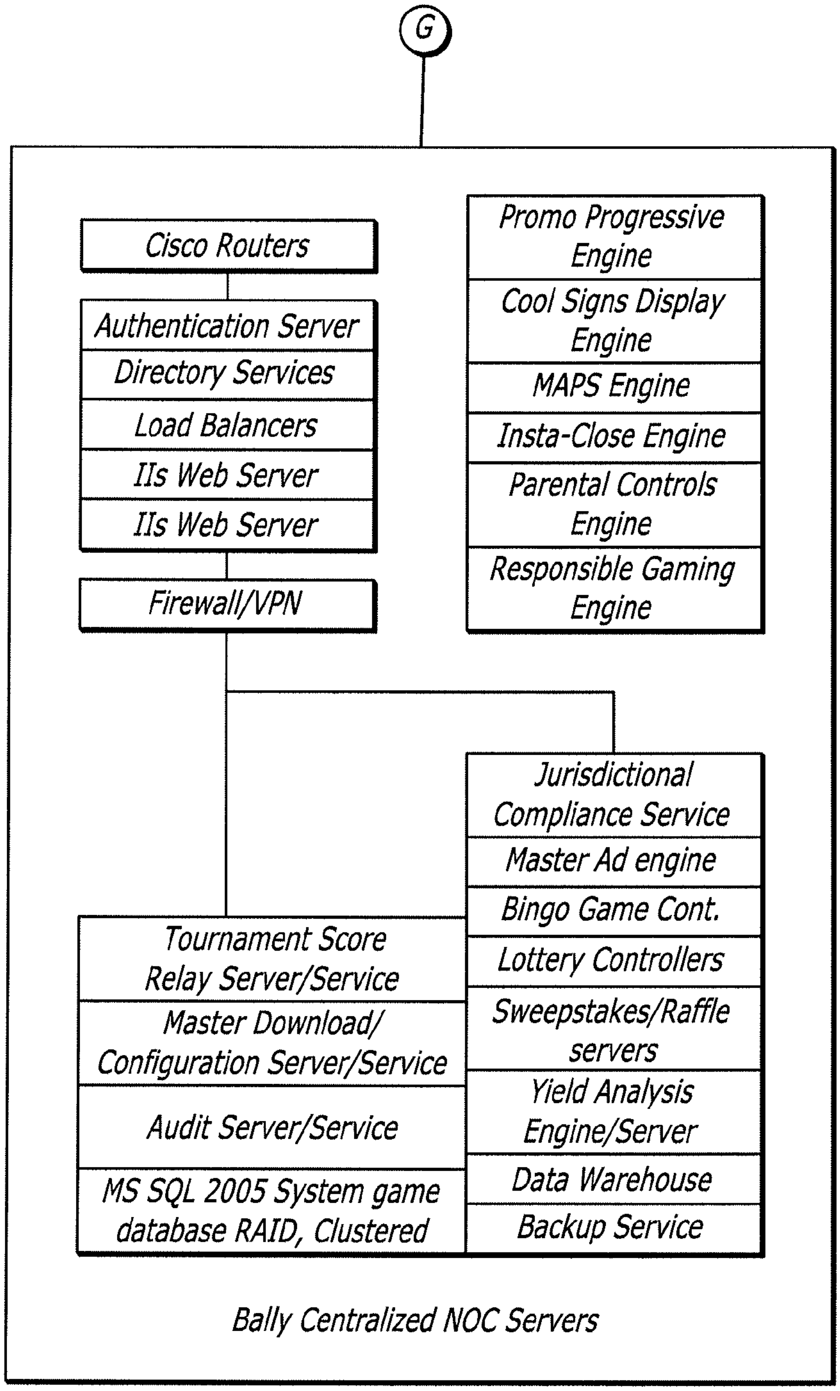
Figures 4, 4A:
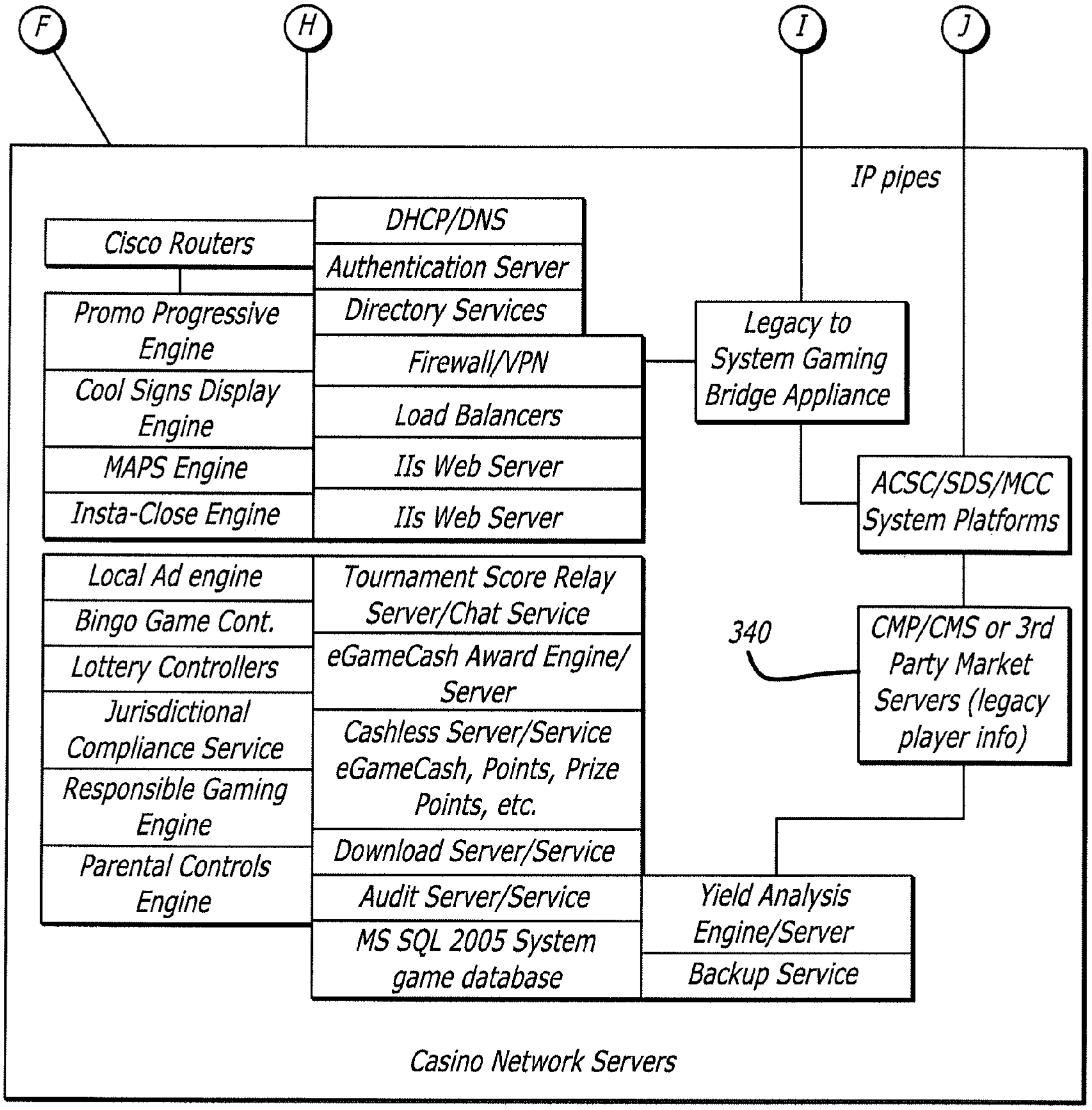
Figure 4B:
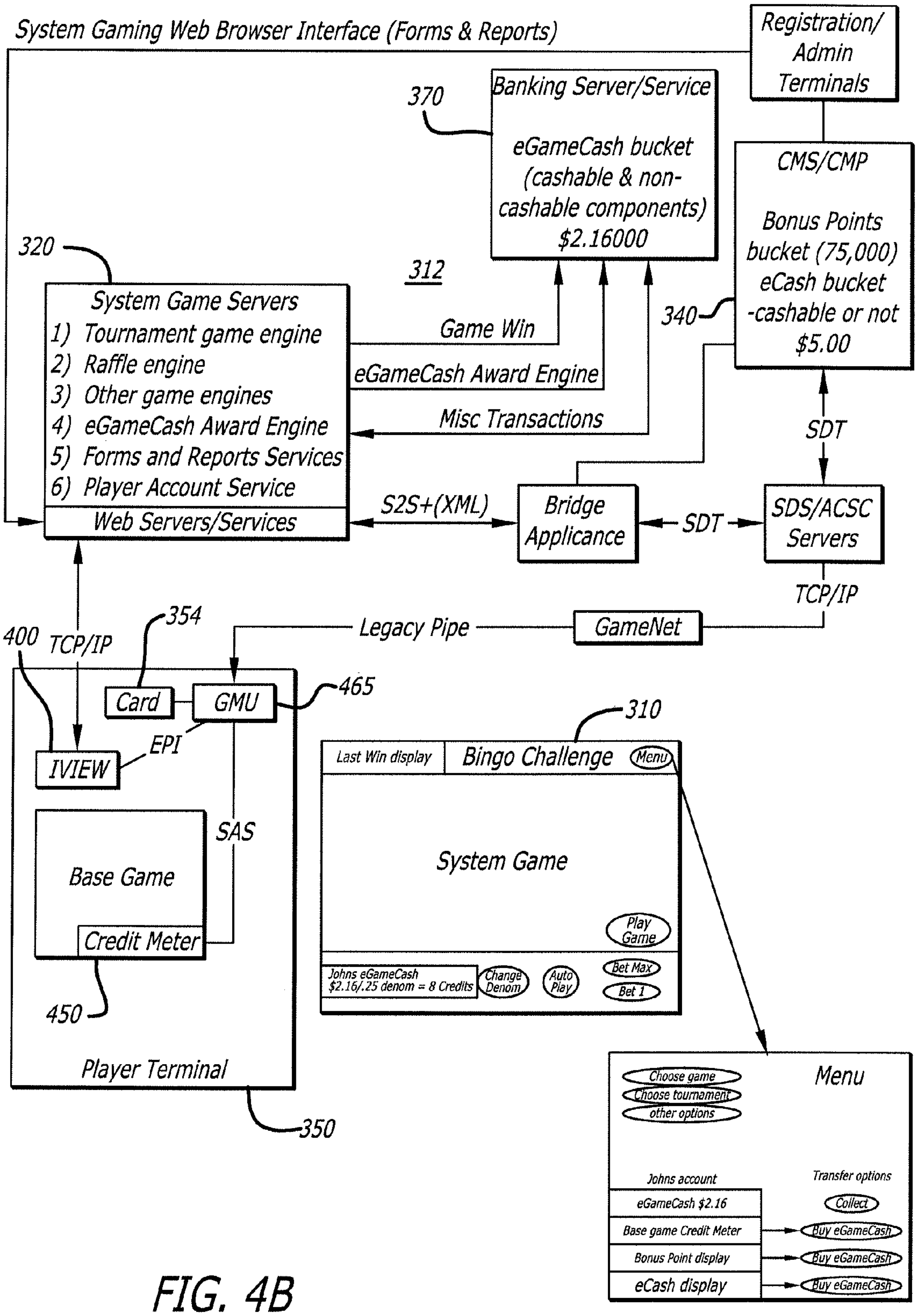
FIG. 4B illustrates a relational diagram of a progressive processing system, interconnected with associated servers, devices, components, services, display screens, and menus.

Referring now to the drawings, wherein like reference numerals denote like or corresponding components throughout the drawings and, more particularly to FIGS. 3, 4A, and 4B, there is shown an embodiment of a progressive game 310 implemented on a progressive processing system 312. Specifically, FIG. 4 shows a time-based progressive game 310 implemented on a progressive processing system 312 that includes system gaming servers 320, a slot management system 330, a casino management system 340, gaming machines 350, a progressive engine 360, 3rd and 4th party business servers 370, and 3rd and 4th party devices 380 and web sites 390. In one preferred embodiment, the time-based progressive game 310 is a promotional game, in that it is funded using non-wagered dollars. The time-based progressive game 310 is preferably customizable, enabling gaming parameters of the time-based progressive game to be controlled by casino administrators that implement and manage the game.

Specifically, a casino that employs a preferred embodiment of the progressive game 310 is able to select the targeted progressive prize size and targeted progressive prize length of time until the award is given. This affords casino administrators a much greater (and desirable) amount of control, in contrast to typical progressive games that are usually driven by components such as "coin in" to the gaming machines in the system, which are not controlled by the casino. Furthermore, in a preferred embodiment of a progressive game 310, casino administrators are also able to customize the shape of the "payout curve" (i.e., the curve of progressive prize size versus time at which the progressive prize is paid out). This as well is a highly desirable degree of control that is achievable in a preferred embodiment of a progressive game 310. This payout curve increases the desired excitement and anticipation of the players for the specific progressive game.

In a preferred embodiment of the progressive game 310, the casino administrators typically control (1) the targeted length of time at which each progressive prize is to be won, (2) the targeted progressive prize value in dollars, (3) the "enticement factors," if any, that are used to help increase player excitement and/or control of the "payout curve," and (4) the progressive prize reset value. Correspondingly, in a preferred embodiment of the progressive game 310, the progressive processing system 312 typically controls the remaining factors of the progressive game, including by way of example only, and not by way of limitation: (1) the targeted increment rate of the progressive prize, which is calculated using the targeted progressive prize value, the targeted progressive prize time, and any added "enticement" factors; (2) the random number generation algorithm used to determine if there will be a progressive prize winner; and (3) if a progressive prize is to be awarded, the random number generation algorithm used to determine who the award winner will be.

In another preferred embodiment of the progressive game 310, the player selection may not use a random number generator at all. For instance, by way of example only, and not by way of limitation, the slot management system (SMS) may pick the person with the longest current play session, the person with the most money played, the person who lost or won the most money in the last fifteen minutes, the first person to insert a player card into a gaming device at the start of the last fifteen minute period, or any other identifiable selection criteria.

The progressive game 310 includes several desirable characteristics. For example, in a preferred embodiment of the progressive game 310, the player has the opportunity to win a progressive prize from the very beginning of the promotional progressive game cycle. Additionally, in a preferred embodiment of the progressive game 310, the progressive prize growth rate is not directly linked to the wagered "coin in" of floor play (i.e., "coin in" from participating gaming machines does not directly contribute to the progressive prize growth). However, the progressive prize can be indirectly (or partially) linked, if desired, with activity on the gaming floor using an "enticement factor," as described in further detail below. Such an enticement factor can create a casino-moderated "ebb and flow" in response to gaming activity, if the casino so desires.

In some preferred embodiments, the progressive game 310 uses one or more various "enticement" factors that speed up and/or slow down the incremental growth rate of the targeted progressive prize. In one preferred embodiment, one such "enticement" factor (referred to herein as a "floor activity enticement factor") is based on gaming activity on the floor. In an additional preferred embodiment, another such "enticement" factor (referred to herein as an "erratic movement enticement factor") provides the addition of randomized movement to the incremental growth rate, which gives the progressive increment rate a desirable "look and feel" (i.e., makes the players feel like "something is happening" or that "something is about to happen").

In yet an additional preferred embodiment, another such "enticement" factor is based on the number of eligible players in the progressive gaming system (e.g., the number of player card inserted in gaming machine) and not the "coin in" amount. Various other types of "enticement" factors are customizable as desired to influence player behavior. For example, in one preferred embodiment, the display digits of the time-based progressive game 310 count faster from 1 to 3, then slower from 4 to 6, and finally at a medium count rate from 7 to 9.

With respect to another aspect of a preferred embodiment of the progressive game 310, the winning player is selected randomly from among all active players at the time the progressive is awarded. In this regard, an "active player" is defined as a player who has a player tracking card 354 inserted into a gaming machine in the gaming system. In another preferred embodiment, more than one player is randomly selected from among all active players at the time the progressive prize is awarded. In one such preferred embodiment, the primary winning player receives X % of the progressive prize and the rest of the winning players receive the remainder (100%-X %) of the progressive prize.

In a preferred embodiment, as shown in FIGS. 4A and 4B, the progressive game 310 is a system game that is displayed on a system game user interface 400, such as an iVIEW-type device (described in further detail below). However, in another preferred embodiment, the progressive game 310 may be implemented over another gaming platform. Preferably, one embodiment of the progressive game 310 is a time-based and value-based progressive game, having a progressive prize that is funded from marketing dollars, which is paid to one or more players who have a player-tracking card inserted into the game when the award is activated. However, in another preferred embodiment, the time-based progressive game 310 may utilize other funding methods, as indicated in FIGS. 3, 4A, and 4B (e.g., wagered dollars, third party incentives, third party services, and the like).

In another aspect of a preferred embodiment, the progressive game 310 is self-tunable to a desired casino profitability level by adjusting the targeted progressive prize amount to be awarded and the targeted time in which the progressive prize is to be awarded, during the processing of the progressive prize information, which takes into account the total money in and out of the entire business per unit time. In one preferred embodiment, no player interaction is required with the progressive game in order to enhance the player's ability to win or enhance the amount of the player's win. However, in another preferred embodiment, the progressive game 310 may utilize (or allow) at least some limited type of player interaction like a simulated game bingo. Moreover, an alternative to dispensing cash to players at the gaming terminal is to dispense the prizes to player account buckets, including bonus points, eCash, eGameCash, and the like.

As stated above, preferably all players that have their player cards inserted into an eligible gaming machine in the gaming system are eligible to win the progressive prize. Additionally, the progressive prize that is available may be grouped in many different ways, including by way of example only, and not by way of limitation: by game denomination, by group of game machines on the floor (i.e., grouped according to a distinguishable game machine characteristic), or by random grouping of game machines on the floor. Alternatively, the progressive prize available may be inclusive of all game machines on the floor. Otherwise stated, in a preferred embodiment of the time-based progressive game 310, gaming machines on the floor are dynamically groupable by virtually any desired criteria. Moreover, the progressive prize is preferably awarded to a randomly chosen player once the progressive prize requirement has been satisfied, typically using a random number generator algorithm. Alternatively, in another preferred embodiment, the winner of the progressive prize is selected by type of players (e.g., club level=silver, gold, platinum, and the like). Typically, historical play data is typically used to calculate the players club level.

In a preferred embodiment of the progressive game 310, a player inserts its player tracking card 354 in an associated game machine 350. The player is then able to view specific progressive games/prizes on the system game user interface 400 that are eligible to the player. In one preferred embodiment, the progressive values, the progressive rules, and any help information are all displayed to the player over the system game user interface 400 from a gaming system server. Preferably, the player is automatically eligible for a specific set of progressive games and does not need to interact with the system game user interface 400 to enhance the player's opportunity to win one of the progressive games. Additionally, in one preferred embodiment, the player is able to select to play a specific progressive game from amongst a plurality of eligible progressive games. For example, the number of choices may be limited to just one or two of a multitude. In another preferred embodiment, the player may select to play a plurality of eligible progressive games simultaneously.

Typically, when a player removes its player tracking card 354 from the progressive game 310, the player becomes ineligible to win a progressive prize.

As stated above, in a preferred embodiment of the progressive game 310, to be eligible to win a specific progressive prize, the player must have its player-tracking card 40 inserted in a game machine 350 that is associated with the specific progressive prize at the time of progressive prize is given. For example, in one specific non-limiting example, the casino may run three gaming promotions simultaneously: one for nickel ($0.05) denomination machines; one for quarter ($0.25) denomination machines; and one for all machines on the floor. In such an embodiment, a player that has its player-tracking card 40 inserted into a nickel machine is eligible to win both the nickel promotion and the floor wide promotion (i.e., the player is able to select to play a plurality of eligible progressive games simultaneously). The progressive game 310 need only know which player-tracking cards 40 are inserted at which game machines 350, as well as details of the base game (e.g., game denomination), in order to be able to award progressive game winnings to the player.

In a preferred embodiment of the progressive game 310, when determining what progressive prizes to make available, casino personnel have to ability to control (1) the types of progressives games/awards to make available, (2) the progressive details (e.g., progressive prize value and time to progressive prize payout) of progressive games/awards made available, and (3) how the progressive funds are distributed to a player that wins a progressive prize.

With respect to the types of progressives, the progressive game 310 enables casino personnel with the ability to provide different progressives for different players by utilizing grouping criteria that includes, by way of example only, and not by way of limitation, game denomination, grouping of gaming machines 350 by physical location on the gaming floor, grouping of all gaming machines 350 on the gaming floor, player tracking card 354 player level (e.g., silver, gold, platinum), and combinations thereof. Additionally, rated theoretical wins or losses for a player or group of players could also be used in the player selection criteria.

As discussed above, in one preferred embodiment, the targeted progressive value is modified by a yield analysis to correlate with the desired casino profitability. For example, if a casino had low earnings last week, and the casino ran a $10,000 progressive game, then the casino may only want to give a $5000 progressive game this week. In another preferred embodiment, the progressive processing system 312 is modified dynamically prior to the next weekly recurring progressive game. This automatic tuning of the desired casino profitability may involve altering the progressive prize size and/or progressive prize time, thereby tuning to the current business needs. In some preferred embodiments, this tuning takes place while the progressive game is “live” (i.e., in progress).

With respect to the progressive details of progressive games/awards made available, the progressive game 310 enables casino personnel to determine the targeted time at which a progressive prize is given and the targeted dollars amount that will be distributed at that time. As previously stated, in one preferred embodiment, these targeted values are theoretical average values. The actual progressive prize time and progressive prize dollar amount will vary. As such, players (and potential players) will not be able to guess the exact time or amount of the progressive prize and use this information to “camp out” when the progressive prize is imminent.

The following is a non-limiting example of a progressive promotional award customized by a casino using the time-based progressive game 310. A casino desires a daily progressive that pays an average of $300 with a start/reset value of $85. All machines on the floor are eligible to participate in the progressive. Using a “Promotion Administration Tool,” the casino would enter the following information: Targeted progressive value: $300; Progressive reset value: $85; Machines included in progressive: All; Targeted progressive prize time: 24 hours, 0 minutes (daily); Number of Winners: 1; Percentage of pot for each winner: 100%; and optionally, the +/− tolerance range for the desired numbers (e.g., progressive value=$300+/−25%). This criteria is typically categorized in table format for a casino administrator to complete, including the percentage for each winner in the event of multiple winners in a single progressive game. Various examples of progressive parameter set-up screens 470 are shown in FIGS. 5A, 5B-1-2 and 5C-1-3.

Referring again to FIGS. 3, 4A, and 4B, in one preferred embodiment, the group of gaming devices in the specific promotion is set up in the SMS (slot management system) and/or the CMP/CMS (casino management personnel/system) system to create a promotion ID. This promotion ID is then assigned to a progressive ID in the progressive processing system 312. In this manner, the eligible players that are available to win the specific progressive ID are controlled outside of the server of the progressive processing system 312. In this preferred embodiment, the progressive processing system 312 decides “when” a progressive prize will be awarded and the “value” of the progressive prize to be given. In such a preferred embodiment, the previously existing servers in the casino select “who” will win the progressive prize. In this manner, a preferred embodiment of the progressive processing system 312 is easily incorporated with slot floor systems in the field that have promotional capability.

Additionally, the progressive processing system 312 can be utilized by any business that seeks to offer promotional give-backs to their customers. In such an embodiment, these businesses merely have to select winners from their customers when the progressive processing system 312 notifies them to do so. Preferably, the casino’s other systems would manage player accounts and the computing devices as currently preformed. Typically, these systems would not require the support of progressive processing system 312. In another preferred embodiment, the software of the progressive processing system 312 is tightly embedded into existing operating business servers.

Figure 20:
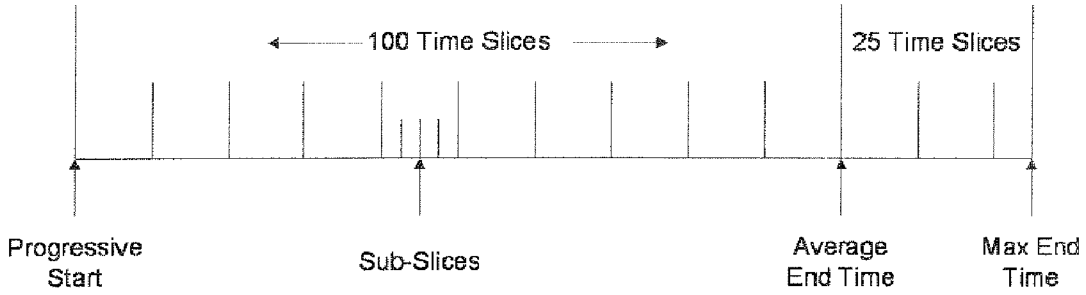

A preferred embodiment of the progressive processing system 312 includes a progressive engine 360. In a preferred embodiment, the progressive engine 360 performs several calculations utilized in the progressive game 310. These calculations are performed at predetermined “time slices” and “time sub-slices” (in accordance with the targeted progressive prize time). In one preferred embodiment, a “time slice” is equal to $1/100^{th}$ of the total targeted length of time for the progressive to be awarded, as set by casino personnel. In one such embodiment, the progressive will be won 50% of the time on or by the targeted set time and will always be won by 125% of this desired time. In another preferred embodiment, there is no absolute payout time prompt. A sub-slice is yet a smaller slice of time within a time slice. Preferably, a “time sub-slice” is close to a minute in size, but obviously will vary in length depending on the desired targeted length of time selected for awarding the progressive prize. At each sub-slice of time, the progressive engine 360 tests for a winner. In a preferred embodiment, the progressive engine 360 uses time slices and sub-slices to accommodate progressives of any length of time, ranging from five minutes to five years as shown in FIG. 20.

In a preferred embodiment of the progressive game 310, a setup procedure is performed for each progressive game. Preferably, this process includes: resetting the progressive prize to the progressive reset value; setting a progressive timer to the progressive start time; setting a sub-slice timer (this should be the same as the progressive timer to begin); setting the time slice counter to zero; setting the time slice increment rate; setting the number of time sub-slices per time slice; setting the time sub-slice increment rate; and starting the progressive game 310.

In one preferred embodiment of the progressive game 310, the following formulas and calculations are employed. In a preferred embodiment, the proper time slice increment rate is calculated by dividing the desired length of time for the progressive game by 100, which is the number of time slices in this embodiment. The result is the targeted length of each time slice in minutes. Thus, in an example 24-hour progressive game period, the time slice increment rate would be 14.4 minutes/slice. During a tournament game, the time-based progressive game 310 preferably uses values from a table, based on the number of the current time slice.

Another preferred aspect of a progressive engine 360 is the ability to emulate a traditional progressive game (e.g., a bonus progressive game), if desired, that is tied to wagering activity on the gaming floor. In one preferred embodiment, the progressive engine 360 emulates the "heart beat" of the floor (e.g., the number of players connected to the progressive gaming system), but is not tied in anyway to the wagering activity.

Additionally, in a preferred embodiment of the time-based progressive game 310, the number of time sub-slices per time slice is calculated by first truncating the time slice increment rate. If the resulting value is less than one, then the number of time sub-slices per time slice is set to one. This ensures that there is always at least one time sub-slice per time-slice. Preferably, there is always at least one time sub-slice per time-slice because the time-based progressive engine 360 tests for a progressive winner and increments the progressive prize based on the time sub-slices. Therefore, there must be at least one time sub-slice per time-slice in order to insure the math for the progressive game will work correctly. Accordingly, in the 24-hour progressive game period example discussed above, there are 14 time sub-slices.

Continuing, in a preferred embodiment of the progressive game 310, the time sub-slice increment rate is calculated by dividing the time slice increment rate by the number of time sub-slices per time slice. In this manner, the length of each sub-slice is determined. Typically, this value is close to one minute. Thus, in an example 24-hour progressive game period, the time sub-slice increment rate is 14.4 minutes (time slice incremental rate) divided by 14 minutes (number of time sub-slices per time slice)=61.7143 seconds.

In a preferred embodiment of the progressive game 310, progressive gaming calculations are performed during every time sub-slice interval of the progressive game by the progressive engine 360. Preferably, at the start of a new sub-slice, the by the progressive engine 360 runs a test to determine if a progressive prize is to be awarded at that time. Additionally, the growth rate of the progressive prize for each sub-slice is also determined at the start of a new sub-slice. In a preferred embodiment, these functions are repeated at the start of every time sub-slice until the progressive prize is awarded. Moreover, in a preferred embodiment of the progressive game 310, it is possible for the progressive prize to be won instantly (i.e., in the first time sub-slice of the first time slice), or for the progressive game to run until the game has passed the 100th time slice. In one preferred embodiment, the progressive game 310 is able to continue for many time slices past the $100^{th}$ time slice, instead of having the progressive game incorporate a forced payout when the $100^{th}$ time slice is reached. In such an embodiment, each of these time slices is the same length as the slices before the $100^{th}$ time slice. In one preferred embodiment, the progressive game 310 also incorporates one or more enticement factor calculations that run in the background on the system server (independent of which particular progressive games are active). These calculations are backed up data every 15 minutes, as well as returning data to the progressive engine 360 on request.

In a preferred embodiment of the progressive processing system 312, the progressive game 310 allows players to have the opportunity to win the progressive prize as soon as the progressive game begins. In one preferred embodiment, there is not any progressive prize value trigger that must be reached in order to allow the progressive prize to be eligible to be won, other than the initiating of the progressive game itself. In a preferred embodiment of the progressive game 310, a calculation is made for each time sub-slice to determine if there is a win of the progressive prize. For each time sub-slice there is a different number of remaining possible winning time sub-slices. Therefore, a calculation is performed at the beginning of every time sub-slice for the length of the progressive game in order to determine whether the progressive prize is given. For each calculation, the progressive game 310 accesses an associated table (see example "Winning Time Slice Table" below) for the win value (i.e., number of "winning time slices") of the current time slice.

For example, at time-slice number four, the following calculation is performed:

IF Random (1,000,000*# of Sub-Slices per Time Slice (14 in our 24 hour progressive))<=Winning Time Slice Table [Time Slice] THEN winner right now=TRUE.

OR (in this example);

IF Random(14,000,000)<=Winning Time Slice Table[4] THEN winner right now=TRUE OR;

If Random (14,000,000)<=8 THEN win=TRUE

Figure 5A:
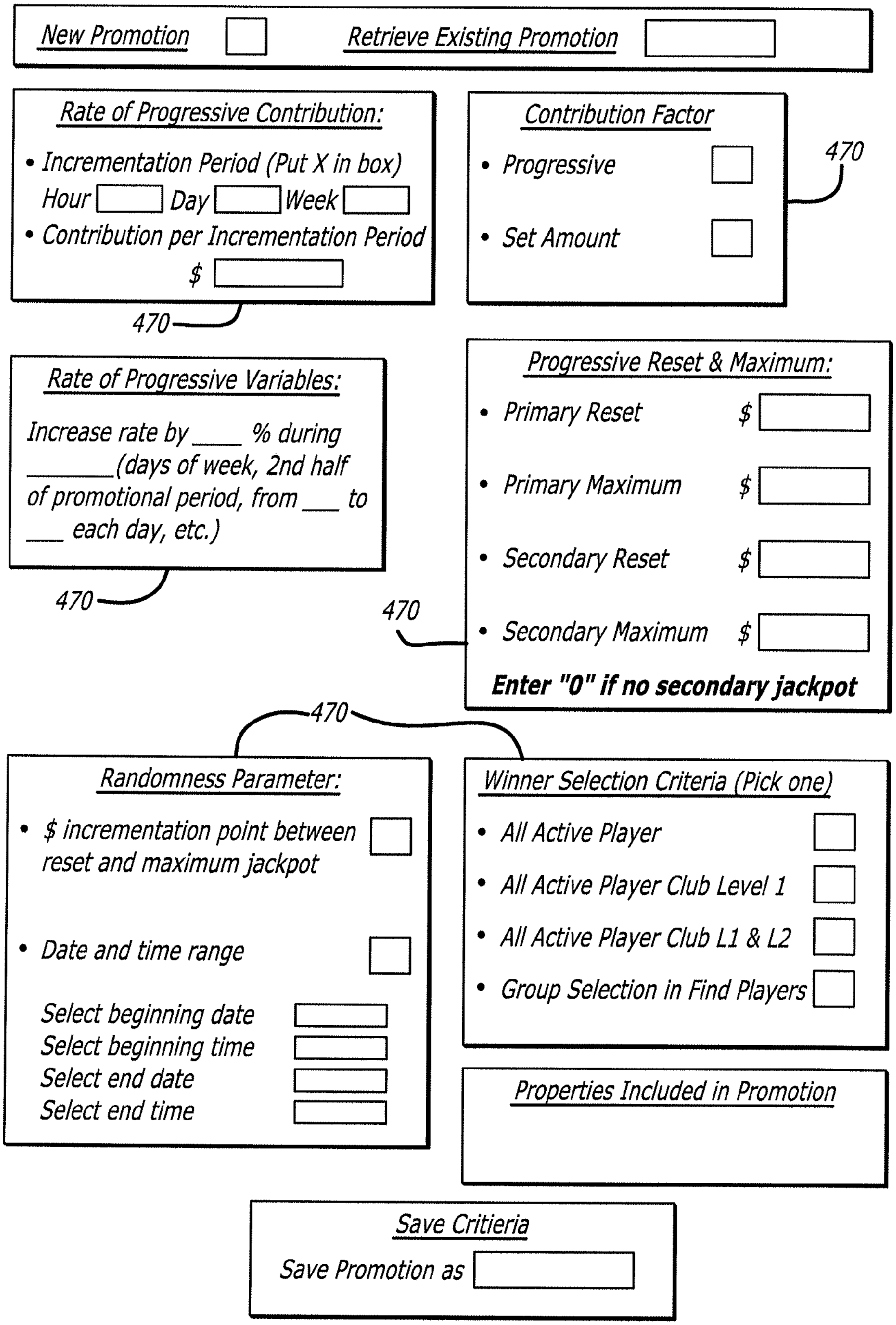
Figures 1, 5C:
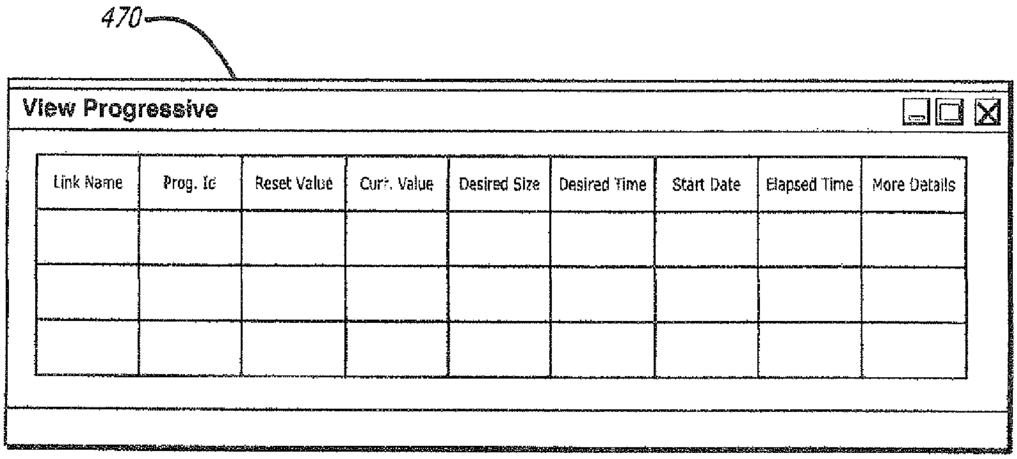
Figures 2, 5C:
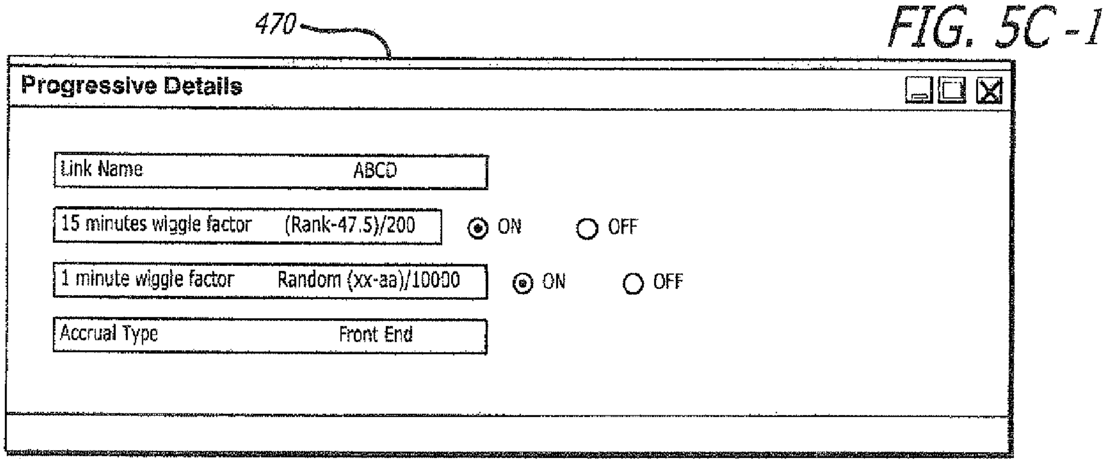
Figures 3, 5C:
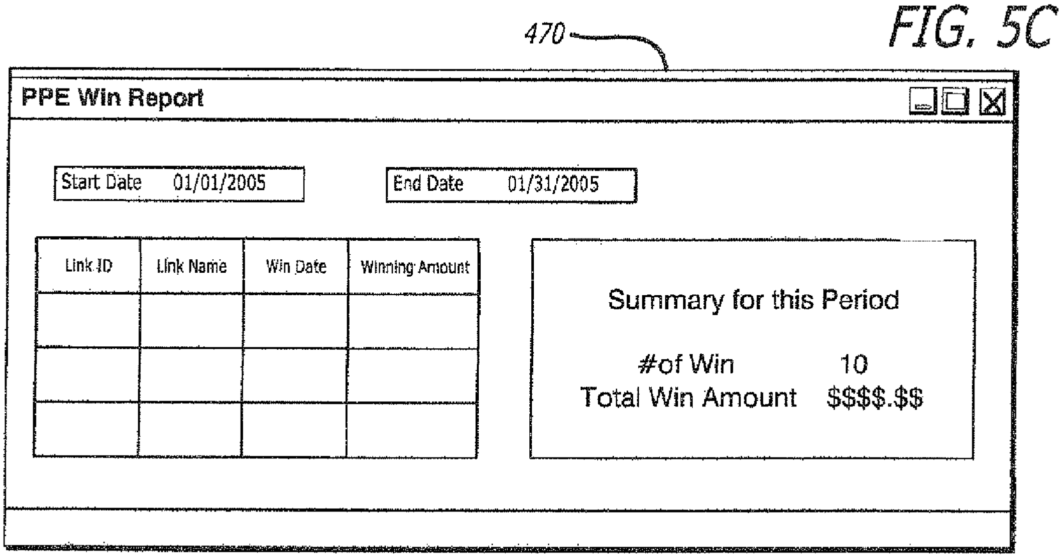
Figure 5D:
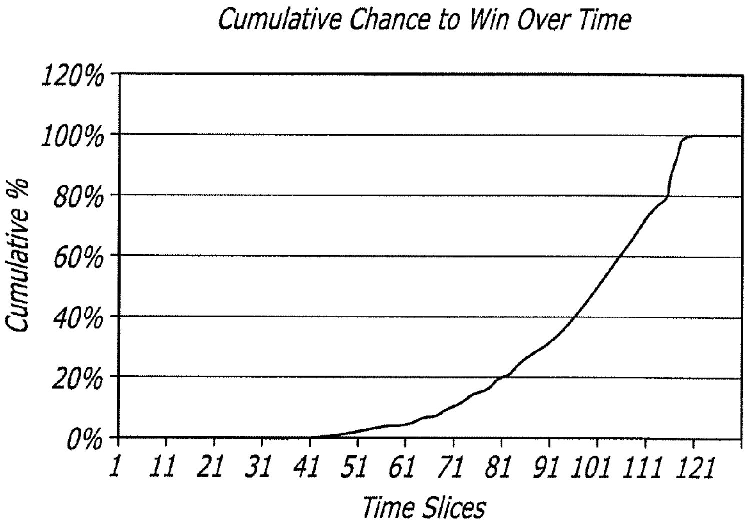
FIG. 5D illustrates a table of times slices versus number of winning tickets and chart of cumulative changes to win over time.

Continuing, in a preferred embodiment of the time-based progressive game 310, if the random number picked is less than or equal to the win value in the Winning Time Slice table for the current time slice, then the progressive prize value (the progressive "pot") is awarded. In a preferred embodiment, the number of time sub-slices is multiplied by 1,000,000 so that the win value from the table is comparable to the random number based on the entire time-slice. For example, if there is one time sub-slice per time-slice in a progressive game, then there is a one in 1,000,000 chance of selecting a "winning" time slice. In this same manner (referring to FIG. 5D), if there are 14 time sub-slices, then there is an eight in 14,000,000 chance of selecting a "winning" time slice. This mathematical profile is selected in order to create to casino administrator's desired payout curve. Moreover, this mathematical profile is applicable to any length of tournament. In one preferred embodiment, if the $125^{th}$ time slice is reached, the progressive prize is automatically won on the first sub-slice test. However, in other preferred embodiments, the progressive prize is automatically won at a different time slice, or is never automatically won at any time slice.

In one preferred embodiment, above table is loaded into the progressive processing system 312 by selecting and dragging points on the payout curve, after which the number of time slices of winning tickets is reverse calculated, as well as the associated probability of winning. In one preferred embodiment, the payout curve can be manually modified, or alternatively, the payout curve drawn for the user.

In a preferred embodiment of the progressive game 310, if a win value is not selected for a time sub-slice that produces a progressive prize, then the progressive prize value is incremented. This is sometimes referred to as the pot growth rate. In one preferred embodiment, the pot growth rate formula has a non-linear growth rate. Additionally, in one preferred embodiment the pot growth rate loosely associates the movement of the progressive "pot" value to the number of active players. However, in another preferred embodiment, the pot growth rate is not associated with the number of active players. In one specific embodiment, the pot growth at any given minute is described by the following formula:

(Base growth rate for current time slice)+(15 minute enticement factor)+(sub-slice enticement factor)

The formula in the above non-limiting example calculates a dollar value to be added to the progressive "pot" value that is visible to the players, and which can be won over the next time sub-slice. In one specific embodiment, components of the formula include: (1) the desired overall pot growth for the entire length of the progressive game; (2) base growth rate for sub-slices in this time slice; (3) a 15-minute floor activity enticement factor; (4) a time sub-slice random enticement factor. However, other preferred embodiments of the progressive game 310 include fewer components (e.g., fewer enticement factors), additional components (e.g., more enticement factors), or modified components (e.g., different enticement factors), without departing from the scope of the claimed invention.

In one specific non-limiting example, $300 is the desired (or theoretical average) value for the progressive game to distribute on a daily basis. In this non-limiting example, the reset value of the progressive pot is $85. Therefore, the progressive pot grows during a targeted progressive game by $215 (i.e., $300 minus $85). Once again, this desired progressive prize value of $300 is an average. If the progressive prize actually paid out every time that the progressive pot hit exactly $300, players would only play the progressive game just as the pot approached the $300 value.

As described above, in a preferred embodiment of the progressive game 310, the base growth rate formula for the progressive "pot" value is customizable. However, a preferred embodiment of the progressive game 310 further includes several pre-designed growth rate formulas that can be utilized by a casino or other hosting establishment. One such pre-designed growth rate formula component of the progressive game 310 is a "front-loading" curve for the progressive prize incrementing rate that increases quickly in the beginning and then later tapers off.

Examinations of casino information have shown that this type of front-loading of a progressive prize value may increase progressive game play. In preferred embodiments of the progressive game 310, this front-loading curve is similar for all progressive games, regardless of: (1) the actual dollar amount being played on the progressive games, and (2) the actual dollar amount being awarded for the progressive games. Preferably, the base growth rate for time sub-slices is the component of the formula that keeps the progressive pot tracking correctly. This base growth rate value is determined by locating a value in a Pot Growth table and multiplying that value by the remaining factors of the progressive incremental growth rate formula. Preferably, the base growth rate remains the same for each time sub-slice in a given time-slice.

In a preferred embodiment, the current time slice is utilized to locate a Pot Growth rate value on a Pot Growth table. In one specific non-limiting example, at time slice 4, the following formula is used to calculate the base growth rate for this time slice:

(overall desired pot growth(average $−reset $)*pot growth value table[time slice])/10,000

OR (($300−$85)*pot growth value table[4])/10,000

OR ($215*300)/10,000=$6.45(Total amount to add during this time-slice)

Figure 5E:
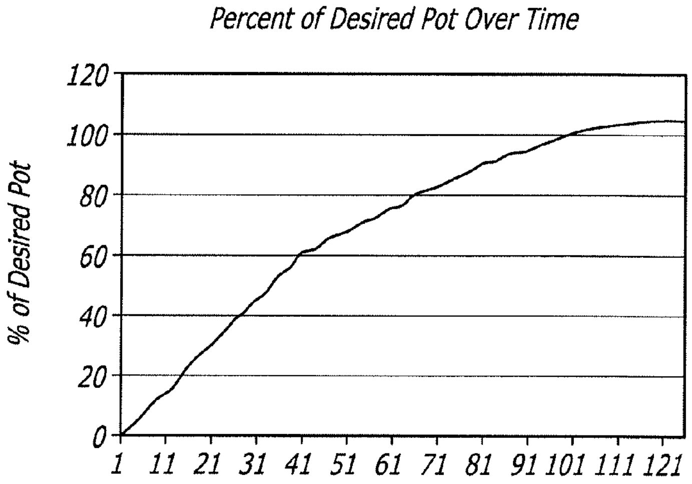
FIG. 5E illustrates a table of times slices versus pot growth and chart of percentage of desired pot growth over time.

In the above non-limiting example, the number 10,000 was incorporated into the formula to generate the Progressive Pot Growth table shown in FIG. 5E. Dividing by 10,000 produces the correct amount of total dollars to increment the pot growth for the time-slice. Continuing, in this non-limiting example, the value $6.45 is the total amount to be added to the progressive prize value for this time-slice. In a preferred embodiment, this value is divided by the number of time sub-slices per time slice. In the above non-limiting example, which is based off of a one-day progressive game, the progressive pot growth rate value is 14. However, this value will vary depending on the length of the progressive game. In this regard, a six-month progressive would have approximately 1296 time sub-slices per time-slice.

$6.45/14 Sub-Slices=$0.46(Base Growth rate for this time sub-slice)

In one preferred embodiment, the data in FIG. 5E is entered manually by a casino administrator, while in another preferred embodiment, points on the payout curve are selected and dragged by a casino administrator in order to create the table.

A preferred embodiment of the progressive game 310 includes what is referred to herein as an "enticement factor." One specific, non-limiting example of an enticement factor is a 15-minute floor enticement factor. In a preferred embodiment, the 15-minute enticement factor is configured to give players the impression that the progressive growth rate is linked to actual progressive play on the gaming floor. In one preferred embodiment, the 15-minute enticement factor produces up to +/−23.75% of the base growth rate of the progressive pot for a given time sub-slice. Alternatively, this information may be manually entered by a casino administrator.

In a preferred embodiment of the progressive game 310, this component of the front-loading curve utilizes a separate calculation that is performed on a server that tracks player activity during a rolling 24 hour period and return values to any progressive game upon request. For example, in one preferred embodiment, the progressive engine 360 requests a rank value from this enticement factor calculation. This enticement factor calculation uses in the following formula:

(Rank−47.5)/200

The result of this formula is a value between −0.2375 and +0.2375. Notably, this equates to the +/−23.75% desired range of change. In the above example, this value is then multiplied by the base growth rate for this sub-slice in order to determine the final value.

In the following non-limiting example, an example rank of 87 is selected for illustrative purposes:

Base Growth Rate of Time Sub-slice*((Rank−47.5)/200)

OR (in this example);

$0.46*((87−47.5)/200)

OR $0.46*(0.1950)=$0.09(for the 15 minute floor enticement factor)

As described above, a preferred embodiment of the progressive game 310 utilizes another calculation to produce for a 15-minute floor enticement factor (or other enticement factor in another preferred embodiment). A 15-minute interval is a preferred time interval because this time interval correlates with the current network capacity (or interval rating) for many casino systems. In one embodiment, the progressive game 310 performs this additional calculation every 15 minutes, preferably on the quarter hour. In order to perform this calculation, the progressive game 310 tracks the floor activity for the last 15 minutes. This "floor activity" value is typically captured by an Interval Rating Engine (or other appropriate engine in the progressive processing system 312). Referring now to FIG. 6A, in a preferred embodiment, the "floor activity" value is logged to a rolling table that keeps this value for each 15-minute period over the last 24 hours. Preferably, this rolling table includes 96 rows (i.e., four 15-minute periods per hour multiplied by 24 hours). As shown in FIG. 6A, each time a new value is calculated, this new value replaces the oldest value on the rolling table from 24 hours ago. In a preferred embodiment, this enticement factor calculation is constantly performed, regardless of whether there is any active progressive game play. This ensures that there are always "floor activity" values for the last 24-hours if a progressive game is to start at any time.

Additionally, a preferred embodiment of the progressive game 310 requires that the enticement factor background process also sort the floor activity values into a second table, as shown in FIG. 6A. This enables the time order to be preserved in the first table, i.e., the rolling table. The enticement factor background process sorts these floor activity values by the number of players, from the least number of players to the greatest number of players. In this manner, the time period with the biggest value would be in row 96. After the time periods have been sorted by activity level, the enticement factor background process returns the rank of the current time slice (i.e., a number between 1 and 96) to the progressive game upon request.

Another preferred embodiment of the progressive game 310 includes a different enticement factor. A non-limiting example of another enticement factor is a minute-by-minute floor enticement factor. In a preferred embodiment, the minute-by-minute enticement factor is configured to give players the impression that the progressive growth rate has more "life" (e.g., a more erratic, less predictable growth rate). Preferably, the minute-by-minute enticement causes the progressive growth rate to erratically move in a +/−10% range. In other preferred embodiments, the minute-by-minute enticement causes the progressive growth rate to erratically move in a +/−5% or +/−15% range. In one specific, non-limiting example, the following formula defines the minute-by-minute floor enticement factor:

(Random(2000)−1000)/10,000

This formula returns a value between −0.1 and +0.1, with four decimal point accuracy. This equates to a +/−10% range. In a preferred embodiment, this minute-by-minute floor enticement factor is multiplied by the base growth rate for this sub-slice to determine the final progressive value. In one specific, non-limiting example, the random number equating to the minute-by-minute floor enticement factor is 0.0473.

Base Growth rate for this sub-slice*((Random(2000)−1000)/10,000)

Or (in this example);

$0.46*(−0.0473)=−$0.02

Therefore, in a preferred embodiment, the final calculation for the determining the progressive pot growth rate of the front-loading curve utilizes the above described components of the formula curve. In one specific embodiment, the pot growth at any given minute is described by the following formula:

(Base growth rate for sub-slice)+(15 min. enticement factor)+(min.-by-min. enticement factor)

Or (incorporating the above-selected sample values)

$0.46+(−$0.02)+$0.09=$0.53(total to be added to the progressive pot during this sub-slice).

Figure 6B:
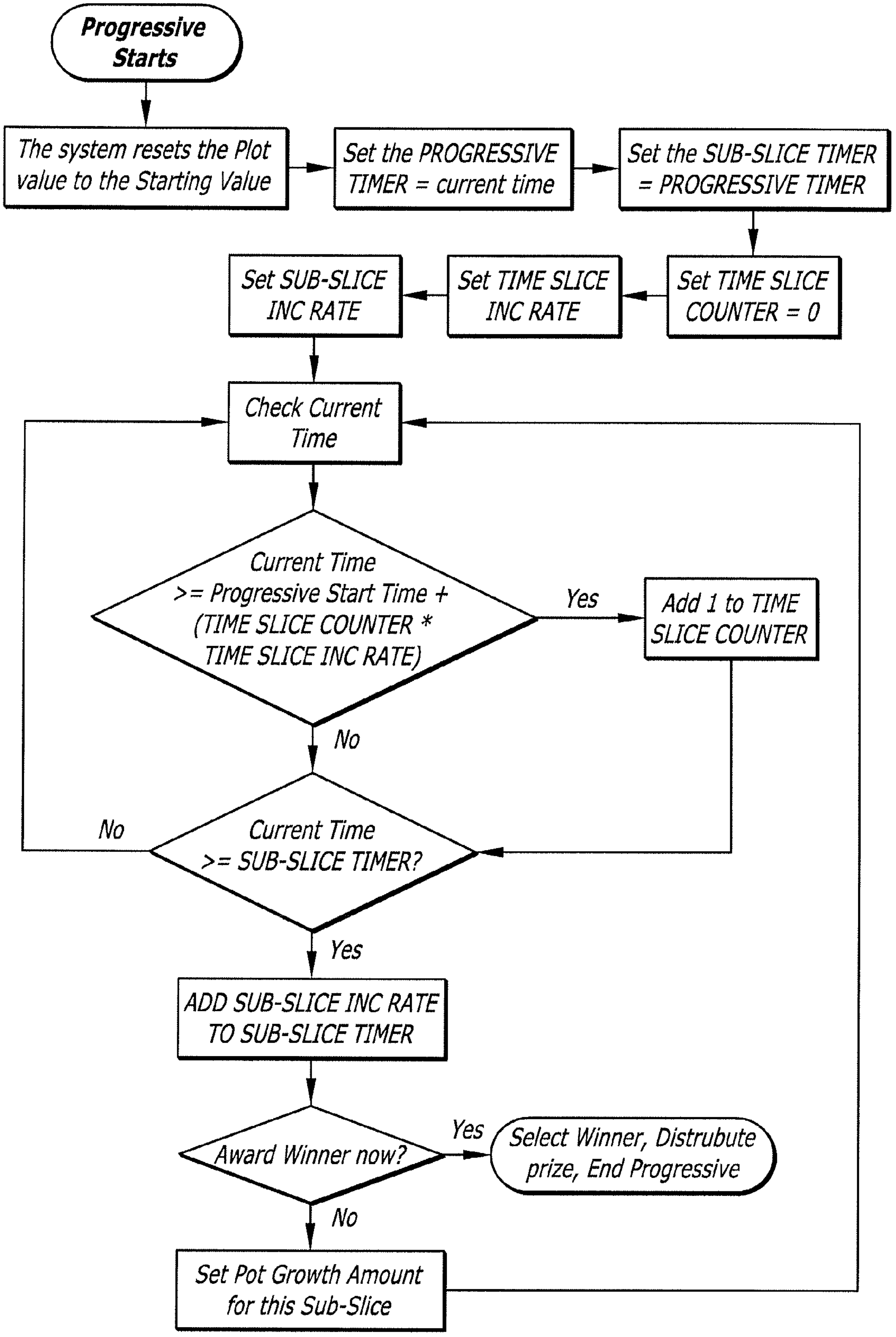
FIG. 6B illustrates a logic flow diagram of a preferred embodiment of the progressive game.

Referring now to FIG. 6B, a logic flow diagram of a preferred embodiment of the time-based progressive game 310 is shown. FIG. 6B details the process that is undergone during the execution of the time-based progressive game 310.

Figure 6C:
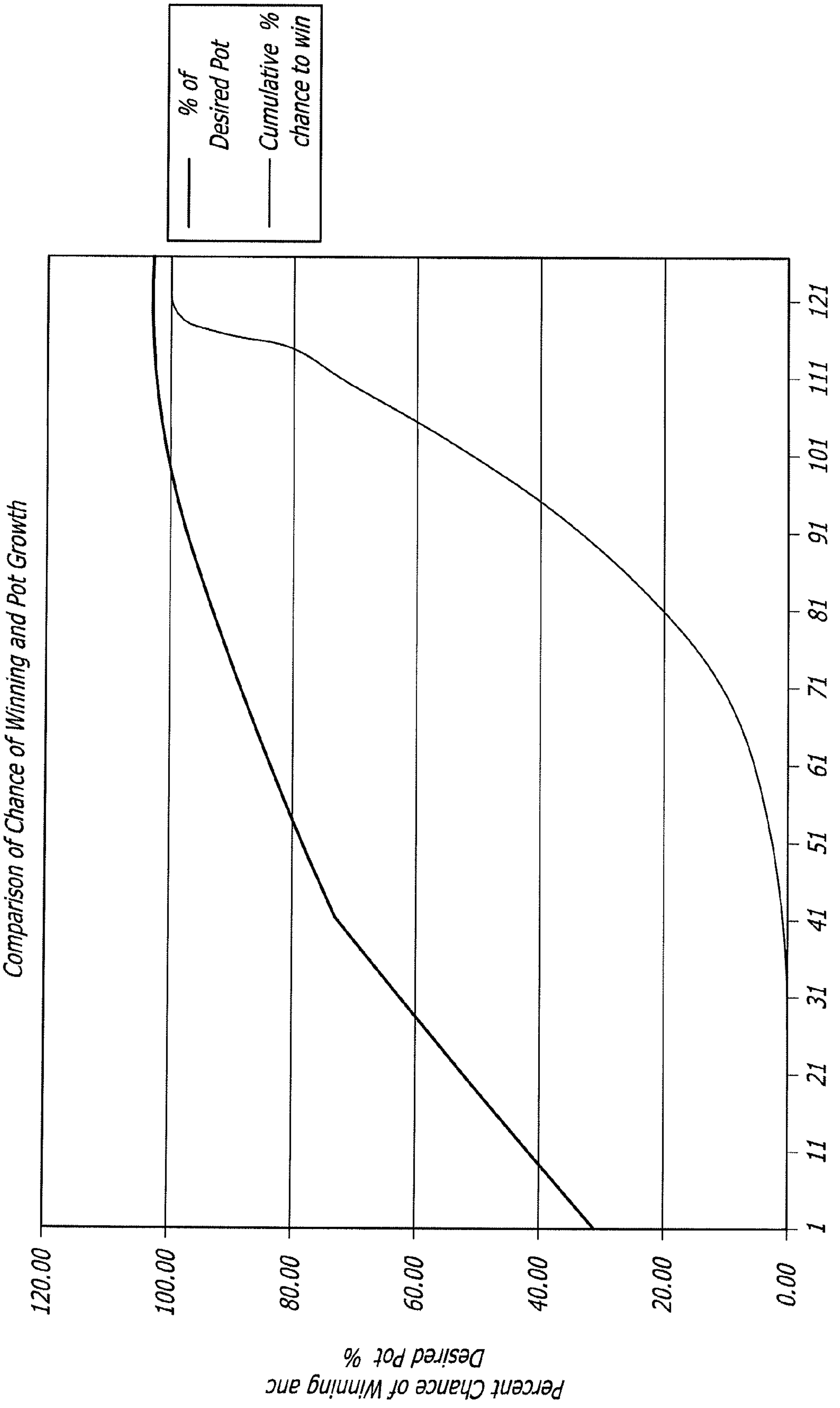
FIG. 6C illustrates a comparison chart of the percentage of the targeted (theoretical) progressive pot value (i.e., percentage of the targeted progressive prize value) versus the cumulative chance to win over time.

Furthermore, with respect to the distribution of progressive funds, FIG. 6C illustrates a comparison of the percentage of the theoretical average of the progressive pot value (i.e., percentage of the targeted progressive prize value) versus the cumulative chance to win. This comparison chart elucidates the "front loading" concept that is employed by a preferred embodiment of the progressive game 310. In one preferred embodiment, the progressive prize has a lower cumulative probability of being awarded early in the time period and increases to a higher cumulative probability of being awarded later in the time period.

In a preferred embodiment of the progressive processing system 312, the cumulative percent chance to win is a statistical technique used to create a winning time slice table, as shown above. The winning time slice table is referenced at each time sub-slice to determine the chance for a progressive prize to be won at that time sub-slice. In a preferred embodiment, the winning time slice table has 125 values that represent the number of winning time sub-slices out of 1,000,000 in any given time slice. The winning time slice table contains cumulative percent chance values. In this regard, the cumulative percent chance of selecting a progressive prize at any given time slice increases the closer that time slice is to the targeted progressive prize time. In a preferred embodiment, the cumulative percent chance is within a range of time that is acceptable to allow the progressive game 310 to have a broad enough range of lengths that players are unable to determine the ending time of the progressive game with any degree of accuracy.

In a preferred embodiment of the progressive processing system 312, the winning time slice table is generated using a spreadsheet that includes automated formulas. This enables a user to fill in some data in the table and then have the remainder of the data automatically generated. In a preferred embodiment, the spreadsheet shows the cumulative payback percent chance at each time slice. One example of the formula for finding how many time-slices exist at each time slice is:

Time Slice Number$^{(1.5+\textit{a value added to the exponent})}$, where the "value added to the exponent" is equal to the "Time Slice Number" divided by "a value based upon the slice number" and key time slice settings. In a preferred embodiment, the "divide value based on slice number" is determined after the user decides what time slices they want to effect and the cumulative percent chance to win at each time slice.

In one specific example, shown below, the value for time slices 1-80 is 168.59 (Original div value). This value is used in the "Additive to factorial" column. Any change to this value then filters through the spreadsheet, thereby producing a new "percent chance to win value" for all time slices. Preferably, setting a goal seek value in the "Used for Goal Seek" column changes the value in the "Original Div Value" column. In one specific example, this is a built-in function of the spreadsheet.

| | Div Values | Used for Goal Seek | Key Slice | Desired % |
|---|---|---|---|---|
| Original div value | 168.59 | 0% | 0 | 0.00% |
| After 1st key | 118.1886 | 10.0000% | 80 | 10.00% |
| After 2nd key | 105.492 | 50.0000% | 100 | 50.00% |
| All remaining slices | 93.5 | 95.0000% | 115 | 95.00% |
| | | 100.0000% | 125 | 100.00% |

| Additive to factorial | Slice number | Winning Tickets | Fail chance this slice | Cumulative fail chance | Cumula-tive Win % |
|---|---|---|---|---|---|
| 0.00593155 | 1 | 1 | 99.9999% | 99.9999% | 0.0001% |
| 0.0118631 | 2 | 2 | 99.9998% | 99.9997% | 0.0003% |
| 0.01779465 | 3 | 5 | 99.9995% | 99.9992% | 0.0008% |
| 0.0237262 | 4 | 8 | 99.9992% | 99.9984% | 0.0016% |
| 0.02965775 | 5 | 11 | 99.9989% | 99.9973% | 0.0027% |

In a preferred embodiment of the progressive processing system 312, a casino operator creates an original table. In one such embodiment, an operator creates a probability curve by choosing one or more key time slices. The operator then decides what percent of the winners should occur by the chosen key slices. For example, in one embodiment, the $80^{th}$ time slice is selected as the time slice by which to have 10% of all progressive prizes are to be awarded. Preferably, at the $100^{th}$ time slice, 50% of the progressive prizes have been won, so as to make the overall average length of the progressive games be approximately equal to the targeted award time. Continuing, at the $115^{th}$ slice, 95% of the progressive prizes have been won. Finally, in one preferred embodiment, at the $125^{th}$ time slice 100% of the progressive prizes have been won, thereby restricting the top end length of the progressive game to be 25% over the targeted progressive time. In this one preferred embodiment, the 25% value was chosen arbitrarily and can be modified (or removed altogether) to suit customer preference.

Preferably, adding to this 25% in value entails adding corresponding additional time slices after the $125^{th}$ time slice. In other preferred embodiments, there are multiple key time slices both before and after the $100^{th}$ time slice. However, even in such preferred embodiments, the target for the cumulative percent chance to win at each key slice becomes larger as the slice number increases.

In another step involved with creating an original table, the user would then seek for the desired percent for the first key slice by changing the original div value (divisional value). Continuing, the user would repeat this process for each remaining key, and finally for the $125^{th}$ time slice. The winning tickets column is then filled with the correct number of time sub-slices to ensure the progressive plays as intended.

In another aspect of a preferred embodiment, the spreadsheet is used to calculate for each time slice, the cumulative chance for the progressive prize to be won. This is determined by: (1) finding the percent chance to fail for a given time slice, (2) multiplying the percent chance to fail for all time slices up to a given point (i.e., this is the cumulative percent chance to fail at this point), and (3) subtracting the cumulative chance to fail from 100 percent to find the percent chance to win.

The following table provides an illustrative example:

| Additive to factorial | Slice number | Winning Tickets | Fail chance this slice | Cumulative fail chance | Cumula-tive Win % |
|---|---|---|---|---|---|
| 0.00593155 | 1 | 1 | 99.9999% | 99.9999% | 0.0001% |
| 0.0118631 | 2 | 2 | 99.9998% | 99.9997% | 0.0003% |
| 0.01779465 | 3 | 5 | 99.9995% | 99.9992% | 0.0008% |
| 0.0237262 | 4 | 8 | 99.9992% | 99.9984% | 0.0016% |
| 0.02965775 | 5 | 11 | 99.9989% | 99.9973% | 0.0027% |

In the table above, at Time Slice 1 there is 1 winning time sub-slice. There are 999,999 chances in 1,000,000 to lose (i.e., 99.9999% chance to lose). As this is the first time slice, 99.999% is also the cumulative percent chance to fail. The chance to win at this point is then 100%-99.9999 or 0.0001%.

Referring now to the table and time slice 2, there are two winning time sub-slices, and a 99.9998% chance to lose on this time slice. By multiplying 99.9999% (i.e., the cumulative chance to fail at time slice 1) times 99.9998% (i.e., the cumulative chance to fail at time slice 2), it is determined that there is a 99.997% cumulative percent chance to lose at time slice 2. Correspondingly, this translates into a 0.0003% chance to win at time slice 2.

Referring now to the table and time slice 3, there are 5 winning time sub-slices, and a 99.9995% chance to lose on this time slice. By multiplying 99.9997% (i.e., the cumulative chance to fail at time slice 2) times 99.9995% (i.e., the cumulative chance to fail at time slice 3), it is determined that there is a 99.992% cumulative chance to lose at time slice 3. This correlates with a 0.0008% chance to win at time slice 3.

In a preferred embodiment of the progressive game 310, after the progressive engine 360 has determined that there is a winner for the current time sub-slice, the system then randomly selects a winner of the progressive game using a random number generating algorithm. In one preferred embodiment, a player is eligible to win the progressive prize if they have a player-tracking card inserted in a game machine 350 that is eligible to win that specific progressive prize at the time the progressive prize is selected. For example, if the progressive prize was awarded for all nickel machines on the floor, the progressive game 310 would select a winner randomly from one of the player-tracking cards inserted into any nickel machine on the casino floor. In the case of a progressive game that awards to multiple winners, multiple cards are chosen as winners in accordance with the set-up of the progressive game. In these types of multi-winner progressive games, each player may win an equal share or there may be a range of payouts.

If there are no players playing on eligible gaming machines 350 for a specific progressive game at the time that the progressive game 310 determines there is a win for that progressive game, the progressive prize will be awarded to the next player(s) to insert a player tracking card 354 into an eligible game machine 350. In another preferred embodiment, the progressive prize is deposited into a winning player's account without even requiring the player to be present. In one such embodiment, the winning player is then notified of the deposit by e-mail, mail, or other known means.

In another preferred embodiment of the progressive game 310, all active players on the floor are eligible to win the progressive prize, not only the player with inserted player tracking cards. In one embodiment, the winning "non-player tracking card" player must use the progressive prize at that winning machine, since the player does not have a player tracking card 354 to associate the winning with that player.

Figure 7A:
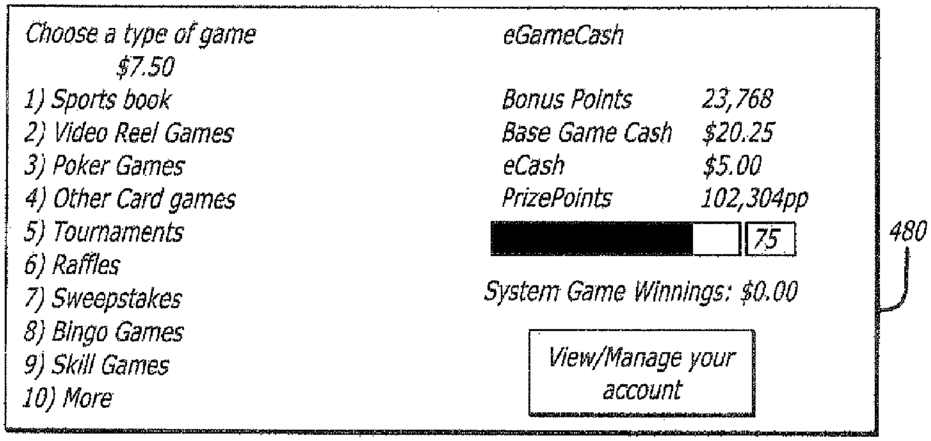
FIGS. 7A-7C illustrate player's eCash bucket screen, game setup screen, and personal account screen, as viewed over a system gaming user interface.
Figure 7B:
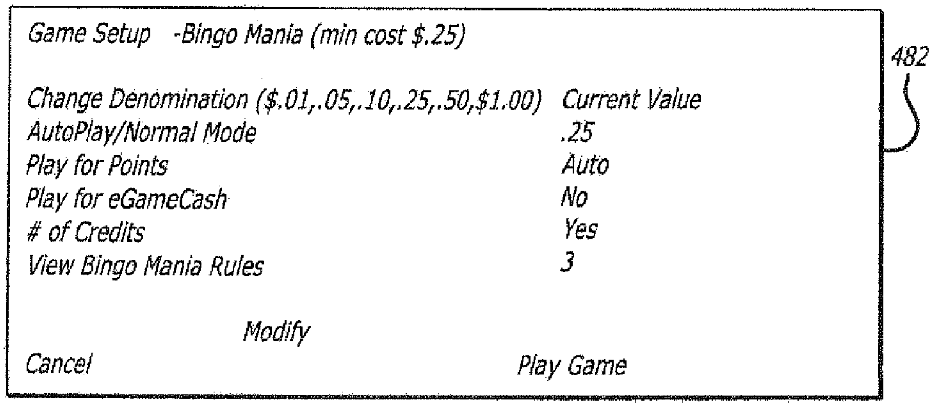
Figure 7C:
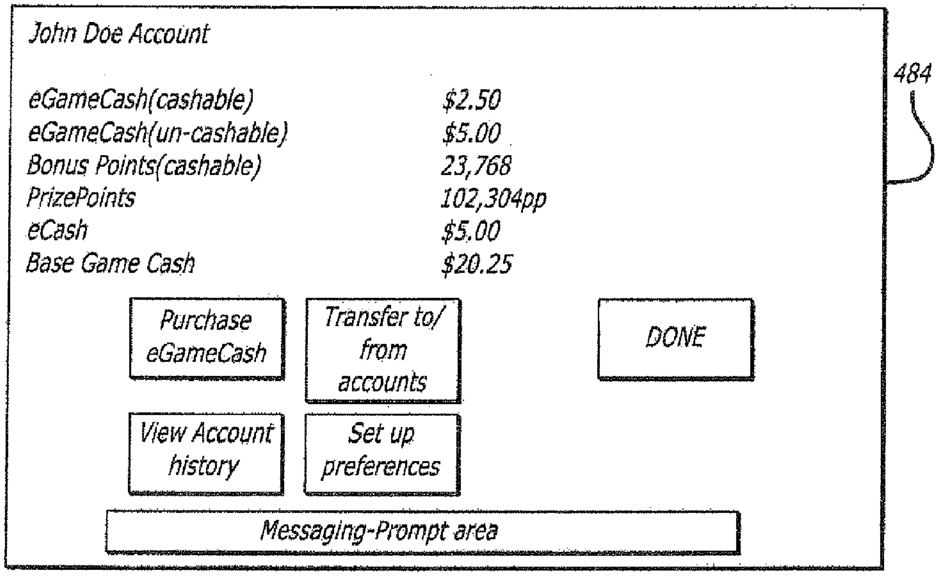
Figure 9A:
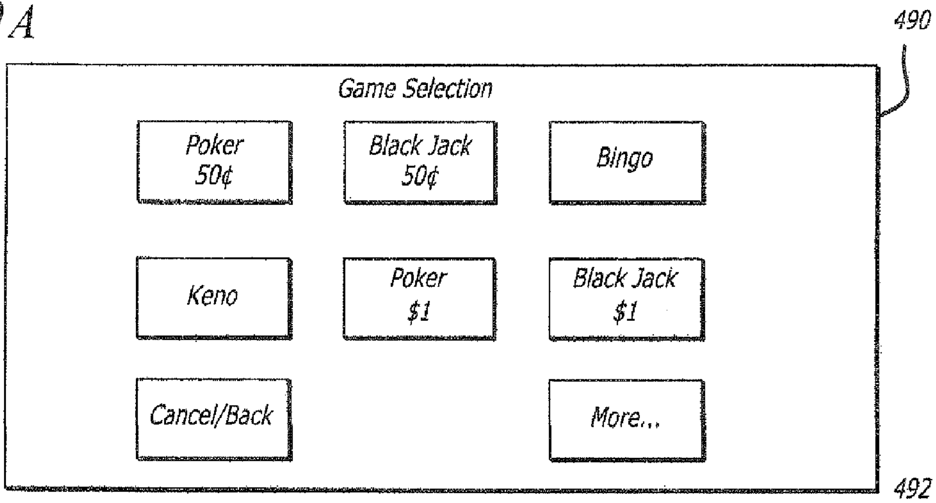
FIGS. 9A-9C illustrate game setup screens for modifying a bingo game, a tournament selection screen, and a personal account display screen that shows both cashable and uncashable funds for a system game in the same display screen.
Figure 9B:
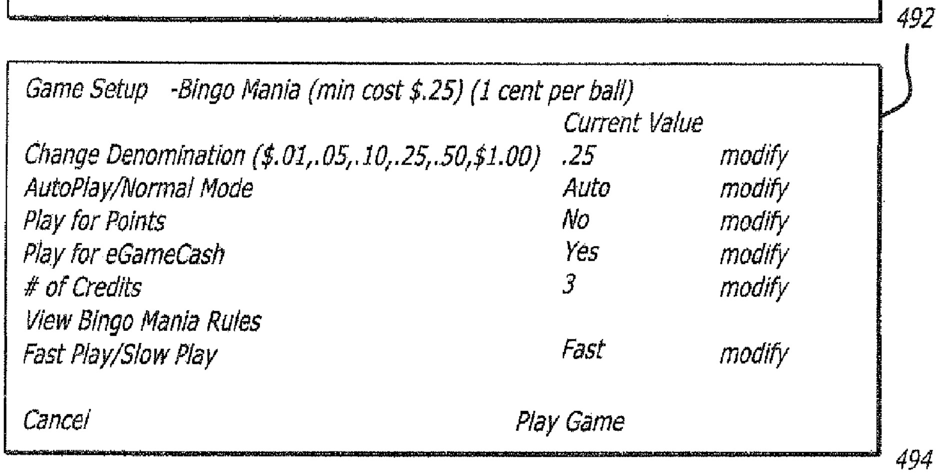
Figure 9C:
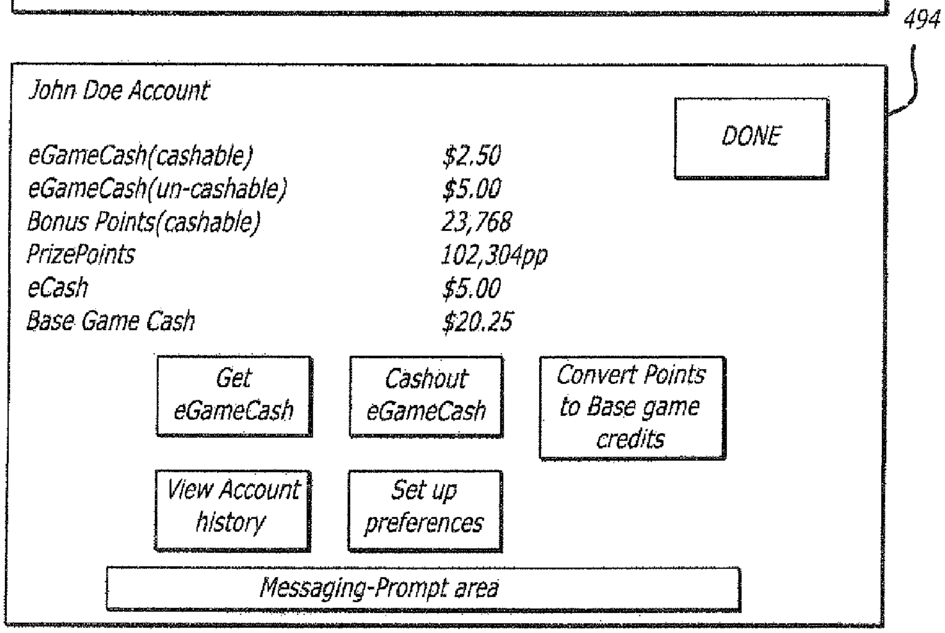
Figure 10:
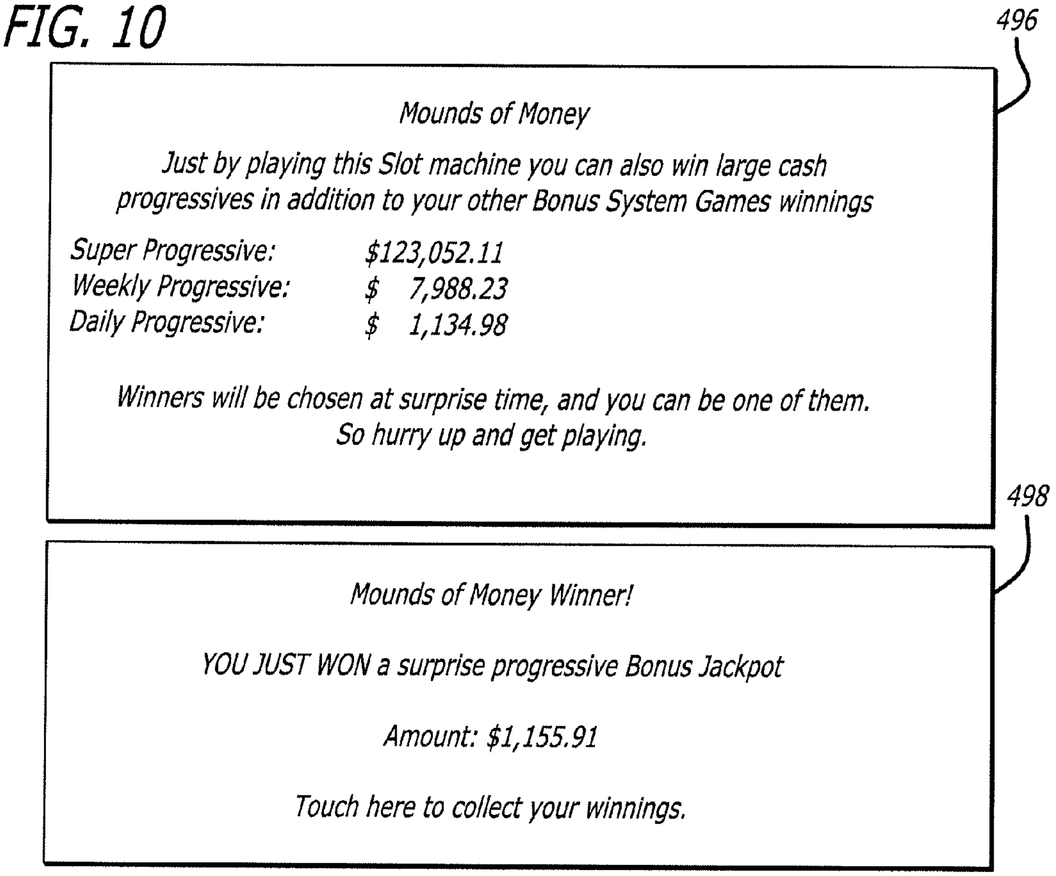
FIG. 10 illustrates a user interface for a progressive game in attract mode, as well as user interface for a progressive game showing an "award display screen" after a progressive prize has been won.

In a preferred embodiment of the progressive game 310, progressive prize is then dispensed to the winning player by crediting the player's eGameCash bucket. As shown in FIGS. 7A-7C, a player is able to view his or her eGameCash bucket screen 480, as well as other game setup screens 482 and personal account screens 484, typically via the user interface 400 in the progressive processing system 312. In one embodiment, as shown in FIG. 8, these credits in the player's eGameCash bucket can be transferred (as shown on the eGameCash purchase screen 486) to the base game upon request from the player (following PIN entry or some other suitable means of player identification). Additionally, personal account activity screens 488 are also displayed in FIG. 8. Referring now to FIGS. 9A-9C, a preferred embodiment of the progressive processing system 312 also includes a tournament selection screen 490, game setup screen 492 for modifying a bingo game, and a personal account display screen 494 that shows both cashable and uncashable funds for a system game in the same display screen. FIG. 10 shows a progressive game 310 displaying the "attract mode" screen 496 on the user interface 400, as well as an "award display" screen 498 that is shown to a player after winning a progressive prize.

In a preferred embodiment of the progressive game 310, the application design of the progressive game includes many various programs. Preferably, such programs include by way of example only and not by way of limitation: a master maintenance program including a graphic user interface, a link maintenance program, a promotion detail maintenance program, a progressive update program, a progressive winner program, a progressive increment override program, a "Pick the Winner" program, and a "create promotion" program (machines and/or player).

The master maintenance program enables data entry for the promotion master file. This program calls the link maintenance program and enables the user to set-up the progressive link. Optionally, the promotion may be started by called the promotion detail maintenance program to create the promotion detail file and perform the necessary system calculations. Referring now to the link maintenance program, this program enables users to select a subset of gaming machines 350 for entry into the progressive link file for a particular promotion game. Additionally, the promotion detail maintenance program performs calculations based on information in the promotion master file to determine the trigger amount and trigger date/time, as well as to write this information to the promotion detail file.

Figure 11:
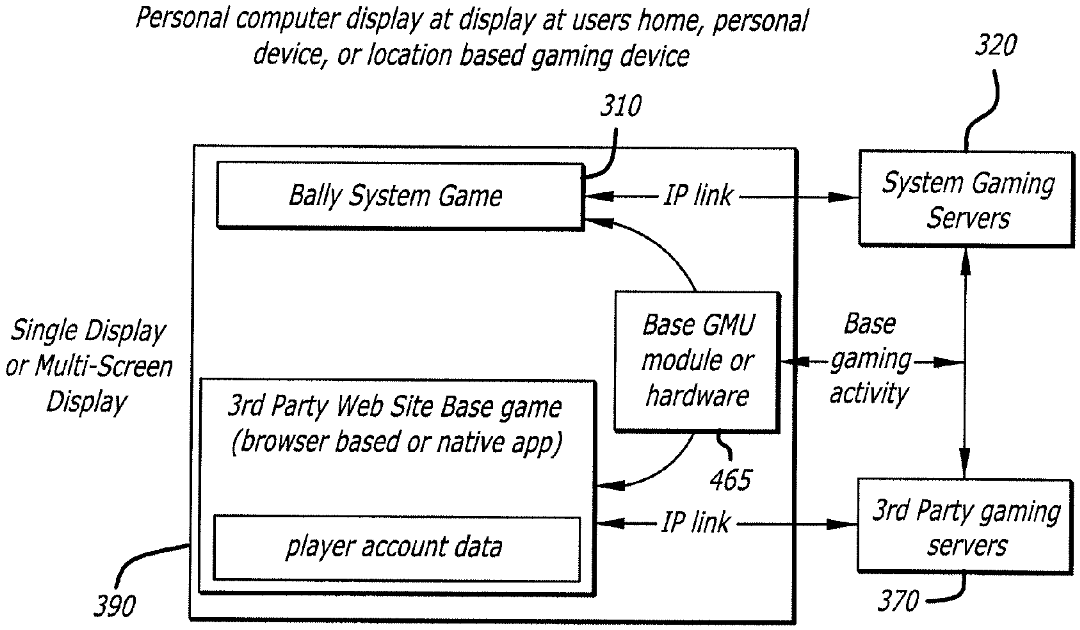
FIG. 11 illustrates a progressive processing system incorporating web services that enable viewing of the progressive games from a home web browser.

Referring now to FIG. 11, in one preferred embodiment, web services are connected to the progressive processing system 312 that enable viewing of the progressive games 10 from any casino, home web browser, cell phone, PDA, and the like. In another preferred embodiment of the time-based progressive game 310, the progressive update program continually updates the current progressive pot value and sends updates to the slot system, and optionally, to a display system. This data can also be fetched from the progressive processing system 312 upon request from any authorized device or server. Further, the progressive update program determines when a trigger time/date has occurred and invokes the progressive winner program. Preferably, the progressive winner program randomly selects a winner from the accounts with an inserted player tracking card 354 at the time the trigger was activated. This program will update the progressive winner file and send notification to the slot system. Finally, the progressive increment override program enables users to override the increment amounts for a promotion. The override is a dollar amount for a user defined date and hour.

In a preferred embodiment of the time-based progressive game 310, the system database design of the progressive gaming system includes many various data files. In one preferred embodiment, the promotion master file includes the following data: promotion code (primary key), promotion description, start date, start time, targeted progressive trigger value, minimum progressive trigger value, progressive reset value, targeted progressive prize time, minimum progressive prize time, key for progressive link file, stop date, stop time, iVIEW winner broadcast show number, and iVIEW winner asset show number.

In one preferred embodiment, the Slot Management servers and the Casino Marketplace servers maintain promotions (Promotion ID) for groups of players and groups of machines. Each progressive ID is associated with a specific promotion ID, typically outside of the server/service of the progressive processing system 312. However, in another preferred embodiment, these systems are all merged.

In one preferred embodiment, the detail promotion file includes the following data: the promotion code, the players, and/or the groups of machines included in the promotion. In another preferred embodiment, the progressive increment override file includes the following data: promotion code, hour, day, and override amount. In a preferred embodiment, the progressive winner file includes the following data: promotion code, account number, winner notified (y/n), amount, date, and time. In a preferred embodiment, the progressive link file includes the following data: promotion code and asset number.

Figure 12A:
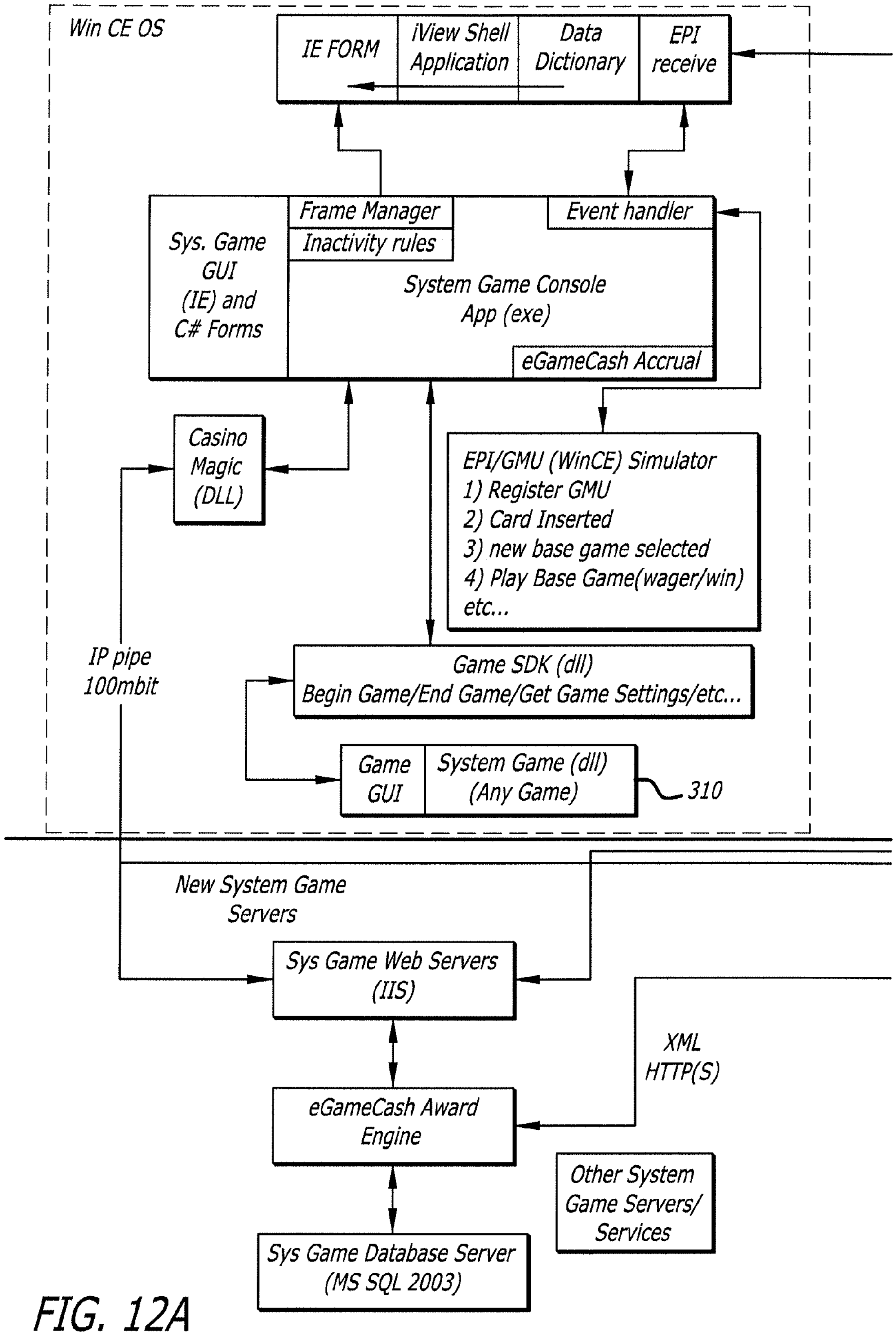
FIG. 12 illustrates client side applications/services/hardware, as well as system gaming servers.
Figure 12B:
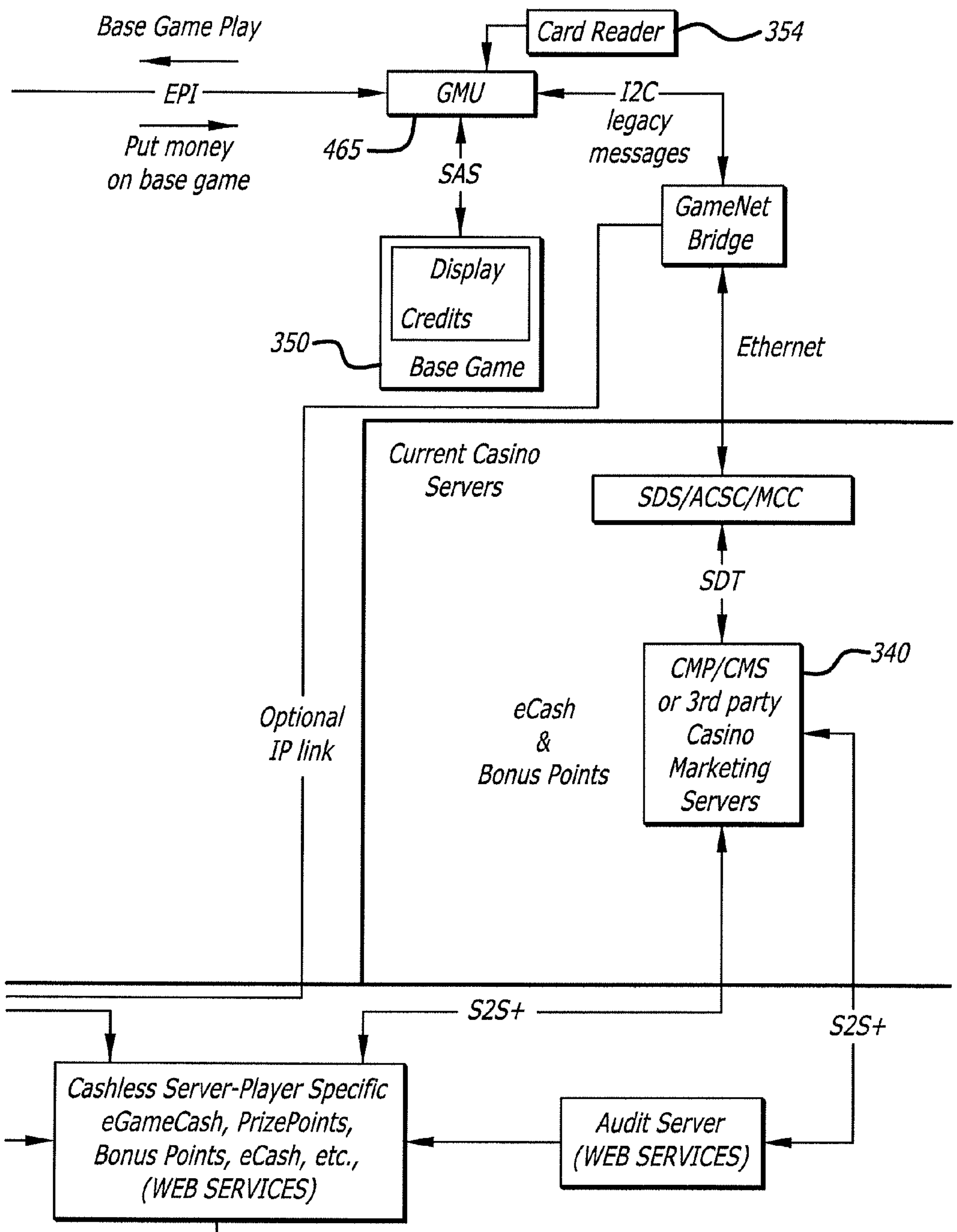

In one preferred embodiment of the progressive processing system 312, an optional way of awarding a progressive prize utilizes reverse mapping. In one such embodiment, the progressive processing system 312 tells a system gaming server and client-side game device (e.g., an iVIEW, as shown in FIG. 12) that a specific player has won a progressive prize. In response, the progressive game 310 running on a gaming device forcefully triggers a specific winning combination in a game (e.g., 777 in a reel spinner, Royal Flush in poker, and the like). The game then starts its win sequence and informs the player that the progressive prize has been won. In other preferred embodiments, other winning combinations are generated from either a central random number generator or from a client side random number generator.

In another aspect of a preferred embodiment, the progressive processing system 312 incorporates further promotions in addition to the system game promotions discussed above in which players receive promotional eGameCash with which to play. For example, one promotional progressive may simply be randomly given to a player whenever the progressive processing system 312 determines that it is time for a progressive prize. In this regard, the player may even be in the middle of a normal system game at the time of the award.

In another aspect of a preferred embodiment, the progressive processing system 312 is utilized in conjunction with non-gaming third party promotions. In one example embodiment, a gas station chain has a $1,000,000.00 progressive game 310. When the progressive processing system 312 of the gas station determines that it is time for a progressive prize to be given away, the system may (1) give the award to a person standing in front of a gas pump at that time with a card in the progressive device, or (2) assign the progressive prize to a player's account number. In another example embodiment, web businesses that incorporate a progressive processing system 312 may use this type of non-gaming third party promotions as a means to draw customers to their site. If a progressive prize occurs while a person is browsing the site of the web business, then the browsing person will win.

In this manner, the progressive processing system 312 of the claimed invention is a universal, promotional, progressive engine 360 that can be integrated with almost any business that desires to give something back to players. In one embodiment, spending money at the business is required, but in other embodiments, no purchase is required at the business, thereby bypassing sweepstakes issues. In one preferred embodiment, players are able to mail in entry forms, and software in the progressive processing system 312 selects a winner from either the mailed in entries or the players at the business at that time.

In another aspect of a preferred embodiment, the progressive processing system 312 incorporates overhead video displays that show data including, by way of example only, and not by way of limitation, current progressive values, targeted progressive size, targeted win time, start time, actual winners, information revealing that a progressive prize is about to be given, player qualification rules, or combinations thereof. These overhead video displays include, by way of example only, and not by way of limitation, plasma displays, liquid crystal displays, cathode ray tube displays, digital light processing displays, or other similar technology. Further, in one preferred embodiment, overhead video displays that present data from multiple progressive games 10, and from multiple facilities, thereby facilitating player interaction with other property locations as well.

In yet another aspect of a preferred embodiment, the progressive processing system 312 can be configured to prevent a progressive prize win during certain time periods (e.g., preventing a progressive prize from being awarded at a certain time period during the day). Additionally, the progressive processing system 312 enables the opportunity to win a progressive prize to be turned off by an administrator at any time. In some preferred embodiments, the awarding of the progressive prize is automatically reoccurring after each progressive prize is awarded. Further, in some embodiments, a delay is inserted after the awarding of a progressive prize and before the beginning of the next automatically reoccurring progressive prize.

In still another aspect of a preferred embodiment, the award process includes payment techniques that include, by way of example only, and not by way of limitation, hand-paying a winner; using EFT to transfer the award to a base game upon a player selecting to redeem the award at the base game; using AFT to transfer the award to a base game upon a player selecting to redeem the award at the base game; sending the award to a player account bucket; enabling the award to be collected at a cashier cage; mailing the award to the winner; placing the award in the player's private banking account; and placing the award as a credit on the player's credit card, debit card, player club account, or other financial account.

In another preferred embodiment, the progressive processing system 312 utilizes progressive identifiers that enable the opportunity to win a progressive prize to be activated from a remote server. Preferably, the progressive identifier is created using required data that is supplied through XML messaging or by using a management screen. The data required to generate a progressive identifier includes, by way of example only, and not by way of limitation: desired progressive value data, desire progressive win time data, progressive reset value data, maximum progressive value data, desired start time of the progressive data, whether the progressive auto-restarts after a win, how many times the progressive repeats, whether any enticement factors are utilized, progressive payout curve data, maximum progressive prize value data, desired start time of the progressive data, selectable progressive auto-restarts after a win, selectable number of progressive repeats, enticement factors data, and progressive payout curve data.

In one preferred embodiment of a progressive game 310 the administrator sets (1) the "actual" progressive prize value that will be awarded and (2) the targeted progressive prize time at which the progressive prize is to be awarded. In this embodiment, the progressive game 310 will be awarded at a random time that is calculated around the targeted progressive prize time entered by the administrator.

Alternately, in another preferred embodiment of a progressive game 310 the administrator sets (1) the targeted progressive prize value to be awarded and (2) the "actual" progressive prize time at which the progressive prize will be awarded. In such an embodiment, the progressive prize value grows to a random number calculated using the targeted progressive prize value. The awarding of the progressive prize is then compelled at the "actual" progressive prize time entered by the administrator. Clearly, in such an embodiment, the "actual" progressive prize time must be kept highly confidential.

Moreover, in a preferred embodiment, a progressive prize from the progressive processing system 312 is able to trigger additional events or promotions in the casino (e.g., consolation prizes, a $10 prize to each carded player now playing, and the like). Therefore, the progressive processing system 312 can be utilized as a promotions prize control engine that controls frequency at which promotional prizes (but progressive and non-progressive) are awarded based upon time.

In one preferred embodiment, the promotional progressive system 312 (PPS) is a service that runs on a server and performs backend processing for progressive game 310, provides various devices on a casino floor with information to display, and notifies other servers when a progressive prize event occurs and needs to be awarded to a winner. In some preferred embodiments, other servers are utilized to select one or more winners of the progressive prize to be awarded. In other preferred embodiments, the winner selection functionalities are integrated with the rest of the progressive game 310 functionalities in the promotional progressive system 312.

Preferably, the progressive processing system 312 (i.e., where the progressive processing service is performed) also incorporates devices such as signage that display the current progressive prize value on a casino floor (e.g., modern COOL SIGNS type devices, legacy player tracking displays, iVIEWs, and the like). Additionally, a preferred embodiment of the promotional progressive system 312 also incorporates a slot management system (or other type of casino floor management system) that provides floor statistics that enable a progressive game 310 to run, as well as perform a redemption function (i.e., select a progressive winner and award the progressive prize to the winner). Further, a preferred embodiment of the progressive processing system 312 also incorporates a Web interface, as shown in FIG. 11. Preferably, the web interface resides on a separate server and provides administration of the progressive processing system 312, as well as reporting through the World Wide Web.

In a preferred embodiment, a web interface is utilized to create and manage a progressive game 310 from a remote location. Additionally, in a preferred embodiment, the web interface enables enhanced reporting capabilities including, by way of example only, and not by way of limitation: the ability to lookup specific program identifier status and details, the ability to generate a report on a specific progressive over a time period, the ability to generate a report on multiple progressive games 10 for the same casino over a selected time period, the ability to generate ad-hoc queries to provide support for business decisions (e.g., targeted progressive prize value, targeted progressive prize time, effective grouping of slot machines and/or carded players, and the like).

The following table shows the messages that are communicated between the progressive processing system 312 and other devices. As referenced below, a program identifier (ProgID) is a unique identifier for progressive game 310 on the promotional progressive system 312. As such, other servers and processes are able to reference a specific progressive game 310 using the associated ProgID.

TABLE 1

| | SMS | Signage | Web Interface |
|---|---|---|---|
| To PPS | Create ProgID<br>Get ProgID meter<br>Check ProgID win<br>Post Floor Statistic<br>Notify ProgID win redemption | | Create ProgID<br>Admin ProgID<br>Check ProgID status<br>Reports |
| From PPS | Get Floor Statistic<br>Notify ProgID win | Add/Remove ProgID<br>Update ProgID meter<br>Notify ProgID win | |

TABLE 2

| Message Name | From | To | Description | Request Data | Reply Data |
|---|---|---|---|---|---|
| Create ProgID | SMS | PPS | SMS creates progressive game on PPS (total the average progressive $ win value, progressive reset value in $, average length of time for a progressive to run, scheduling data for a progressive). Normally, setup happens through the web interface. | All game data | ProgID<br>Error Codes |
| Get ProgID meter | SMS | PPS | SMS requests current meter value for ProgID | ProgID | ProgID<br>Meter Value<br>Error Codes |
| Check ProgID win | SMS | PPS | SMS checks if ProgID is won. If yes, it had been stopped by PPS. | ProgID | Won (yes/no)<br>Meter Value<br>Error Codes |
| Post Floor Statistic | SMS | PPS | For game to function correctly, it needs some timely floor statistic for a certain period of time (15 min) like<br>Number of carded players active or<br>Number of un-carded players active or<br>Total $ spent for each group (ProgID) and the like. | ProgID<br>StatName<br>StatValue | Error Codes |
| Notify ProgID win redemption | SMS | PPS | When ProgID is won, SMS/CMP has to perform some processing to determine the winner and after that is done, it will notify PPS, so the ProgID is closed and that PPS can notify Signage to display a winning sequence: create excitement, do winner's recognition, display amount won, and the like. | ProgID<br>Winner's data (if any) | Error Codes |
| Get Floor Statistic | PPS | SMS | This is a request for "Post Floor Statistic" message. Depending on implementation, we can have PPS send this request to SMS or have SMS do "Post Floor Statistic" on agreed periods of time | ProgID | ProgID<br>StatName<br>StatValue<br>Error Codes |
| Notify ProgID win | PPS | SMS | This is an unsolicited "Check ProgID win" reply. It tells SMS/CMP that a ProgID win happened. Depending on implementation, we can have PPS notify SMS when ProgID is won | ProgID<br>Meter Value | Error Codes |

In a preferred embodiment, these messages originate from the progressive processing system 312.

TABLE 3

| Message Name | Description | Request Data | Reply Data |
|---|---|---|---|
| Add/ Remove ProgID | PPS will register or un-register a ProgID with signage. A proper assignment of displays on a casino floor to a ProgID and to specific video content will be done at the Signage Network Controller. | ProgID<br>ProgName<br>Action (add/ remove) | Error Codes |
| Update ProgID meter | PPS will notify signage in a timely manner about current meter value of ProgID. | ProgID<br>Meter value | Error Codes |
| Notify ProgID win | PPS will notify signage when ProgID is won. This will happen after PPS gets a notification from SMS that ProgID redemption is completed. Signage will then perform winner's recognition, create excitement around the win, and the like. | ProgID<br>Meter Value<br>Winner's data (if any) | Error Codes |

A preferred embodiment of the progressive processing system 312 generates a progressive game 310 that is managed by the casino and can be offered to multiple customers. Preferably, a progressive game 310 uses a variety of criteria to determine player eligibility and winner selection on multiple slot machines. These features include, by way of example only, and not by way of limitation: (1) promotional progressive games focused on carded play only (i.e., game play by players that are using player tracking cards 54); (2) progressive games in which progressive contributions offer reset amounts, minimum/maximum levels, and a variety of methods for progression; (3) progressive games in which progressive prize growth rate is not generated based on direct or indirect gaming activity (e.g., the progressive prize increases based on a pre-determined rate that varies by day, dates, or time according to casino's decision on progression rates); (4) progressive games in which multiple progressives are overlapping; (5) progressive games that include a secondary reset amount; (6) progressive games in which the awarding of a progressive prize is based on a randomly selected point in the progressive prize value growth, or a randomly selected progressive prize time within a range; (7) progressive games in which a progressive prize winner is be selected from a specific group of players, all carded players, or other criteria (e.g., players with a minimum of 50 points in last 24 hours and still actively playing or customers playing more that $20 in "coin in" for the last hour); (8) progressive games in which the winner selection is performed using either selected player/account or slot machine location (also multiple card accounts, such as spouses sharing accounts); (9) progressive games in which signage and graphics are utilized for a promotion; (10) progressive games that are either isolated to a specific casino or operate over multiple properties; and (11) progressive games in which lotteries are incorporated (e.g., one swipe or entry a day translates into one minute of qualified play and a chance to win if a winner is selected during that time period).

In one preferred embodiment, the progressive game 310 is a floor-wide progressive game that is player-centric rather than game-centric. Preferably, there are no protocols or other requirements for slot machines to be eligible to participate in the progressive game 310. In a preferred embodiment, participation is based on casino-selected criteria that designate what types of eligible carded player activity contribute to increasing of the progressive prize. Preferably, the progressive prize values and other promotion status messages are displayed on video display signage throughout the casino, as well as being sent to the gaming machines as directed messages.

In one preferred embodiment, the progressive processing system 312 enables multiple progressive promotions or flat payout promotions that could run simultaneously. For example, the progressive processing system 312 enables a casino to have a four level progressive game with smaller progressive prizes hitting more frequently, thereby enabling each of the four to be configured separately using separate criteria. Preferably, in this type of tiered progressive game, these qualifiers are consistent to make it easier for players to understand the multi-tiered game.

In still another preferred embodiment of the progressive processing system 312, the progressive prize value is hidden from the players. In such an embodiment, a surprise award amount is given to the players when the progressive processing system 312 determines that the award has occurred.

In yet another preferred embodiment of a progressive processing system 312, the progressive prize is awarded directly out of the gaming device by printing a cash or prize point voucher. In such a preferred embodiment, the game monitoring unit enables direct printing to dual port printers (e.g., one for the base game and one for system printing).

One preferred embodiment of a progressive game 310 is the chain reaction progressive game. In the chain reaction progressive game, an incrementing rate is created for multiple progressives or flat amounts. In a preferred embodiment, a casino administrator selects a progressive prize growth rate, which can vary based on numerous criteria. Preferably, the chain reaction progressive game enables multiple promotional progressive games to be played while overlapping each other. In a preferred embodiment, game information is sent to displays throughout the casino to further encourage player excitement. Preferably, a casino administrator selects the game parameters, and the progressive prizes are awarded at random progressive prize values and/or random progressive prize times within a "time for a winner" parameter set by the casino. Finally, when a progressive prize is to be awarded, the winner is selected from active players on the casino floor that match "select a winner" parameters, as set by the casino.

Figure 13:
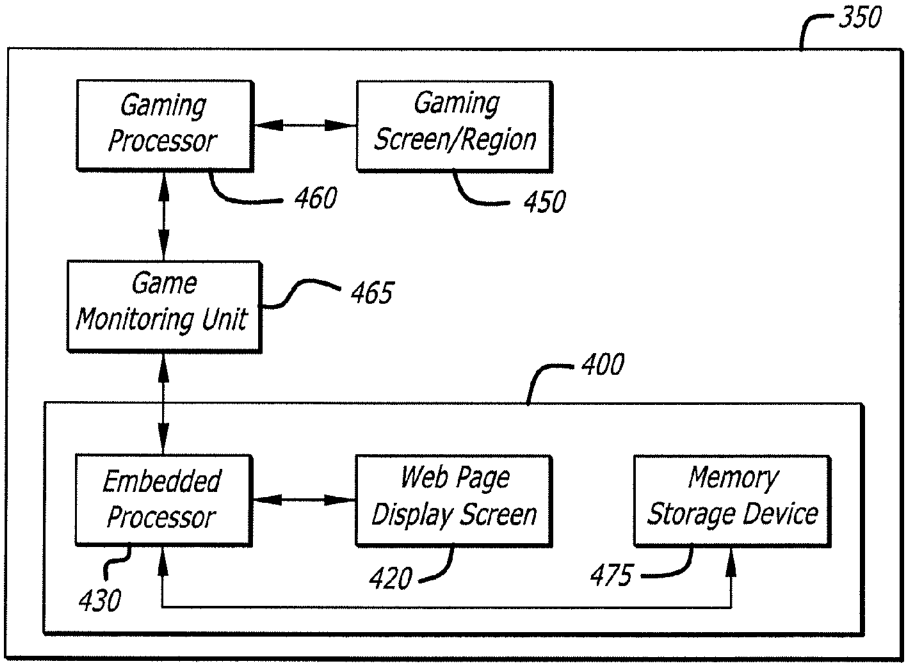
FIG. 13 illustrates a relational diagram of an embedded additional user interface utilizing a web page display screen and an embedded processor that receives data messages from a game monitoring unit that are translated into web page content and mapped to the web page display screen.

Referring now to one specific, non-limiting, embodiment of a user interface 400 shown in FIG. 13, an iView-type device is described herein in greater detail. The user interface 400 is sometimes referred to herein as "additional" in that the user interface is preferably separate from the gaming screen (or other gaming presentation). Further, the user interface is sometimes referred to herein as "embedded" in that the user interface preferably includes its own processor in some preferred embodiments of the invention. The functionality of the user interface includes, by way of example only, and not by way of limitation, the ability to display animation, multimedia, and other web-type content. The embedded additional user interface 400 enables presentation of additional information (e.g., enhanced player information) to a player (or potential player) through the web page display screen 420 in an exciting, eye-catching format, while not interfering with the normal gaming processes being displayed on the gaming screen 450. Further, the embedded additional user interface 400 does not interfere with the normal gaming hardware in the gaming machine 350, but rather is easily integrated into a gaming machine 350.

In situations involving multiple gaming machine (or gaming component) manufacturers, an embedded additional user interface 400 can be incorporated into a game machine 350 (either originally or by retrofitting) without requiring access to the game logic or other gaming systems that might be proprietary and inaccessible with a game machine 350 from another gaming manufacturer. Thus, in a preferred embodiment of the invention, the embedded additional user interface 400, which includes a web page display screen 420 for presenting supplementary information to a player, is incorporated into a gaming machine 350 in addition to the standard gaming screen 450 typically found in a gaming machine. The embedded additional user interface 400 may also be incorporated into a gaming machine 350 that utilizes a gaming region (e.g., a reel-spinner) instead of a standard game machine 350. This supplemental information may include general gaming information, player specific information, player excitement and interest captivation content, advertising content (targeted or otherwise), and the like. Further, in other preferred embodiments, the embedded additional user interface 400 may have the ability to interact with the game logic of the gaming processor 460, and thus, provide further functionality, such as bonus games and/or the ability to incorporate awards, promotional offers, or gifts from the web page display screen 420 to the game machine 350. Moreover, the web page display screen 420 may display supplemental information in an "attract mode" when there is no game play occurring.

In a preferred embodiment of the invention, the embedded additional user interface 400 is used to make casino services more accessible and friendly to casino players. In one preferred embodiment, the embedded additional user interface 400 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Manufacturing, and is described in U.S. Pat. No. 5,429,361 to Raven et al. incorporated herein by reference. One such currently utilized bus is an EPI bus (Enhanced Player Interface bus), which uses industry standard $I^2C$ hardware and signaling.

In one preferred embodiment, the embedded additional user interface 400 is used to replace/upgrade an EPI device. Preferably, the embedded additional user interface 400 replaces the EPI device in the game machine 350 in a "plug and play" manner. In other words, the old EPI device can be unplugged from the bus and the new embedded additional user interface 400 can simply be plugged into the $I^2C$ bus of the gaming machine 350, where the user interface 400 utilizes the currently employed industry standard $I^2C$ hardware and signaling without requiring any further modification. The embedded processor 430 of the embedded additional user interface 400 reads incoming $I^2C$ data (content), translates the data into a web authoring language (e.g., HTML, DHTML, XML, MACROMEDIA FLASH, animated Gifs, and JAVA Applets), and maps the data to the web page display screen 420. In this manner, the previous $I^2C$ data messages, which were typically presented on a two-line, twenty character VF display, are automatically transformed by the embedded additional user interface 400 into an attention grabbing, animated (multimedia) web page style format. This results in enhanced player satisfaction and excitement with extremely minimal retrofitting requirements.

Since, in one preferred embodiment, the embedded additional user interface 400 utilizes $I^2C$ hardware and signaling, this enables the user interface 400 to speak and understand the $I^2C$ protocol message set, and thus, communicate directly with the gaming processor 460 of the gaming machine 350 (or other networked devices) in the same fashion in which the gaming processor previously communicated with the EPI device. Accordingly, in a preferred embodiment of the invention, the functionality of the previously utilized hardware (e.g., the EPI device) is replaced and substantially upgraded with the integration of the embedded additional user interface 400 into the gaming machine 350. As such, the external hardware of any such system components (e.g., a keypad and a two-line, twenty character VF display) is eliminated.

As stated above, in one preferred embodiment, the incoming data received by the embedded additional user interface 400 is $I^2C$ signaling protocol; however, in other preferred embodiments other serial communication protocols (or electronic communication format) are utilized. Preferably, the embedded processor 430 communicates with the gaming processor 460, and/or other connected devices, over an $I^2C$ bus (or over another serial communications bus in embodiments that utilize another protocol). The web page display screen 420 of the embedded additional user interface 400 is preferably a color-graphic touch screen display. Preferably, the embedded processor 430 is at least a 32-bit processor. A preferred embodiment utilizes a 32-bit processor because cryptographic techniques, such as SHA-1 and DSA algorithms, are written and operate natively on a 32-bit system. Additionally, the Microsoft® Windows® environment, which is utilized in some preferred embodiments of the invention, is also 32-bit. Further, the internal operating system of the embedded additional user interface 400 is preferably customized to match the specific hardware to which the internal operating system attaches.

Preferably, the embedded additional user interface 400 is an embedded computer board that, in addition to the embedded processor 430 and the web page display screen 420, further includes a removable memory storage device 475 (e.g., COMPACT FLASH card), as shown in FIG. 13, and a network adapter port. Content and feature updates to the embedded additional user interface 400 are accomplished by physically swapping out the Memory storage device 475 (or other memory storage device). Thus, in order to retrieve data from the embedded additional user interface 400, the data is accessed by physically removing and reading the Memory storage device 475.

In one preferred embodiment, the internal operating system utilized by the embedded processor 430 of the embedded additional user interface 400 is WINDOWS® CE version 4.2 (or higher). Preferably, the embedded additional user interface 400 is built upon a PXA255-based board developed by the Kontron Corporation. Additionally, in a preferred embodiment of the embedded additional user interface 400, the browser control for the web page display screen 420 is MICROSOFT® INTERNET EXPLORER® 6.0 (or higher), which is shipped standard with WINDOWS® CE 4.2, the preferred internal operating system for the embedded processor 430.

Figure 14:
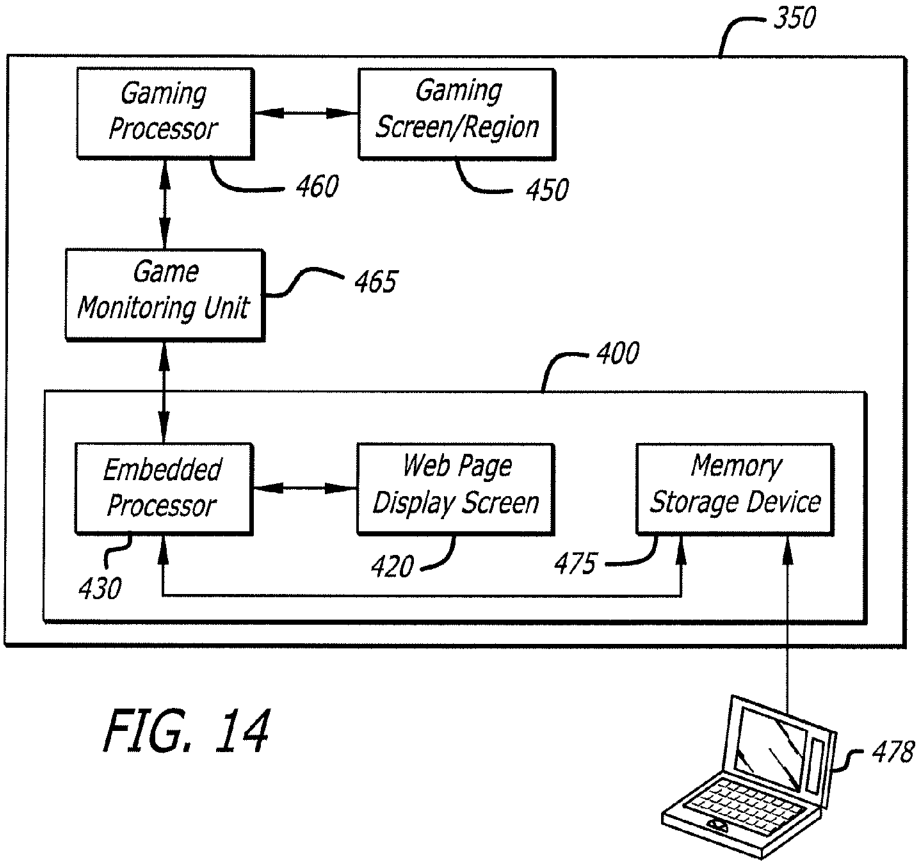
FIG. 14 illustrates a relational diagram of an embedded additional user interface utilizing a web page display screen and an embedded processor that receives cryptographically certified web page content from a portable computer via a network adapter port.

Referring now to FIG. 14, in this preferred embodiment, content may be locally downloaded. Specifically, in one preferred embodiment, the content is updated through a physical USB (or other connection) that is used to download the new content. In one preferred embodiment, the data on the Memory storage device 475 can be accessed by connecting a separate computer 478 to the network adapter port of the embedded additional user interface 400. This embodiment allows updating the contents of the operating system, changing the operating system itself, and receiving data from the Memory storage device 475. Physical removal of the Memory storage device 475 is also still be an option for update and inspection of files on the embedded additional user interface 400.

In one preferred embodiment, a portable computer is used to store and publish data content to the Memory storage device 475 on the embedded additional user interface 400, as well as to receiving data from the Memory storage device 475 on the embedded additional user interface. In this embodiment, all content on the embedded additional user interface 400 is authenticated as if it were a gaming machine.

In another preferred embodiment, a network adapter port is run on the embedded computer board of the user interface 400. This embodiment also includes a boot loader. Further, in this embodiment, the portable computer 478 (described above) includes components for use in uploading data to, and downloading data from, the Memory storage device 475 on the embedded additional user interface 400. Specifically, the components that run on the portable computer 478 are for moving new data content to the embedded additional user interface 400, and for validation and verification of the data content that is on the embedded additional user interface. Preferably, all data that is used to update the Memory storage device 475 moves to or from the embedded additional user interface 400 over the single built in network adapter port on the board.

Prior to the advent of the embedded additional user interface 400 of the invention, gaming regulators would have been unwilling to allow casino administrators to design their own content. However, due to the cryptographic technology implemented by the embedded processor 30 in the embedded additional user interface 400, a certification process is provided by the invention with sufficient security for gaming regulators to allow casino administrators to design their own content. Specifically, in one preferred embodiment, the certification process offered ensures authentication and non-repudiation of the casino administrator designed web content. Preferably, in the invention the certification process provided further ensures auditability and traceability. Various cryptographic technologies, such as authentication and non-repudiation (described herein below), are utilized in preferred embodiments of the invention, to provide sufficient security for gaming regulators to allow casino administrators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or second PKI is created that is rooted in the primary PKI and that leverages the capabilities of the certificate (e.g., a x509 certificate) that allow for limited access. Thus, this preferred embodiment allows the attributes within the certificate to be used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one preferred embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number.

In another preferred embodiment, the invention utilizes a Message Authentication Code (MAC). A MAC is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A MAC is attached to data in order to allow data authentication. Further, a MAC may be used to simultaneously verify both the data integrity and the authenticity of a message. Typically, a MAC is a one-way hash function that takes as input both a symmetric key and some data. A symmetric-key algorithm is an algorithm for cryptography that uses the same cryptographic key to encrypt and decrypt the message.

A MAC can be generated faster than using digital signature verification technology; however, a MAC is not as robust as digital signature verification technology. Thus, when speed of processing is critical the use of a MAC provides an advantage, because it can be created and stored more rapidly than digital signature verification technology.

In one preferred embodiment, the authentication technique utilized is a bKey (electronic key) device. A bKey is an electronic identifier that is tied to a particular individual. In this manner, any adding, accessing, or modification of content that is made using a bKey for authentication is linked to the specific individual to which that bKey is associated. Accordingly, an audit trail is thereby established for regulators and/or other entities that require this kind of data or system authentication.

Figure 15:
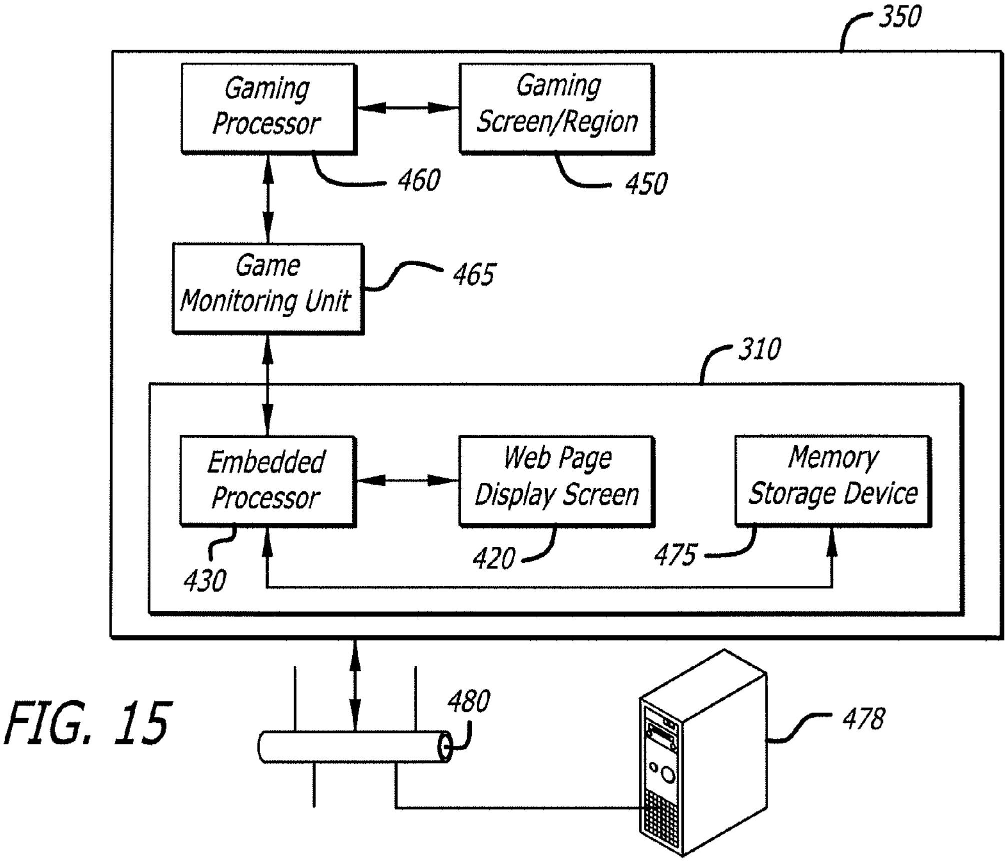
FIG. 15 illustrates a relational diagram of an embedded additional user interface utilizing a web page display screen and an embedded processor that receives web page content from a back-end server via an Ethernet-networked backbone.

Referring now to FIG. 15, in one preferred embodiment, the embedded additional user interface 400 connects to an Ethernet-networked backbone 480 instead of a local system network. Currently, most casino networks are not Ethernet-networked, but rather are smaller, more simplistic local system networks. Thus, in this Ethernet-networked backbone 480 embodiment, the current system network is replaced by an industry standard Ethernet backbone, such as 10/100 base T Ethernet running over Cat 3, 4, 5, 6, or higher. Thus, a standard 10/100 base T Ethernet card is added to the processor in this embodiment. Preferably, the network employs TCP/IP, HTTP, and XML messaging or a variant of XML. Nevertheless any suitable protocol may be used.

Further, in another preferred embodiment, the embedded additional user interface 400 connects to a full featured, back end, download configuration server 490 through the above-described Ethernet-networked backbone 480 as shown in FIG. 15. In such an embodiment, the full-featured server 490 can schedule downloads of content (gaming or otherwise) as well as upload information from the gaming machines 350, such as what options the gaming machines 350 currently possess. Accordingly, in a preferred embodiment, the primary use of the server 490 is as a data download and data retrieval server. While this server 490 does upload and download web content style information, it is typically not connected to the World Wide Web. This server 490 must be authenticated (just like a game machine 350) to make the content served to the embedded additional user interface 400 acceptable to the gaming regulators. Preferably, utilization of the Ethernet-networked backbone 480 and the server 490 provides many system benefits, including but not limited to reliability, maintainability, security, content staging, content testing, deployment procedures, and incident recovery. In one embodiment, deliverables also preferably include content templates and guidelines for casino owners and administrators to create their own web content for deployment to the web server. In one embodiment, the web server 490 has its content authenticated in the same manner as the embedded additional user interface 400 to allow content to be downloaded to the web page display screen 420.

Figure 16:
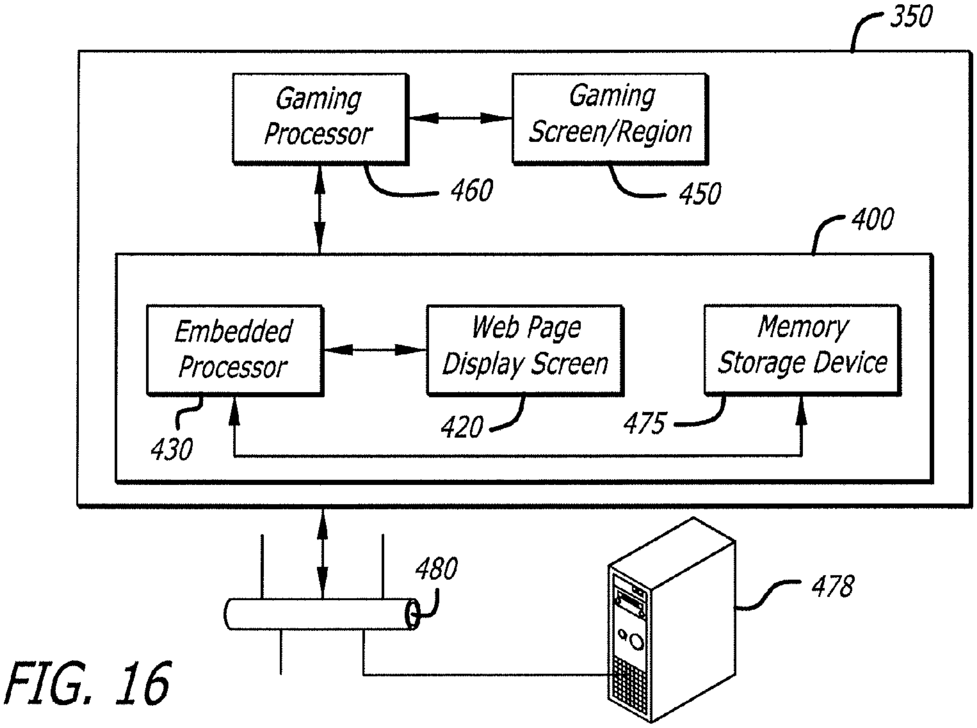
FIG. 16 illustrates a relational diagram of an embedded additional user interface utilizing a web page display screen and an embedded processor that includes the functionality of a standard gaming processor.

Referring now to FIG. 16, in another preferred embodiment of the invention, the functions previously performed by the gaming monitoring unit 465, as shown in FIGS. 13-15, of the gaming machine 350 are supported by the embedded processor 430 of the embedded additional user interface 400. Otherwise stated, the GMU code is transitioned from the gaming monitoring unit 465 into the embedded processor 430 in the embedded additional user interface 400. Accordingly, such a configuration removes the need for the gaming monitoring unit 465 in the gaming machine 350. This results in a significant reduction in the amount and complexity of the hardware, as well as completing a phased transition of more traditional style gaming machines 350 into more modernized upgraded gaming machines.

Thus, in such a preferred embodiment, the invention is directed towards an embedded additional user interface 400 that is incorporated into a gaming machine 350, the gaming machine in turn including a game machine 150 or other appropriate gaming region (e.g., spinning reels), but does not include a gaming monitoring unit 465. Such an embedded additional user interface 400 still includes a web content capable display screen 420 and an embedded processor 430. Once again, the web content capable display screen 420 presents web information to a user via the display screen. The embedded processor 430 preferably utilizes an internal operating system. Furthermore, in this embodiment the embedded processor 430 additionally includes standard gaming monitoring unit functionality (GMU code), since it replaces the gaming monitoring unit 465 in the gaming machine 350. As before, the embedded processor 430 reads incoming data, translates the data into a web protocol (web authoring language), if necessary, and maps the data to the web content capable display screen 420.

In a preferred embodiment, information can also be input by a user into the web page display screen 420 of the user interface 400. The web page display screen 420 of the user interface 400 employs a virtual keypad. Further, the user interface 400 uses a keypad dictionary that allows a user to be able to enter a vastly greater amount of information than was previously possible using a twelve-digit VF keypad. For example, the virtual key on the touch screen that is displayed by the browser is pressed by a user. This calls the keypad object by calling its dispatch interface with a string that identifies which virtual key was pressed. The keypad object looks up the string in the dictionary object that has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 350 within a particular casino. By utilizing the embedded additional user interface 400 of the invention, the gaming network interface can be instructed to move funds between player's accounts and gaming devices by merely touching the web page display screen 420. In addition, many other more sophisticated commands and instructions may be provided. Thus, the embedded additional user interface 400 improves the player and casino employee interface to the gaming machine 350, directly at the gaming device itself.

In a preferred embodiment of the invention, the web page display screen 420 of the embedded additional user interface 400 enables a player to be shown player messages in an animated, multimedia, web content style environment. These messages would previously have been displayed in a significantly more mundane format on a separate display device (e.g., a two-line VF display device). In some preferred embodiments, touch screen buttons in the web page display screen 420 are used by the player to navigate between windows in web page display screen 420 and allow access to system functions such as cashless withdraw, balance requests, system requests, points redemption, and the like. In other preferred embodiments of the invention, the web page display screen 420 utilizes various other data input techniques commonly known in the art, instead of the touch screen data entry. Thus, implementation of the embedded additional user interface 400 is an efficient, highly beneficial, and substantial upgrade to a gaming machine 350 that greatly increases the functionality over what was previously possible using an EPI device.

In one preferred embodiment, text data messages are translated into web page navigation requests by the embedded processor 430 and then displayed on the web page display screen 420 as shown and discussed with respect to FIGS. 17A and 17B below. Script languages, such as JAVA SCRIPT and VB SCRIPT, are also utilized for some of the web pages. Preferably, the embedded additional user interface 400 emulates the twelve-digit keypad and the two-by-twenty VF display on the web page display screen 420, which has touch screen capabilities. In this embodiment, commands that were previously displayed on the two-by-twenty VF display are matched to a corresponding URL and a browser is used to render the page on the web page display screen 420. The web pages displayed contain touch-screen keys that effectively emulate hardware keys.

Figure 17A:
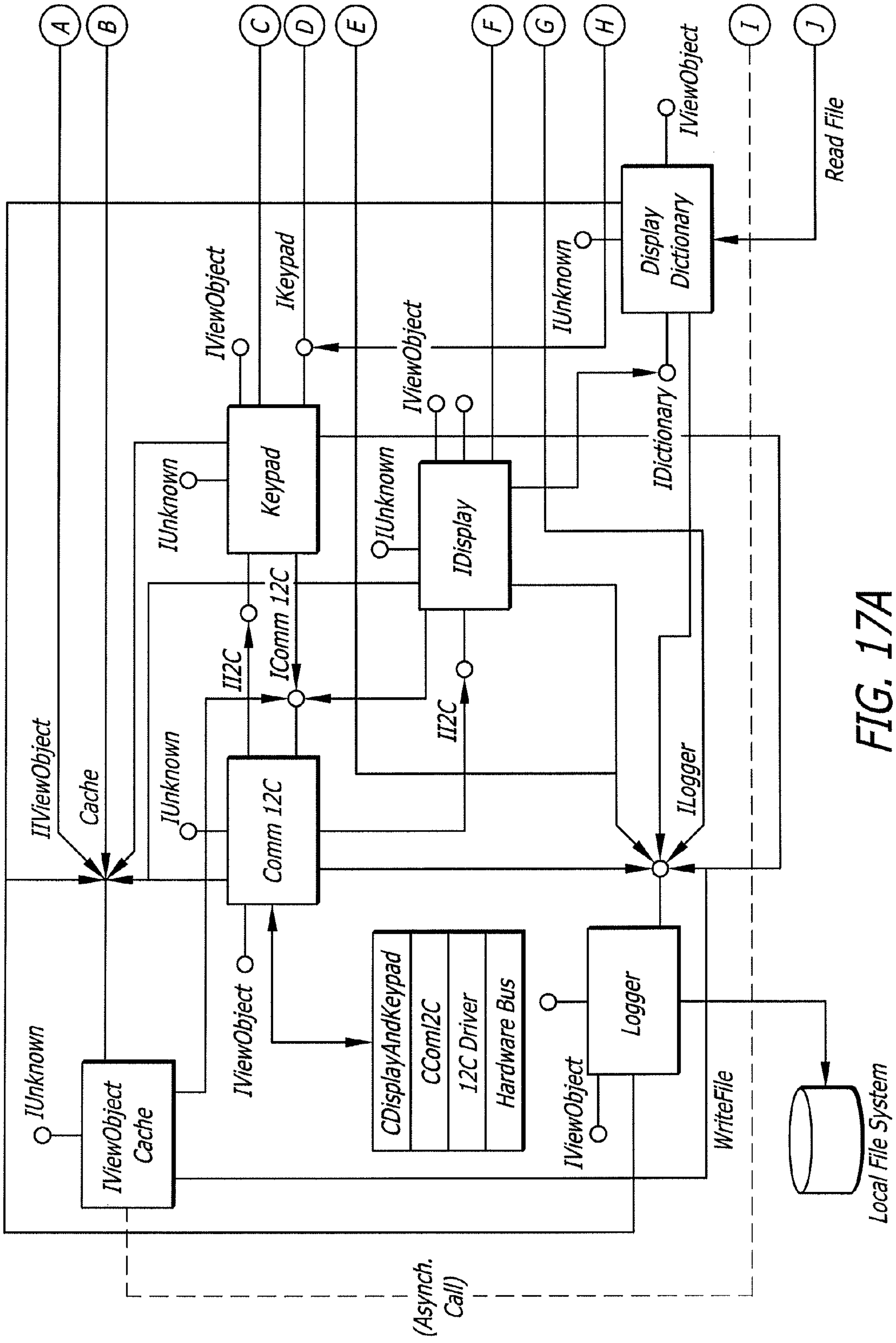
FIGS. 17A and 17B are each partial views of a diagram that illustrates an object interaction diagram of an embedded additional user interface.
Figure 17B:
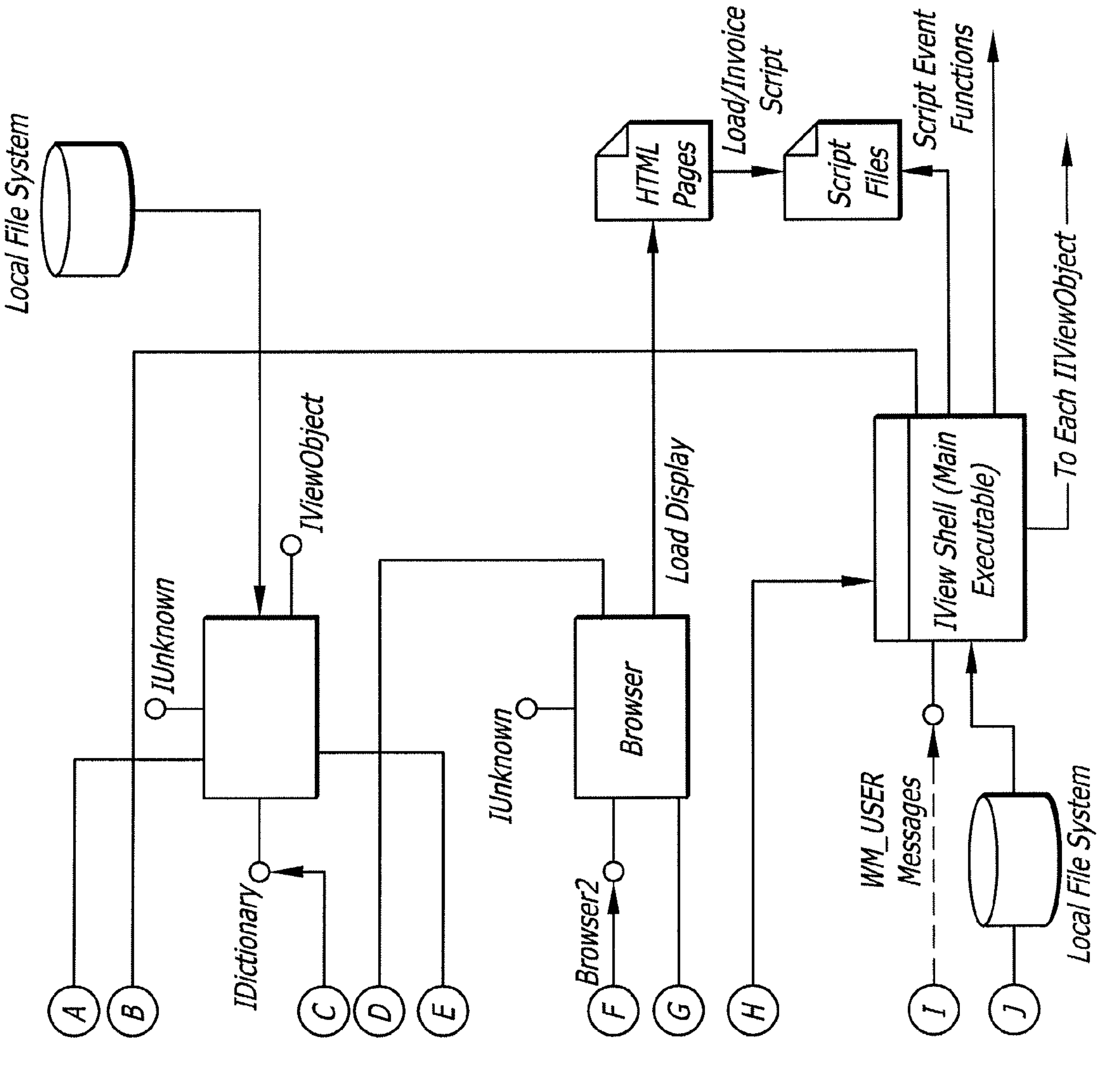
Figure 18:
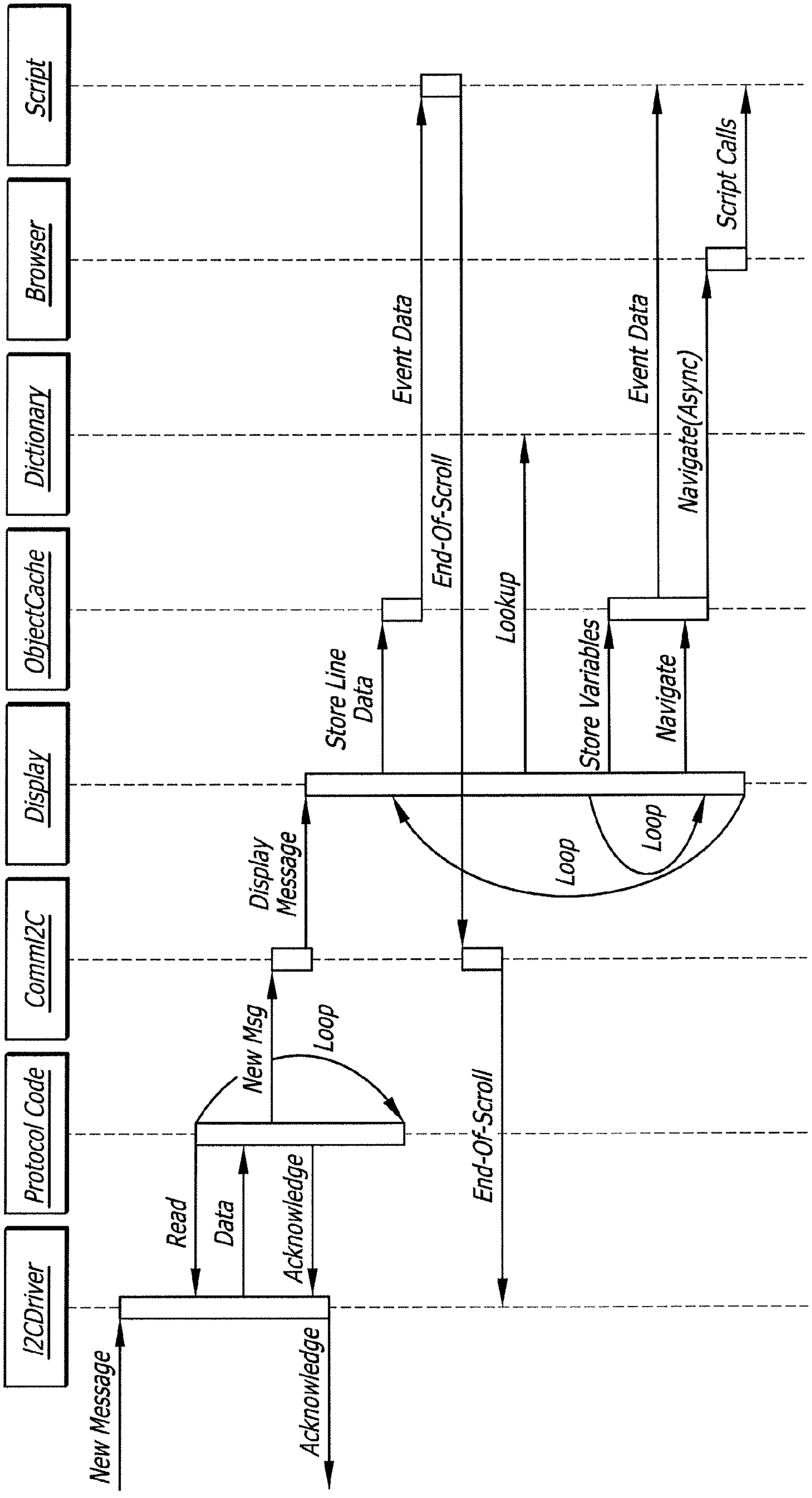
FIG. 18 is a diagram showing the sequence of events that occur when data is sent between the embedded additional user interface and the game monitoring unit.

With reference to FIGS. 17A and 17B, in one preferred embodiment of the invention, a dictionary URL approach is used for translating the data messages into web page information. In this manner, data messages are "looked up" in a dictionary data file where they can be redirected to an attractive URL. The embedded processor 430 responds to requests on the $I^2C$ bus that were intended for the prior art enhanced player interface (EPI device) VF display. The web page display screen 420 is not a passive display device like traditional PC monitors, but rather the display screen 420 must respond to commands with text type responses. These requests include initialization requests, status requests, and display requests. With reference to FIG. 18, as each text data message to be displayed is passed into the embedded processor 430, the processor 430 calls a URL Dictionary to look up a URL with which to replace the text data message. Once the substitution is complete, the embedded processor 430 instructs the web page display screen 420 to present (or navigate to) the appropriate web page.

Figure 19:
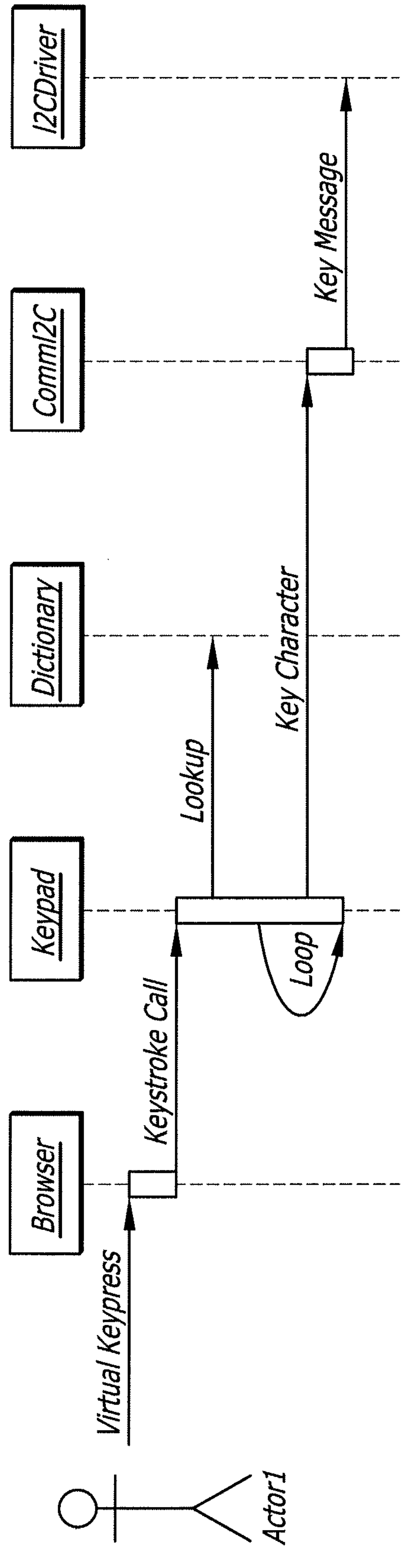
FIG. 19 is a diagram showing the sequence of events that occurs when a virtual key is pressed on the web page display screen and FIG. 20 illustrates time slices and sub-slices to accommodate progressives of any length of time, ranging from five minutes to five years.

Accordingly, with reference to FIG. 19, a URL Dictionary component is used to map a text string, sent from the embedded processor 430 and intended for the display on the two-by-twenty VF display, to a URL that can be used to display a much more visually enhanced graphical representation of the same message. Thus, the URL Dictionary component contains a listing of the possible text messages to be supported that could be sent from the embedded processor 430, and a mapping to a set of the desired eye-catching, web content to be displayed on the web page display screen 420. In this event that a message is not in the URL Dictionary, such a message is mapping to a page that substitutes for the two-line mode.

In the preferred embodiments described above, the embedded processor 430 of the embedded additional user interface 400 reads incoming $I^2C$ data messages, translates the $I^2C$ data messages into a web authoring language (e.g., HTML, DHTML, XML, MACROMEDIA FLASH), and maps the newly translated web page data message to the web page display screen 420. Additionally, the embedded additional user interface 400 can also read incoming data messages that are already in a web authoring language (e.g., HTML, DHTML, XML, MACROMEDIA FLASH), and map this web page data to the web page display screen 420. Further, and highly advantageously, a preferred embodiment of the invention also allows casinos that are using the embedded additional user interface 400 to design and use their own content, thereby giving the casinos the ability to decide what the web page presented on the web page display screen 420 of the user interface 400 will look like.

The potential advantages of utilizing the embedded additional user interface 400 of the invention are numerous. These potential advantages include, by way of example only, and not by way of limitation: providing animated and/or multimedia web style content, providing fonts and icons which are larger and more aesthetically appealing; providing special services to players, (e.g., multiple languages, assistance for handicapped individuals); facilitating interactive uses of the web page display screen 420; providing the ability to customize the "look and feel" of the web page display screen 420 for players and casino employees; increased player excitement and participation; and simplified replaceability and/or upgradeability from an EPI device or other similar non-web page style components.

Referring now to a preferred embodiment of the progressive processing system 312 as shown in FIGS. 3, 4A, and 4B, information utilized by the system to generate a progressive game 310 includes, by way of example only, and not by way of limitation, the following preferred specification parameters: average length of time is in minutes, 15 characters, leading zeros; all amount fields are in whole dollars, 15 characters, leading zeros; progressive game code is generated on the iSERIES server, 8 characters; the system PROG.ID is generated by the engine 360, 8 characters; NUMBER OF SLOTS, is generated on the iSERIES server, 10 characters, leading zeros, (number of slots included in the promotion); NUMBER CARDED SLOTS, is generated on the iSERIES server, 10 characters, leading zeros, (number of slots machines included in a promotion with player cards inserted) and SEQUENCE NUMBER, generated on the iSERIES server, 3 characters, leading zeros.

In one specific preferred embodiment, in order to generate a new promotion progressive game 310 to the progressive processing system 312, the user first creates a new promotion on the iSERIES server. Next, the SMS (slot management system) programming detects the new promotion progressive game 310 should be activated, and generates an "ADD TO ENGINE" transaction. Preferably, the transaction is then sent to a data queue SDSM0068. In one preferred embodiment, the ADD transaction written to the data queue contains the following data fields:

| | | | | |
|---|---|---|---|---|
| ADD TO ENGINE, value 001. | TRID001 | A | 01 | 03 |
| AVERAGE WIN AMOUNT | AVG$001 | A | 04 | 18 |
| AVERAGE LENGTH OF TIME, MIN. | AVGT001 | A | 19 | 33 |
| SMS MOUNDS-OF-MONEY CODE | PRCD001 | A | 34 | 41 |
| MOUNDS-OF-MONEY DESCRIPTION | PRZD001 | A | 42 | 81 |
| STARTING DATE YYYYMMDD | SDHY001 | A | 82 | 89 |
| STARTING TIME HHMMSS | STME001 | A | 90 | 95 |
| RESET AMOUNT | STR$001 | A | 96 | 110 |
| SEQUENCE NUMBER | SEQ#001 | A | 111 | 113 |

In one preferred embodiment, the connection program on the iSERIES server reads the data queue and forwards the "ADD TO ENGINE" transaction to the engine 360. When the engine 360 receives the "ADD TO ENGINE" transaction, the engine generates a "PROG.ID CODE", and responds (with the following data) back to the iSERIES server. Preferably, the connection program writes the following image to a data queue SDSM0066.

| | | | | |
|---|---|---|---|---|
| ADDED TO ENGINE, value 101 | TRID101 | A | 01 | 03 |
| SMS MOUNDS-OF-MONEY CODE | PRCD101 | A | 04 | 11 |
| ENGINE PROG. ID CODE | PRCL101 | A | 12 | 19 |
| SEQUENCE NUMBER | SEQ#001 | A | 20 | 22 |

In a preferred embodiment, the SMS programming on the iSERIES server, reads the data queue SDSM0066 and updates the promotion record as having been added and activated on the engine 360. Additionally, the engine PROG.ID is linked to the new promotion progressive game 310 code.

In one specific preferred embodiment, in order to delete (remove) an existing promotion progressive game 310 on the progressive processing system 312, the user first flags the existing promotion for deletion on the iSERIES server. Preferably, the SMS programming then generates a "DELETE FROM ENGINE" transaction and sends this transaction to a data queue SDSM0068. In one preferred embodiment, the DELETE transaction written to the data queue contains the following data fields:

| | | | | |
|---|---|---|---|---|
| DELETE FROM ENGINE, value 002. | TRID002 | A | 01 | 03 |
| SMS MOUNDS-OF-MONEY CODE | PRCD002 | A | 04 | 11 |
| ENGINE PROG. ID CODE | PRCL002 | A | 12 | 19 |
| SEQUENCE NUMBER | SEQ#002 | A | 20 | 22 |

In a preferred embodiment, the connection program on the iSERIES server reads the data queue and forwards the "DELETE FROM ENGINE" transaction to the engine 360. When the engine 360 receives the "DELETE FROM ENGINE" transaction, it removes the progressive game 310 from its active progressive games 10 and responds (with the following data) back to the iSERIES server. Preferably, the connection program writes the following image to a data queue SDSM0066.

| | | | | |
|---|---|---|---|---|
| DELETED FROM ENGINE, value 102. | TRID102 | A | 01 | 03 |
| SMS MOUNDS-OF-MONEY CODE | PRCD102 | A | 04 | 11 |
| ENGINE PROG. ID CODE | PRCL102 | A | 12 | 19 |
| SEQUENCE NUMBER | SEQ#102 | A | 20 | 22 |

In a preferred embodiment, the number of slots and number of carded slots in a promotion progressive game 310 may require updating. Preferably, the iSERIES server SMS programming periodically updates each active promotion game "Number of Assets" and "Number of Carded Assets". Once the iSERIES server has been updated, it notifies progressive processing system 312 of the updated values with an "UPDATE NUMBERS" transaction and sends the transaction to a data queue SDSM0068. Preferably, the "UPDATE NUMBERS" transaction written to the data queue contains the following data fields:

| | | | | |
|---|---|---|---|---|
| UPDATE NUMBERS, VALUE 003. | TRID003 | A | 01 | 03 |
| NUMBER OF SLOTS | #AST003 | A | 04 | 13 |
| NUMBER CARDED SLOTS | #CRD003 | A | 14 | 23 |
| ENGINE PROG. ID CODE | PRCL003 | A | 24 | 31 |

In a preferred embodiment, the connection program on the iSERIES server reads the data queue and forwards the "UPDATE NUMBERS" transaction to the engine 360. When the engine 360 receives a "UPDATE NUMBERS" for the promotion, it uses these numbers to compute the value of the promotion progressive prize. Preferably, the engine 360 does not need to respond to the "UPDATE NUMBERS" transactions.

In a preferred embodiment, the promotion progressive game 310 may be required to obtain promotional prize values from the engine 360. The iSERIES server SMS programming periodically acquires the active promotional progressive prize values for each active promotion progressive prize from the engine 360 using a "GET CURRENT VALUE" transaction, which sends the transaction to a data queue SDSM0068. Preferably, the "GET CURRENT VALUE" transaction written to the data queue contains the following data fields:

| | | | | |
|---|---|---|---|---|
| GET CURRENT VALUE, VALUE 004. | TRID004 | A | 01 | 03 |
| ENGINE PROG. ID CODE | PRCL004 | A | 04 | 11 |

In a preferred embodiment, the connection program on the iSERIES server reads the data queue and forwards the "GET CURRENT VALUE" transaction to the engine 360. Preferably, when the engine 360 receives a "GET CURRENT VALUE" transaction for a promotional progressive game, it responds with the following data to the iSERIES server. Preferably, the connection program writes the following image to a data queue SDSM0066.

| | | | | |
|---|---|---|---|---|
| RESPONSE CURRENT VALUE, VALUE 104. | TRID104 | A | 01 | 03 |
| ENGINE PROG. ID CODE | PRCL104 | A | 04 | 11 |
| PROG. ID AMOUNT | CUR$104 | A | 12 | 26 |

In a preferred embodiment, the SMS programming on the iSERIES server, reads data queue SDSM0066, and updates the promotional progressive prize value with the current cash value from the engine 360.

Referring now to another aspect of a preferred embodiment of the progressive processing system 312, when the engine 360 has determined that it is time for a promotional progressive prize to be awarded, the engine generates a "SELECT WINNER VALUE" transaction. The engine 360 informs the iSERIES server of the win event by sending the following transaction to the iSERIES server. Preferably, it also stops incrementing the promotional progressive prize's value. In a preferred embodiment, the iSERIES server connection program writes the following image to a data queue SDSM0066.

| | | | | |
|---|---|---|---|---|
| SELECT WINNER VALUE, VALUE 105. | TRID105 | A | 01 | 03 |
| ENGINE PROG. ID CODE | PRCL105 | A | 04 | 11 |
| WINNING AMOUNT | CUR$105 | A | 12 | 26 |

In a preferred embodiment, the SMS programming on the iSERIES server, reads the data queue SDSM0066, updates the promotional progressive prize's value, and selects a winning player.

Once the progressive processing system 312 indicates that the criteria has been met for awarding the progressive prize for a promotional progressive game 310, the iSERIES server programming selects a winner of the progressive prize. Specifically, the iSERIES server programming reads all SMS active slot machine (asset) records from the active assets file (SFPAT) and builds a work file (SFPP7). In one preferred embodiment, the slot machine selection only includes slot machines with: (1) a player card inserted, (2) where the player's card type matches the card type(s) assigned to be included in the promotion, (3) where the slot machine's zone on the casino floor matches the zone(s) assigned to be include in the promotion, and (4) where the slot machine's SMS manufacture code matches the manufacture code(s) to be included in the promotion. Preferably, the work file SFPP7 contains the following data:

| | |
|---|---|
| ASSET NUMBER | 5.0 |
| PLAYERS ACCOUNT NUMBER | 9 |
| PLAYERS ACCOUNT SUFFIX | 2 |
| RATINGS ASSET DENOMINATION | 7.2 |
| RATINGS ASSET DENOMINATION | 1 |
| GEAR-BOX ID. | 3.0 |
| RATINGS ASSET LOCATION | 4.0 |
| RATINGS ASSET ZONE | 2 |

In a preferred embodiment, once all included assets records have been written into the work file, the number of included records is known. Preferably, the programming uses a random number program to generate a random number between one and the number of records in the work file SFPP7. In a preferred embodiment, this record contains the winning player's account number, and the slot machine (asset) number. Preferably, the progressive processing system 312 designates this player as the winning player to the promotional progressive game 310. In a preferred embodiment, the system 312 broadcasts transactions to all slot machines on the casino floor announcing the winner, as well as sending a transaction to the slot machine of the winning player, announcing the selected player as winner.

If no winner selected, the iSERIES server programming passes by the "selecting a winner" transactions until the next cycle (e.g., approximately 15 seconds to one minute). Preferably, once the SMS programming on the iSERIES server selects a winning player, it notifies the engine 360 of the winner with a "POST WINNER DATA" transaction, and sends the transaction to a data queue SDSM0068. In a preferred embodiment, the "POST WINNER DATA" transaction written to the data queue contains the following data fields:

| | | | | |
|---|---|---|---|---|
| POST WINNER DATA, VALUE 005. | TRID005 | A | 01 | 03 |
| ENGINE PROG. ID CODE | PRCL005 | A | 04 | 11 |
| WINNERS NAME | NAME005 | A | 12 | 41 |
| WINNERS CITY | CITY005 | A | 42 | 71 |
| WINNERS STATE/COUNTRY | STAT005 | A | 72 | 101 |

In a preferred embodiment, the connection program on the iSERIES server reads the data queue and forwards the "POST WINNER DATA" transaction to the engine 360. When the engine 360 receives the "POST WINNER DATA" transaction it transmits the winning player data to any signage connected thereto. Preferably, the engine 360 does not need to respond to the POST WINNER transaction.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and media are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. An improved system for a casino having a plurality of gaming machines each configured for playing a game of the type producing a winning or losing outcome and for a winning outcome issuing a game award, each gaming machine including one or more game meters, each assuming an inoperative, lock-out condition where a game award or a bonus award exceeds a predetermined amount and each gaming machine connected by a communication network to a back-end system, said system comprising:

said back-end system including one or more servers (1) to host a system bonus pool from which one or more system bonuses are to be paid, (2) configurable to establish a system bonus prize structure including (i) a system bonus target amount and (ii) length of time until the system bonus is awarded, (iii) to determine, based upon said established system bonus prize structure, the issuance of one or more system bonuses of at least portions of said pool to one or more selected gaming machines separate from any game award and at least one bonus award being of an amount sufficient to create a gaming machine lock-out condition and (iv) to generate a message to said one or more selected gaming machines containing information related to the issuance of said system bonus;

said back-end system further including one or more servers configured to define said length of time into a plurality of time segments and for each store data representing a number of chances from a random number field F and provide data approximating a range of chance numbers 1-R where R approaches F as time T approaches the said length of time, where said number of chances for said time segments increases with time and (b) proximate the occurrence of each time segment to randomly select a number and if said number corresponds with the number of chances for the time segment, to issue a system based bonus a display at said gaming machines for displaying said message; and external bonus meters associated with said gaming machines in addition to said game meters and in communication with said back-end system and configured to record system-based bonuses issued to the gaming machine and to, where the bonus results in a gaming machine lockout condition, record the bonus amount resulting in the lockout upon gaming machine reset.

2. The system of claim 1 comprising said back-end system includes one or more servers configured to progressively increment of the value of the bonus pool.

3. The system of claim 2 comprising said back-end system includes one or more servers configured to increment said bonus pool according to a configurable growth profile.

4. The system of claim 3 comprising said back-end system includes one or more servers configured define said length of time in a plurality of time segments and for each store data representing a pot growth rate factor, said factor selected to configure the growth profile.

5. The system of claim 1 comprising said bonus pool is funded by marketing dollars and not by funds directly received from a winning player in exchange for game play.

6. The system of claim 1 comprising said back-end system including one or more servers to host a plurality of system bonus pools from which one or more system bonuses are to be paid.

7. The system of claim 1 comprising said external bonus meters configured to, when a system-based bonus is recorded, send a message related to said external bonus meter reading to said back end system.

* * * * *